United States Patent
Yamashita et al.

(10) Patent No.: US 10,731,048 B2
(45) Date of Patent: Aug. 4, 2020

(54) FUNCTIONAL FILM

(71) Applicant: DAIKIN INDUSTRIES, LTD., Osaka-shi, Osaka (JP)

(72) Inventors: Tsuneo Yamashita, Osaka (JP); Eiji Sakamoto, Osaka (JP); Saya Nii, Osaka (JP); Atsushi Sakakura, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/344,555

(22) PCT Filed: Oct. 24, 2017

(86) PCT No.: PCT/JP2017/038287
§ 371 (c)(1),
(2) Date: Apr. 24, 2019

(87) PCT Pub. No.: WO2018/079525
PCT Pub. Date: May 3, 2018

(65) Prior Publication Data
US 2019/0284431 A1   Sep. 19, 2019

(30) Foreign Application Priority Data
Oct. 25, 2016  (JP) .................. 2016-209011

(51) Int. Cl.
*B32B 27/30*   (2006.01)
*C09D 151/08*   (2006.01)
(Continued)

(52) U.S. Cl.
CPC .............. *C09D 151/08* (2013.01); *B32B 3/30* (2013.01); *B32B 27/30* (2013.01); *C08G 65/22* (2013.01);
(Continued)

(58) Field of Classification Search
CPC .... C08J 2325/06; C08J 2451/08; C08J 7/047; C09D 151/08; G02B 1/118; G02B 1/18
See application file for complete search history.

(56) References Cited

U.S. PATENT DOCUMENTS

| | | | |
|---|---|---|---|
| 2015/0125659 | A1 | 5/2015 | Fujiyama et al. |
| 2017/0066207 | A1 | 3/2017 | Hayashi et al. |
| 2017/0274652 | A1 | 9/2017 | Tamai |

FOREIGN PATENT DOCUMENTS

| | | |
|---|---|---|
| JP | 2011-169987 A | 9/2011 |
| JP | 2014-153524 A | 8/2014 |

(Continued)

OTHER PUBLICATIONS

Kanazawa et al (JP 2014153684 machine translation), Aug. 2014. (Year: 2014).*

(Continued)

*Primary Examiner* — Lawrence D Ferguson
(74) *Attorney, Agent, or Firm* — Sughrue Mion, PLLC

(57) ABSTRACT

A functional film includes layer (A) containing a resin and layer (B) containing a compound containing a perfluoropolyether group. Layer (B) has a microrelief pattern structure on a surface remote from layer (A). In elemental analysis by X-ray photoelectron spectroscopy from the layer (B) side, the functional film satisfies formula (1): D1<2×X1, wherein X1 is a thickness (nm) of layer (B); and D1 is a depth (nm) at which fluorine atoms exhibit a concentration of 1 atom % or lower. In carbon 1s spectrum measurement by X-ray photoelectron spectroscopy from the layer (B) side, the functional film satisfies formula (2): D2<2×X1, wherein X1 is the thickness (nm) of layer (B); and D2 is a depth (nm) at which no peak is detected within a bond energy range of 290 to 300 eV.

7 Claims, 3 Drawing Sheets

(51) Int. Cl.
  *G02B 1/18* (2015.01)
  *G02B 1/118* (2015.01)
  *B32B 3/30* (2006.01)
  *C08G 65/32* (2006.01)
  *C08G 65/22* (2006.01)
  *C08J 7/04* (2020.01)

(52) U.S. Cl.
  CPC ............ *C08G 65/32* (2013.01); *C08J 7/0427* (2020.01); *G02B 1/118* (2013.01); *G02B 1/18* (2015.01); *C08J 2325/06* (2013.01); *C08J 2451/08* (2013.01)

(56) References Cited

FOREIGN PATENT DOCUMENTS

| JP | 2014-153684 A | 8/2014 |
| JP | 2016-83928 A | 5/2016 |
| JP | 5951165 B1 | 7/2016 |
| WO | 2013/187506 A1 | 12/2013 |

OTHER PUBLICATIONS

International Search Report for PCT/JP2017/038287, dated Dec. 19, 2017.
International Preliminary Report on Patentability and Translation of Written Opinion, dated Apr. 30, 2019 from the International Bureau in counterpart International application No. PCT/JP2017/038287.
Communication dated May 11, 2020 from European Patent Office in EP Application No. 17864696.4.

\* cited by examiner

FUNCTIONAL FILM

CROSS REFERENCE TO RELATED APPLICATIONS

This Application is a National Stage of International Application No. PCT/JP2017/038287 filed Oct. 24, 2017, claiming priority based on Japanese Patent Application No. 2016-209011 filed Oct. 25, 2016.

TECHNICAL FIELD

The invention relates to functional films.

BACKGROUND ART

Films having a microrelief pattern structure are known to be used as anti-reflection films.

Patent Literature 1 discloses a method for producing an optical film having excellent antifouling properties and scratch resistance as well as anti-reflection properties. This method is a method for producing an optical film having on a surface thereof an uneven structure provided with projections at a pitch equal to or shorter than the wavelength of visible light. The method includes the steps of: (1) applying a lower layer resin and an upper layer resin; (2) forming a resin layer having the uneven structure on a surface thereof by pressing a mold against the layer lower resin and the upper layer resin from the upper layer resin side in the state where the applied lower layer resin and upper layer resin are stacked; and (3) curing the resin layer, the lower layer resin containing at least one kind of first monomer that contains no fluorine atoms, the upper layer resin containing a fluorine-containing monomer and at least one kind of second monomer that contains no fluorine atoms, at least one of the first monomer and the second monomer containing a compatible monomer that is compatible with the fluorine-containing monomer and being dissolved in the lower layer resin and the upper layer resin.

CITATION LIST

Patent Literature

Patent Literature 1: JP 5951165 B

SUMMARY OF INVENTION

Technical Problem

The optical film obtainable by the production method disclosed in Patent Literature 1 includes "an integral form of the lower layer resin and the upper layer resin with no interface between these resins". Thus, only insufficient fluorine atoms are present near the surface and the antifouling property is insufficient. Further, such an integral form of the lower layer resin and the upper layer resin causes a failure in sufficiently exerting the characteristics that the lower layer resin is expected to give.

This causes a demand for a technique to give an excellent antifouling property to a film without impairing the microrelief pattern structure while maintaining the characteristics of a resin on which this structure is provided.

In view of the above current state of the art, the invention aims to provide a functional film that has a microrelief pattern structure, that sufficiently exerts characteristics of a resin serving as a main component for imparting functions to the functional film, and that has an excellent antifouling property, water-repellency, and oil-repellency.

Solution to Problem

The invention relates to a functional film including:
a layer (A) that contains a resin; and
a layer (B) that contains a compound containing a perfluoropolyether group,
the layer (B) having a microrelief pattern structure on a surface remote from the layer (A),
in elemental analysis by X-ray photoelectron spectroscopy with etching by an argon gas cluster ion beam from the layer (B) side, the functional film satisfying the following formula (1):

$$D1 < 2 \times X1$$

wherein X1 is a thickness (nm) of the layer (B); and D1 is a depth (nm) at which fluorine atoms exhibit a concentration of 1 atom % or lower, in carbon is spectrum measurement by X-ray photoelectron spectroscopy with etching by an argon gas cluster ion beam from the layer (B) side, the functional film satisfying the following formula (2):

$$D2 < 2 \times X1$$

wherein X1 is the thickness (nm) of the layer (B); and D2 is a depth (nm) at which no peak is detected within a bond energy range of 290 to 300 eV.

The functional film preferably further satisfies $0.8 \times X1 < D1$ in the formula (1).

The functional film preferably further satisfies $0.8 \times X1 < D2$ in the formula (2).

The layer (B) is preferably on the layer (A).

Preferably, the functional film further includes a substrate (S), the layer (A) is on the substrate (S), and the layer (B) is on the layer (A).

The perfluoropolyether group is preferably a polyether chain represented by the following formula:

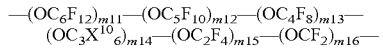
$$(OC_3X^{10}{}_6)_{m14}-(OC_2F_4)_{m15}-(OCF_2)_{m16}-$$

wherein m11, m12, m13, m14, m15, and m16 are each individually an integer of 0 or 1 or greater; $X^{10}$s are each individually H, F, or Cl; and repeating units are present in any order.

The compound in the layer (B) is preferably at least one selected from the group consisting of:
a compound obtainable by curing a compound (F) containing a perfluoropolyether group and a curable site;
a compound (G) containing a perfluoropolyether group and a hydrolyzable group; and
a compound (H) represented by the following formula:

wherein PFPE is a perfluoropolyether group; and $R^{111}$ and $R^{113}$ are each individually F, a C1-C16 alkyl group, a C1-C16 alkoxy group, a C1-C16 fluorinated alkyl group, a C1-C16 fluorinated alkoxy group, or $-R^{114}-X^{111}$, where $R^{114}$ is a single bond or a divalent organic group; and $X^{111}$ is $-NH_2$, $-OH$, $-COOH$, $-CH=CH_2$, $-OCH_2CH=CH_2$, a halogen, phosphoric acid, a phosphoric acid ester, a carboxylic acid ester, a thiol, a thioether, an alkyl ether optionally substituted with fluorine, an aryl, an aryl ether, or an amide.

The resin in the layer (A) is preferably at least one selected from the group consisting of a resin obtainable by curing a curable resin, a resin obtainable by curing a curable monomer, and a resin containing a polysiloxane structure formed from a silicon-containing compound.

Advantageous Effects of Invention

The functional film of the invention has a microrelief pattern structure, sufficiently exerts characteristics of a resin serving as a main component for imparting functions to the functional film, and has an excellent antifouling property, water-repellency, and oil-repellency.

BRIEF DESCRIPTION OF THE DRAWINGS

FIG. 4(a)A is a graph showing the carbon 1s spectra and FIG. 4B is a graph showing the relationship between the sputter time and the atom concentrations. The times (min) in FIG. 4A mean the sputter times.

FIG. 5A is a graph showing the carbon 1s spectra and FIG. B is a graph showing the relationship between the sputter time and the atom concentrations. The times (min) in FIG. 5A mean the sputter times.

DESCRIPTION OF EMBODIMENTS

Figure 1:
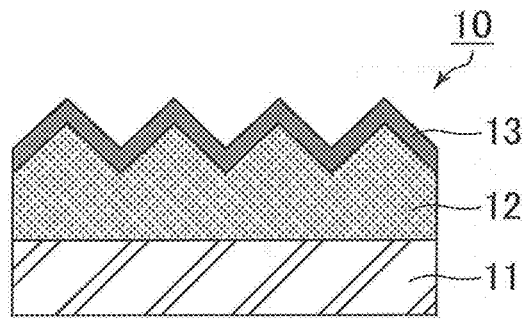
FIG. 1 is a schematic cross-sectional view of an embodiment of the functional film of the invention.

The invention will be specifically described hereinbelow.

The functional film of the invention is a film having a variety of functions, such as water-repellency, oil-repellency, an antifouling property, hydrophilicity, a refractive index adjusting function, ultraviolet absorbability, light stability, biological properties, incombustibility, an antistatic function, and anti-reflectivity. In particular, the presence of a compound containing a perfluoropolyether group in the layer (B) leads to the antifouling property, water-repellency, and oil-repellency. The microrelief pattern structure leads to the anti-reflectivity.

The functional film of the invention includes a layer (A) and a layer (B), and has a microrelief pattern structure on a surface of the layer (B) remote from the layer (A).

The term "micro" preferably means a nanometer scale, more preferably means that the pattern pitch is equal to or shorter than the visible light wavelength. The visible light wavelength is about 780 nm. With such a microstructure, the functional film can be used as an optical film.

The microrelief pattern is preferably a pattern having a pattern pitch of 1000 to 1 nm, more preferably 780 to 2 nm, still more preferably 500 to 2 nm. The pattern pitch means the distance between the vertices of adjacent protrusions. The pattern pitch can be determined by electron microscopy.

The microrelief pattern may have any depth which is preferably a nanometer scale, more preferably equal to or shorter than the visible light wavelength. The functional film having such a microstructure can be used as an optical film.

The microrelief pattern is preferably a pattern having a pattern depth of 3000 to 3 nm, more preferably 1000 to 3 nm. The pattern depth means the difference between the height of the vertex of a protrusion and the height of the bottom of a recess. The pattern depth can be determined by electron microscopy.

The functional film of the invention satisfies the following formula (1) in elemental analysis by X-ray photoelectron spectroscopy (XPS) with etching by an argon gas cluster ion beam (Ar-GCIB) from the layer (B) side.

The formula (1) is as follows:

$$D1 < 2 \times X1$$

wherein X1 is the thickness (nm) of the layer (B); and D1 is the depth (nm) at which fluorine atoms exhibit a concentration of 1 atom % or lower.

Observation of fluorine atoms at a concentration of 2.0 only 1 atom % or lower means the absence of a fluorine-containing compound, such as a compound containing a perfluoropolyether group, at the depth.

In order to achieve the desired effects of the invention much better, the functional film of the invention preferably satisfies $0.8 \times X1 < D1$ in the formula (1). In other words, the functional film of the invention preferably satisfies the relationship of $0.8 \times X1 < D1 < 2 \times X1$.

The functional film of the invention further satisfies the following formula (2) in carbon Is spectrum measurement by X-ray photoelectron spectroscopy (XPS) with etching by an argon gas cluster ion beam (Ar-GCIB) from the layer (B) side.

The formula (2) is as follows:

$$D2 < 2 \times X1$$

wherein X1 is the thickness (nm) of the layer (B); and D2 is the depth (nm) at which no peak is detected within the bond energy range of 290 to 300 eV.

The peaks detected within the range of 290 to 300 eV include the peaks derived from the bonds contained in the perfluoropolyether group, including the $CF_2$ bonds and the $OCF_2$ bonds contained in groups such as —$OC_4F_8O$—, —$OC_3F_6O$—, —$OC_2F_4O$—, —$OCF_2O$—, and —$OCF(CF_3)CF_2O$—. Thus, detection of no peaks within the bond energy range of 290 to 300 eV means the absence of a compound containing a perfluoropolyether group at the depth.

In order to achieve desired effects of the invention much better, the functional film of the invention preferably further satisfies $0.8 \times X1 < D2$ in the formula (2). In other words, the functional film of the invention preferably satisfies the relationship of $0.8 \times X1 < D2 < 2 \times X1$.

The functional film of the invention satisfies the formula (1) and the formula (2), and preferably includes a clear interface between the layer (A) and the layer (B). This structure allows the functional film to sufficiently exert the functions that the resin in the layer (A) originally has. Also, the presence of a compound containing a perfluoropolyether group in the layer (B) at a high concentration near the surface of the microrelief pattern structure allows the functional film to have an excellent antifouling property, water-repellency, and oil-repellency.

D1 and D2 can be determined by X-ray photoelectron spectroscopy (XPS) under the following conditions.

VersaProbe II available from Ulvac-Phi, Inc.
Argon gas cluster ion beam
Sputtering conditions: 5 kV and 20 nA
X-ray beam diameter: 100 μm
Measurement range: 1000 μm×300 μm
Photoelectron capturing angle: 45 degrees The intensity of the photoelectron spectrum obtained by the XPS elemental analysis is used to quantify the fluorine atoms and determine the fluorine atom concentration. The fluorine atom concentration is the proportion of fluorine atoms in the total quantified value, taken as 100 atom %, of all the atoms detected by XPS.

The presence or absence of a peak within the range of 290 to 295 eV can be confirmed by waveform analysis of the carbon 1s spectrum determined by XPS. The waveform analysis can be performed by a common method. For example, the resulting spectrum is subjected to curve fitting and the peaks are thereby separated.

The "depth" as used herein means the distance from the surface of the layer (B) of the functional film in the depth direction. A polystyrene layer whose thickness is specified in advance by an atomic force microscope (AFM) is etched by Ar-GCIB to determine the etching speed. The aforementioned D1 and D2 can be determined respectively by measuring the etching time at which no fluorine atom is observed and the etching time at which no peak is detected within the range of 290 to 300 eV and converting the respective etching times into the depths in polystyrene equivalent.

The thickness X1 (nm) of the layer (B) can be set based on the standards determined by measuring, with a spectroscopic ellipsometer, the thickness of the layer (B) that has been applied, dried, and cured in advance.

The functional film of the invention preferably has a fluorine atom concentration of 75 to 30 atom % in elemental analysis by X-ray photoelectron spectroscopy (XPS) with etching to a depth of 0.5×X1 by an argon gas cluster ion beam (Ar-GCIB) from the layer (B) side. The presence of fluorine atoms at a high concentration in the layer (B) can lead to a much better antifouling property, water-repellency, and oil-repellency.

The functional film of the invention preferably has a peak detected within the bond energy range of 290 to 300 eV, more preferably has a peak having an area expressed by S/N ratio of 3 or larger, in carbon 1s spectrum measurement by X-ray photoelectron spectroscopy (XPS) with etching to a depth of 0.5×X1 by an argon gas cluster ion beam (Ar-GCIB) from the layer (B) side. The presence of a compound containing a perfluoropolyether group at a high concentration in the layer (B) can lead to a much better antifouling property, water-repellency, and oil-repellency.

The layer (B) preferably has a thickness, i.e., X1, of 100 nm or smaller, more preferably 50 nm or smaller, while preferably 1 nm or greater, more preferably 5 nm or greater. In the invention, the layer (B) is allowed to be such a thin layer. This allows the microrelief pattern structure to be much less likely to be impaired.

In order to achieve a clearer microrelief pattern structure, the layer (B) preferably has a uniform thickness. The uniformity of the thickness can be determined with a spectroscopic ellipsometer. For example, in measurement of the thickness of any region with a spectroscopic ellipsometer, the maximum thickness ($d_{max}$) and the minimum thickness ($d_{min}$) preferably give a ratio ($d_{max}/d_{min}$) of 2.0 or smaller, more preferably 1.5 or smaller.

The layer (A) preferably has a thickness of 20 μm or smaller, more preferably 10 μm or smaller, while preferably 100 nm or greater, more preferably 1000 nm or greater. In the invention, the layer (A) is allowed to be such a thick layer. This allows the functional film to exert much better the functions that the resin in the layer (A) originally has.

In the functional film of the invention, the layer (B) is preferably on the layer (A). In the functional film of the invention, the layer (B) may be on the layer (A) directly or with another layer in between. Still, the layer (B) is preferably directly on the layer (A).

The functional film of the invention preferably further includes a substrate (S).

In order to ensure the transparency and the processibility, the substrate (S) preferably has a thickness of 20 μm or greater and 200 μm or smaller, more preferably 40 μm or greater and 100 μm or smaller.

In the functional film of the invention including a substrate (S), preferably, the layer (A) is on the substrate (S) and the layer (B) is on the layer (A). In the functional film of the invention, the layer (A) may be on the substrate (S) directly or with another layer in between and the layer (B) may be on the layer (A) directly or with another layer in between. Still, preferably, the layer (A) is directly on the substrate (S) and the layer (B) is directly on the layer (A).

FIG. 1 is a schematic cross-sectional view of an embodiment of the functional film of the invention. In FIG. 1, a functional film 10 includes a substrate 11, a layer 12 directly on the substrate 11, and a layer 13 directly on the layer 12. The layer 12 contains the aforementioned resin and the layer 13 contains the aforementioned compound containing a perfluoropolyether group. The layer 12 and the layer 13 are divided by a clear interface. This structure allows the functional film to sufficiently exert the characteristics of the materials constituting the respective layers.

Figure 2:
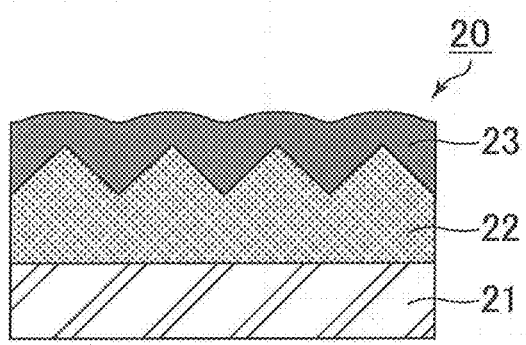
FIG. 2 is a schematic cross-sectional view of an embodiment of a (comparative) functional film.

The layer 13 is formed of a thin film having a substantially uniform thickness, and thus the layer 12 and the layer 13 have substantially the same microrelief pattern. In other words, the functional film 10 in FIG. 1 has a microrelief pattern structure on the surface of the layer 13 remote from the layer 12. As in the case of a functional film 20 shown in FIG. 2 as a comparative embodiment in which a layer 23 is a thick film having a nonuniform thickness or is a film having no microrelief pattern structure on the surface of the layer 23 remote from a layer 22, the functional film fails to sufficiently exert the effects owing to the microrelief pattern structure even when the layer 22 has this structure. The functional film 10 in FIG. 1 has a microrelief pattern structure on the surface of the layer 13 remote from the layer 12, and thus can sufficiently exert the effects owing to the microrelief pattern structure, such as anti-reflectivity.

The substrate (S) may be formed from a material such as silicon, synthetic resin, glass, metal, or ceramic.

Examples of the synthetic resin include cellulose resins such as triacetyl cellulose (TAC), polyolefins such as polyethylene, polypropylene, ethylene-propylene copolymers, and ethylene-vinyl acetate copolymers (EVAs), cyclic polyolefins, modified polyolefins, polyvinyl chloride, polyvinylidene chloride, polystyrene, polyamide, polyimide, polyamide-imide, polycarbonate, poly-(4-methylpentene-1), ionomers, acrylic resins, polymethyl methacrylate, acryl-styrene copolymers (AS resins), butadiene-styrene copolymers, ethylene-vinyl alcohol copolymers (EVOHs), polyesters such as polyethylene terephthalate (PET), polybutylene terephthalate (PBT), and polycyclohexane terephthalate (PCT), polyether, polyether ketone (PEK), polyether ether ketone (PEEK), polyetherimide, polyacetal (POM), polyphenylene oxide, modified polyphenylene oxide, polyarylate, aromatic polyester (liquid crystal polymers), polytetrafluoroethylene, polyvinylidene fluoride, other fluororesins, styrene-, polyolefin-, polyvinyl chloride-, polyurethane-, fluoroelastomer-, or chlorinated polyethylene-based thermoplastic elastomers, epoxy resin, phenol resin, urea resin, melamine resin, unsaturated polyester, silicone resin, and polyurethane, and copolymers, blends, and polymer alloys mainly formed from these polymers. One of these may be used or two or more of these may be used in combination (for example, in the form of a laminate of two or more layers).

The layer (B) contains a compound containing a perfluoropolyether group.

The perfluoropolyether group (PFPE) is preferably a polyether chain represented by the following formula:

$$-(OC_6F_{12})_{m11}-(OC_5F_{10})_{m12}-(OC_4Fe)_{m13}-(OC_3X^{10}_6)_{m14}-(OC_2F_4)_{m15}-(OCF_2)_{m16}-$$

wherein m11, m12, m13, m14, m15, and m16 are each independently an integer of 0 or 1 or greater; $X^{10}$s are each independently H, F, or Cl; and the repeating units are present in any order.

$X^{10}$ is preferably F.

Each of m11 to m16 is preferably an integer of 0 to 200, more preferably an integer of 0 to 100. The sum of m11 to m16 is preferably an integer of 1 or greater, more preferably an integer of 5 or greater, still more preferably an integer of 10 or greater. The sum of m11 to m16 is preferably an integer of 200 or smaller, more preferably an integer of 100 or smaller. The sum of m11 to m16 is preferably an integer of 10 to 200, more preferably an integer of 10 to 100.

Each repeating unit in the polyether chain may be linear or branched, and is preferably linear. For example, the repeating unit $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $(OCF_2CF_2CF_2CF_2CF(CF_3))-$, or the like, and is preferably $-(OCF_2CF_2CF_2CF_2CF_2CF_2)-$. The repeating unit $-(OC_5F_{10})-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$. The repeating unit $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, and is preferably $-(OCF_2CF_2CF_2CF_2)-$. The repeating unit $-(OC_3F_6)-$ may be any of $-(OCF_2CF_2CF_2)-$, $-(OCF(CF_3)CF_2)-$, and $-(OCF_2CF(CF_3))-$, and is preferably $-(OCF_2CF_2CF_2)-$. The repeating unit $-(OC_2F_4)-$ may be either of $-(OCF_2CF_2)-$ and $-(OCF(CF_3))-$, and is preferably $-(OCF_2CF_2)-$.

In an embodiment, the polyether chain is a chain represented by $-(OC_3F_6)_{m14}-$, wherein m14 is an integer of 1 to 200. The polyether chain is preferably a chain represented by $-(OCF_2CF_2CF_2)_{m14}-$, wherein m14 is an integer of 1 to 200, or a chain represented by $-(OCF(CF_3)CF_2)_{m14}-$, wherein m14 is an integer of 1 to 200, more preferably a chain represented by $-(OCF_2CF_2CF_2)_{m14}-$, wherein m14 is an integer of 1 to 200. In the formula, m14 is preferably an integer of 5 to 200, more preferably an integer of 10 to 200.

In another embodiment, the polyether chain is a chain represented by $-(OC_4F_8)_{m13}-(OC_3F_6)_{m14}-(OC_2F_4)_{m15}-(OCF_2)_{m16}-$, wherein m13 and m14 are each an integer of 0 to 30; m15 and m16 are each an integer of 1 to 200; the sum of m13 to m16 is an integer of 5 or greater; and the repeating units are present in any order. In the formula, m15 and m16 are each preferably an integer of 5 to 200, more preferably an integer of 10 to 200. The sum of m13 to m16 is preferably an integer of 10 or greater. The polyether chain is preferably $-(OCF_2CF_2CF_2CF_2)_{m13}-(OCF_2CF_2CF_2)_{m14}-(OCF_2CF_2)_{m15}-(OCF_2)_{m16}-$. In an embodiment, the polyether chain may be a chain represented by $-(OC_2F_4)_{m5}-(OCF_2)_{m6}-$, wherein m15 and m16 are each an integer of 1 to 200; and the repeating units are present in any order. In the formula, m15 and m16 are each preferably an integer of 5 to 200, more preferably an integer of 10 to 200.

In still another embodiment, the polyether chain is a group represented by $-(R^{m1}-R^{m2})_{m17}-$. In the formula, $R^{m1}$ is $OCF_2$ or $OC_2F_4$, preferably $OC_2F_4$. In the formula, $R^{m2}$ is a group selected from $OC_2F_4$, $OC_3F_6$, $OC_4F_8$, $OC_5F_{10}$, and $OC_6F_{12}$, or any combination of two or three groups individually selected from these groups. Preferably, $R^{m1}$ is a group selected from $OC_2F_4$, $OC_3F_6$, and $OC_4F_8$, a group selected from $OC_3F_6$, $OC_4F_8$, $OC_5F_{10}$, and $OC_6F_{12}$, or any combination of two or three groups individually selected from these groups. Examples of the combination of two or three groups individually selected from $OC_2F_4$, $OC_3F_6$, and $OC_4F_8$ include, but are not limited to, $-OC_2F_4OC_3F_6-$, $-OC_2F_4OC_4F_8-$, $-OC_3F_6OC_2F_4-$, $-OC_3F_6OC_3F_6-$, $-OC_3F_6OC_4F_8-$, $-OC_4F_8OC_4F_8-$, $-OC_4F_8OC_3F_6-$, $-OC_4F_8OC_2F_4-$, $-OC_2F_4OC_2F_4OC_3F_6-$, $-OC_2F_4OC_2F_4OC_4F_8-$, $-OC_2F_4OC_3F_6OC_2F_4-$, $-OC_2F_4OC_3F_6OC_3F_6-$, $-OC_2F_4OC_4F_8OC_2F_4-$, $-OC_3F_6OC_2F_4OC_2F_4-$, $-OC_3F_6OC_2F_4OC_3F_6-$, $-OC_3F_6OC_3F_6OC_2F_4-$, and $-OC_4F_8OC_2F_4OC_2F_4-$. In the formula, m17 is an integer of 2 or greater, preferably an integer of 3 or greater, more preferably an integer of 5 or greater, while an integer of 100 or smaller, preferably an integer of 50 or smaller. In the formula, $OC_2F_4$, $OC_3F_6$, $OC_4F_8$, $OC_5F_{10}$, and $OC_6F_{12}$ each may be linear or branched, and is preferably linear. In this embodiment, the polyether chain is preferably $-(OC_2F_4-OC_3F_6)_{m17}-$ or $-(OC_2F_4-OC_4F_8)_{m17}-$.

In the polyether chain, the ratio of m15 to m16 (hereinafter, referred to as the "m15/m16 ratio") may be 0.1 to 10, preferably 0.2 to 5, more preferably 0.2 to 2, still more preferably 0.2 to 1.5, further more preferably 0.2 to 0.85. The polyether chain having an m15/m16 ratio of 10 or lower can lead to more improved lubricity, friction durability, and chemical resistance (e.g., durability against artificial sweat) of a surface-treating layer. The lower the m15/m16 ratio is, the more improved the lubricity and friction durability of the surface-treating layer are. The polyether chain having an m15/m16 ratio of 0.1 or higher can lead to much better stability of the compound. The higher the m15/m16 ratio is, the more improved the stability of the compound is.

The polyether chain may be at least one chain selected from the group consisting of:

a chain represented by the following formula:

$$-(OCF_2CF_2CX^{11}_2)_{n11}(OCF_2CF(CF_3))_{n12}(OCF_2CF_2)_{n13}(OCF_2)_{n14}(OC_4F_8)_{n15}-$$

wherein n11, n12, n13, n14, and n15 are each independently an integer of 0 or 1 or greater; $X^{11}$'s are each independently H, F, or Cl; and the repeating units are present in any order; and a chain represented by the following formula:

$$-(OC_2F_4-R^{21})_f-$$

wherein $R^{21}$ is a group selected from $OC_2F_4$, $OC_3F_6$, and $OC_4F_8$; and f is an integer of 2 to 100.

$X^{11}$ is preferably F.

In the formula, n11 to n15 are each preferably an integer of 0 to 200. The sum of n11 to n15 is preferably an integer of 2 or greater, more preferably an integer of 5 to 300, still more preferably an integer of 10 to 200, particularly preferably an integer of 10 to 100.

$R^{21}$ is a group selected from $OC_2F_4$, $OC_3F_6$, and $OC_4F_6$, or any combination of two or three groups individually selected from these groups. Examples of the combination of two or three groups individually selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F$—, —$OC_2F_4OC_3F_6OC_2F_4$—, —$OC_2F_4OC_3F_6OC_3F_6$—, —$OC_2F_4OC_4F_9OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula, f is an integer of 2 to 100, preferably an integer of 2 to 50. In the formula, $OC_2F_4$, $OC_3F_6$, and $OC_4F_8$ each may be linear or branched, and is preferably linear. In this embodiment, —($OC_2F_4$—$R^{21}$)$_f$— is preferably —($OC_2F_4$—$OC_3F_6$)$_f$— or —($OC_2F_4$—$OC_4F_8$)$_f$—.

In the compound of the invention, the polyether chain moiety has a number average molecular weight of, for example, 500 to 30000, preferably 1500 to 30000, more preferably 2000 to 10000, although not limited thereto. The number average molecular weight is a value determined by $^{19}$F-NMR.

In another embodiment, the number average molecular weight of the polyether chain moiety is 500 to 30000, preferably 1000 to 20000, more preferably 2000 to 15000, still more preferably 2000 to 10000, and may be 3000 to 6000.

In another embodiment, the number average molecular weight of the polyether chain moiety may be 4000 to 30000, preferably 5000 to 10000, more preferably 6000 to 10000.

The compound is preferably at least one selected from the group consisting of:

a compound obtainable by curing a compound (F) containing a perfluoropolyether group and a curable site;

a compound (G) containing a perfluoropolyether group and a hydrolyzable group; and a compound (H) represented by the following formula:

$R^{111}$-PFPE-$R^{113}$ wherein PFPE is a perfluoropolyether group; and $R^{111}$ and $R^{113}$ are each individually F, a C1-C16 alkyl group, a C1-C16 alkoxy group, a C1-C16 fluorinated alkyl group, a C1-C16 fluorinated alkoxy group, or —$R^{114}$—$X^1$, where $R^{14}$ is a single bond or a divalent organic group; and $X^{111}$ is —$NH_2$, —OH, —COOH, —CH=$CH_2$, —$OCH_2CH$=$CH_2$, a halogen, phosphoric acid, a phosphoric acid ester, a carboxylic acid ester, a thiol, a thioether, an alkyl ether optionally substituted with fluorine, an aryl, an aryl ether, or an amide.

In order to achieve a functional film that includes the layer (A) and the layer (B) firmly bonded to each other and has excellent durability, the compound is more preferably at least one selected from the group consisting of a compound (G) and a compound obtainable by curing a compound (F), still more preferably a compound obtainable by curing a compound (F) containing a perfluoropolyether group and a curable site.

The compound (F) contains a perfluoropolyether group and a curable site.

The curable site may be, but is not limited to, an allyl group, a cinnamic acid group, a sorbic acid group, an acryloyl group, or a methacryloyl group.

The compound (F) is preferably a carbon-carbon double bond-containing compound (perfluoropolyether compound) that is a reaction product of a component (A) and a component (B), the component (A) being a polyisocyanate that is a trimer of a diisocyanate and the component (B) being a compound containing active hydrogen and a perfluoropolyether group.

The "active hydrogen" as used herein means a hydrogen atom that can be donated as a proton to an isocyanate group.

The component (B) may contain an active-hydrogen-containing group. The "active-hydrogen-containing group as used herein means a group containing active hydrogen, and examples thereof include a —OH group, a —C(=O)H group, a —SH group, a —$SO_3H$ group, a —$SO_2H$ group, a —SOH group, a —$NH_2$ group, a —NH— group, and a —SiH group.

The component (A) is a polyisocyanate obtainable by trimerizing a diisocyanate. The polyisocyanate which is a trimer of a diisocyanate may be present in the form of a polymer thereof.

The component (A), i.e., a polyisocyanate that is a trimer of a diisocyanate, may preferably be an isocyanurate-type polyisocyanate. The isocyanurate-type polyisocyanate may be present in the form of a polymer thereof. In other words, the isocyanurate-type polyisocyanate may be a monocyclic compound containing only one isocyanurate ring, or a polycyclic compound obtainable by polymerizing this monocyclic compound, or a mixture thereof. A known example of the isocyanurate-type polyisocyanate is "Sumidur® N3300" (Sumika Bayer Urethane Co., Ltd.).

Examples of the diisocyanate to be used for producing the component (A), i.e., a polyisocyanate that is a trimer of a diisocyanate, include, but are not limited to, diisocyanates in which an isocyanate group binds to an aliphatic group, such as hexamethylene diisocyanate, isophorone diisocyanate, xylylene diisocyanate, hydrogenated xylylene diisocyanate, and dicyclohexylmethane diisocyanate; and diisocyanates in which an isocyanate group binds to an aromatic group, such as tolylene diisocyanate, diphenylmethane diisocyanate, polymethylene polyphenyl polyisocyanate, tolidine diisocyanate, and naphthalene diisocyanate.

Examples of the component (A), i.e., a polyisocyanate that is a trimer of a diisocyanate, include, but are not limited to, compounds having any of the following structures.

[Chem. 1]

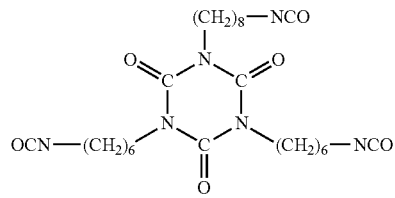

-continued

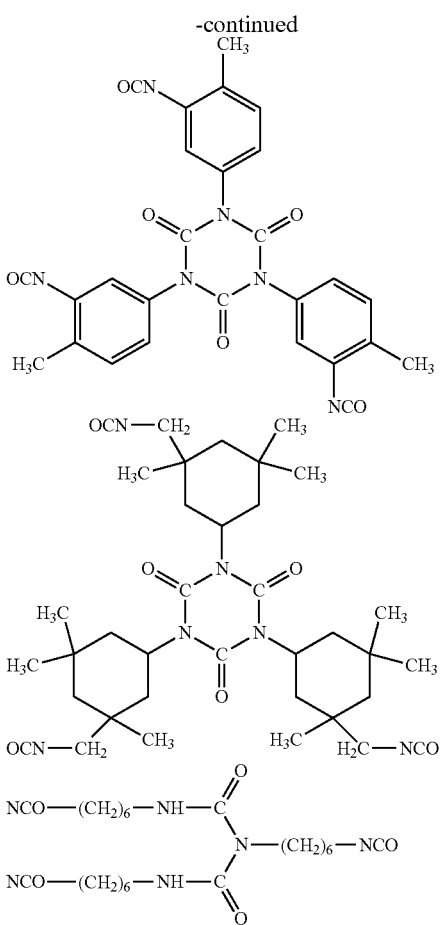

As mentioned above, these polyisocyanates may be present in the form of a polymer. For example, an isocyanurate-type polyisocyanate of hexamethylene diisocyanate may be present in the form of a polymer having the following structure.

[Chem. 2]

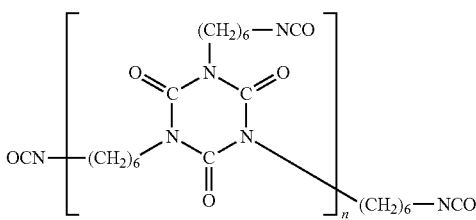

The component (B) contains a component (B1) that is an active-hydrogen-containing perfluoropolyether and a component (B2) that is a monomer containing a carbon-carbon double bond-containing group and active hydrogen.

The component (B1) is at least one compound represented by one of the following formulae (B1-i) and (B1-ii).

In the formulae (B1-i) and (B1-ii), Rf is a C1-C16 (e.g., linear or branched) alkyl group optionally substituted with one or more fluorine atoms, preferably a C1-C3 linear or branched alkyl group optionally substituted with one or more fluorine atoms. Rf is preferably linear. The alkyl group optionally substituted with one or more fluorine atoms is preferably a fluoroalkyl group in which the terminal carbon atoms are $CF_2H-$ and the other carbon atoms are each substituted with a fluorine atom, or a perfluoroalkyl group, more preferably a perfluoroalkyl group, specifically $-CF_3$, $-CF_2CF_3$, or $-CF_2CF_2CF_3$.

In the formulae (B1-i) and (B1-ii), PFPE is the aforementioned perfluoropolyether group, and is a group represented by $-(OC_6F_{12})_{m11}-(OCF_{10})_{m12}-(OC_4F)_{m13}-(OC_3X^{10}_6)_{m14}-(OC_2F_4)_{m15}-(OCF_2)_{m16}-$.

In the formulae (B1-i) and (B1-ii), Zs are each individually a divalent organic group; each Z is preferably $R^1$; and $R^1$s are each individually a group represented by $-(Y)_f-(CR^3_2)_j-$.

The "divalent organic group" as used herein means a divalent group containing carbon. The divalent organic group may be, but is not limited to, a divalent group obtained by removing another hydrogen atom from a hydrocarbon group.

The hydrocarbon group as used herein means a group containing carbon and hydrogen. Examples of the hydrocarbon group include, but are not limited to, C1-C20 hydrocarbon groups optionally substituted with one or more substituents, such as aliphatic hydrocarbon groups and aromatic hydrocarbon groups. Each aliphatic hydrocarbon group may be linear, branched, or cyclic, and may be either saturated or unsaturated. The hydrocarbon group may contain one or more cyclic structure. The hydrocarbon group may contain, at an end or in the molecular chain thereof, one or more of atoms and groups such as N, O, S, Si, amide, sulfonyl, siloxane, carbonyl, and carbonyloxy.

Examples of the substituent for the hydrocarbon group as used herein include, but are not limited to, C1-C6 alkyl groups, C2-C6 alkenyl groups, C2-C6 alkynyl groups, C3-C10 cycloalkyl groups, C3-C10 unsaturated cycloalkyl groups, 5- to 10-membered heterocyclyl groups, 5- to 10-membered unsaturated heterocyclyl groups, C6-C10 aryl groups, and 5- to 10-membered heteroaryl groups, each optionally substituted with one or more halogen atoms.

In the formula, Y is preferably a divalent polar group. Examples of the divalent polar group include, but are not limited to, $-COO-$, $-OCO-$, $-CONH-$, $-OCH_2CH(OH)CH_2-$, $-CH_2CH(OH)CH_2O-$, $-COS-$, $-SCO-$, and $-O-$. Preferred is $-COO-$, $-CONH-$, $-CH_2CH(OH) CH_2O-$, or $-O-$.

In the formula, $R^3$s at the respective occurrences are each individually a hydrogen atom or a fluorine atom.

In the formula, f is an integer of 0 to 50, preferably an integer of 0 to 20 (e.g., an integer of 1 to 20); j is an integer of 0 to 100, preferably an integer of 0 to 40 (e.g., an integer of 1 to 40); the sum of f and j is 1 or greater; and the repeating units parenthesized with f or j are present in any order in the formula.

$R^1$s represented by the above formula are preferably each individually a group represented by $-(Y)_f-(CF_2)_g-(CH_2)_h-$.

In the formula, Y and f are defined as described above; g and h are each individually an integer of 0 to 50, preferably an integer of 0 to 20 (e.g., an integer of 1 to 20); the sum of f, g, and h is 1 or greater, preferably 1 to 10; f, g, and h are each more preferably an integer of 0 to 2, still more preferably f=0 or 1, g=2, and h=0 or 1; and the repeating units parenthesized with f, g, or h are present in any order in the formula.

In the formulae (B1-i) and (B1-ii), X is an active-hydrogen-containing group. Xs are preferably each individually a —OH group, a —C(=O)H group, a —SH group, a —SO$_3$H group, a —SO$_2$H group, a —SOH group, a —NH$_2$ group, a —NH— group, or a —SiH group, more preferably a —OH group or a —NH$_2$ group, still more preferably a —OH group.

The component (B1) is preferably at least one compound represented by one of the following formulae (B1-i') and (B1-ii'), more preferably at least one compound represented by the following formula (B1-i'). In the component (B1) which is at least one compound represented by the following formula (B1-i'), PFPE is preferably a group represented by the following formula (D1).

Rf-PFPE-R—CH$_2$OH          (B1-i')

HOCH$_2$—R$^1$-PFPE-R$^1$—CH$_2$OH      (B1-ii')

In the formulae, Rf, PFPE, and R$^1$ are defined as described above.

The component (B1), i.e., an active-hydrogen-containing perfluoropolyether, is a compound containing one active-hydrogen-containing group (e.g., a hydroxy group) at one molecular end or one active-hydrogen-containing hydroxy group at each of two molecular ends in addition to the perfluoropolyether group.

The component (B1), i.e., an active-hydrogen-containing perfluoropolyether, preferably has a number average molecular weight of 500 to 12000, more preferably 1000 to 10000, still more preferably 1500 to 8000, although not limited thereto.

The number average molecular weight is determined by $^{19}$F-NMR.

The component (B2), i.e., a monomer containing a carbon-carbon double bond-containing group and active hydrogen, contains at least one (preferably one) active-hydrogen-containing group (preferably a hydroxy group) at a molecular end thereof.

The component (B2), i.e., a monomer containing a carbon-carbon double bond-containing group and active hydrogen, preferably contains, as a carbon-carbon double bond-containing group, a group represented by —OC(O)—CR$^2$=CH$_2$.

In the formula, R$^2$ is a hydrogen atom, a chlorine atom, a fluorine atom, or a C1-C10 alkyl group optionally substituted with a fluorine atom, preferably a hydrogen atom or a C1-C3 alkyl group, more preferably a hydrogen atom or a methyl group. The groups in which R$^2$ is a hydrogen atom or a methyl group, i.e., —OC(O)—CH=CH$_2$ and —OC(O)—CCH$_3$=CH$_2$ are also collectively referred to as "(meth)acrylate groups".

Examples of the component (B2) include, but are not limited to, the following compounds:

HO(CH$_2$CH$_2$)$_i$OCO(R)C=CH$_2$ wherein R is a hydrogen atom, a chlorine atom, a fluorine atom, or a C1-C10 alkyl group optionally substituted with a fluorine atom; and i is an integer of 2 to 10, such as 2-hydroxyethyl (meth)acrylate and 4-hydroxybutyl (meth)acrylate;

CH$_3$CH(OH)CH$_2$OCO(R)C=CH$_2$ wherein R is a hydrogen atom, a chlorine atom, a fluorine atom, or a C1-C10 alkyl group optionally substituted with a fluorine atom, such as 2-hydroxypropyl (meth)acrylate;

CH$_3$CH$_2$CH(OH)CH$_2$OCO(R)C=CH$_2$ wherein R is a hydrogen atom, a chlorine atom, a fluorine atom, or a C1-C10 alkyl group optionally substituted with a fluorine atom, such as 2-hydroxybutyl (meth)acrylate;

C$_6$H$_5$OCH$_2$CH(OH)CH$_2$OCO(R)C=CH$_2$ wherein R is a hydrogen atom, a chlorine atom, a fluorine atom, or a C1-C10 alkyl group optionally substituted with a fluorine atom, such as 2-hydroxy-3-phenoxypropyl (meth)acrylate;

HOCH$_2$C(CH$_2$OCO(R)C=CH$_2$)$_3$ wherein R is a hydrogen atom, a chlorine atom, a fluorine atom, or a C1-C10 alkyl group optionally substituted with a fluorine atom, such as pentaerythritol triacrylate;

C(CH$_2$CO(R)C=CH$_2$)$_3$CH$_2$OCH$_2$C(CH$_2$OCO(R)C=CH$_2$)$_2$CH$_2$OH wherein R is a hydrogen atom, a chlorine atom, a fluorine atom, or a C1-C10 alkyl group optionally substituted with a fluorine atom, such as dipentaerythritol polyacrylate;

HOCH$_2$CH$_2$OCOC$_6$H$_5$OCOCH$_2$CH$_2$OCO(R)C=CH$_2$ wherein R is a hydrogen atom, a chlorine atom, a fluorine atom, or a C1-C10 alkyl group optionally substituted with a fluorine atom, such as 2-acryloyloxyethyl-2-hydroxyethyl phthalic acid;

H(OCH$_2$CH$_2$)$_n$OCO(R)C=CH$_2$ wherein R is a hydrogen atom, a chlorine atom, a fluorine atom, or a C1-C10 alkyl group optionally substituted with a fluorine atom; and n is an integer of 1. to 30, such as poly(ethylene glycol)acrylate;

H(OCH(CH$_3$)CH$_2$)$_n$OCO(R)C=CH$_2$ wherein R is a hydrogen atom, a chlorine atom, a fluorine atom, or a C1-C10 alkyl group optionally substituted with a fluorine atom; and n is an integer of 1 to 30, such as poly(propylene glycol)acrylate;

allyl alcohol;

HO(CH$_2$)$_k$CH=CH$_2$ wherein k is an integer of 2 to 20;

(CH$_3$)$_3$SiCH(OH)CH=CH$_2$; and styryl phenols.

In an embodiment, the component (B) may contain a component (B1) and a component (B2).

The carbon-carbon double bond-containing compound contained in the compound (F) may contain groups derived from different components (B1) in one triisocyanate molecule. Also, this compound may contain groups derived from different components (B2) (e.g., components containing different numbers of carbon-carbon double bonds) in one triisocyanate molecule.

The compound (F) may contain one or more carbon-carbon double bond-containing compounds. For example, the compound (F) may be a mixture of a compound obtained by reacting the component (A), a compound B1 serving as the component (B1), and a compound B2 serving as the component (B2), and a compound obtained by reacting the component (A), a compound B1' serving as the component (B1), and a compound B2' serving as the component (B2). These compounds may be synthesized simultaneously, or may be synthesized separately and then mixed with each other.

Known Examples of the compound (F) include "Optool® DAC" and "Optool DAC-HP" available from Daikin Industries, Ltd.; "KY-1203" and "KNS5300" available from Shin- Etsu Chemical Co., Ltd.; "Megaface® RS-75", "Megaface RS-72-K", "Megaface RS-76-E", "Megaface RS-76-NS", "Megaface RS-90", "Defensae TF3028", "Defensa TF3001", and "Defensa TF3.000" available from DIC Corp.; "SUA1900L10" and "SUA1900L6" available from Shin Nakamura Chemical Co., Ltd.; and "Fluorolink® P56", "Fluorolink P54", "Fluorolink $F_{10}$", "Fluorolink A10P", "Fluorolink AD1700", "Fluorolink MD700", and "Fluorolink E10H" available from Solvay.

The compound (G) contains a perfluoropolyether group and a hydrolyzable group.

The "hydrolyzable group" as used herein means a group that can be eliminated from the main skeleton of the compound in response to a hydrolysis reaction. Examples of the hydrolyzable group include —OR, —OCOR, —O—N=CR$_2$, —NR$_2$, —NHR, and halogens, wherein R is a C1-C4 substituted or unsubstituted alkyl group. Preferred is —OR (i.e., an alkoxy group). Examples of R include unsubstituted alkyl groups such as a methyl group, an ethyl group, a propyl group, an isopropyl group, a n-butyl group, and an isobutyl group; and substituted alkyl groups such as a chloromethyl group. Preferred among these are alkyl groups, especially unsubstituted alkyl groups, more preferred is a methyl group or an ethyl group.

The compound (G) preferably contains a group represented by the following formula:

—SiR$^1_{n1}$R$^2_{3-n1}$ wherein
R$^1$ is a hydrolyzable group;
R$^2$ is a hydrogen atom or a C1-C22 alkyl group; and
n1 is an integer of 1 to 3.

The compound (G) is preferably at least one perfluoropolyether group-containing silane compound represented by any of the following formulae (A1), (A2), (B1), (B2), (C1), (C2), (D1), and (D2):

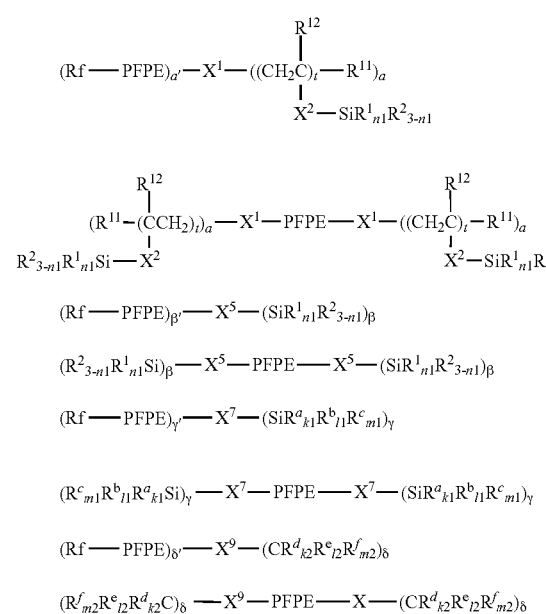

wherein
PFPEs at the respective occurrences are each individually a group represented by the following formula:

—(OC$_6$F$_{12}$)$_{m11}$—(OC$_5$F$_{10}$)$_{m12}$—(OC$_4$F$_8$)$_{m13}$—
(OC$_3$X$^{10}_6$)$_{m14}$—(OC$_2$F$_4$)$_{m15}$—(OCF$_2$)$_{m16}$— wherein m11, m12, m13, m14, m15, and m16 are each individually an integer of 0 or 1 or greater; X$^{10}$s are each individually H, F, or Cl; and the repeating units are present in any order;

Rfs at the respective occurrences are each individually a C1-C16 alkyl group optionally substituted with one or more fluorine atoms;

R$^1$s at the respective occurrences are each individually a hydrolyzable group;

R$^2$s at the respective occurrences are each individually a hydrogen atom or a C1-C22 alkyl group;

R$^{11}$s at the respective occurrences are each individually a hydrogen atom or a halogen atom;

R$^{12}$s at the respective occurrences are each individually a hydrogen atom or a lower alkyl group;

n1s are each individually an integer of 0 to 3 for each (—SiR$^1_{n1}$R$^2_{3-n1}$) unit;

in the formulae (A1), (A2), (B1), and (B2), at least one n1 is an integer of 1 to 3;

X$^1$s are each individually a single bond or a divalent to decavalent organic group;

X$^2$s at the respective occurrences are each individually a single bond or a divalent organic group;

ts at the respective occurrences are each individually an integer of 1 to 10;

αs are each individually an integer of 1 to 9;

α's are each individually an integer of 1 to 9;

X$^5$s are each individually a single bond or a divalent to decavalent organic group;

βs are each individually an integer of 1 to 9;

β's are each individually an integer of 1 to 9;

X$^7$s are each individually a single bond or a divalent to decavalent organic group;

γs are each individually an integer of 1 to 9;

γ's are each individually an integer of 1 to 9;

R$^a$s at the respective occurrences are each individually —Z$^1$—SiR$^{71}_{p1}$R$^{72}_{q1}$R$^{73}_{r1}$;

Z$^1$s at the respective occurrences are each individually an oxygen atom or a divalent organic group;

R$^{71}$s at the respective occurrences are each individually R$^{a'}$;

R$^{a'}$ is defined in the same manner as R$^a$;

in R$^a$, the number of Si atoms linearly linked via the Z$^1$ group is at most five;

R$^{72}$s at the respective occurrences are each individually a hydrolyzable group;

R$^{73}$s at the respective occurrences are each individually a hydrogen atom or a lower alkyl group;

p1s at the respective occurrences are each individually an integer of 0 to 3;

q1s at the respective occurrences are each individually an integer of 0 to 3;

r1s at the respective occurrences are each individually an integer of 0 to 3;

in the formulae (C1) and (C2), at least one q1 is an integer of 1 to 3;

R$^b$s at the respective occurrences are each individually a hydrolyzable group;

R$^c$s at the respective occurrences are each individually a hydrogen atom or a lower alkyl group;

k1s at the respective occurrences are each individually an integer of 1 to 3;

l1s at the respective occurrences are each individually an integer of 0 to 2;

m1s at the respective occurrences are each individually an integer of 0 to 2;

the sum of k1, l1, and m1 is 3 in the unit parenthesized with γ;

$X^9$s are each individually a single bond or a divalent to decavalent organic group;

δs are each individually an integer of 1 to 9;

δ's are each individually an integer of 1 to 9;

$R^d$s at the respective occurrences are each individually $-Z^2-CR^{81}_{p2}R^{82}_{q2}R^{83}_{r2}$;

$Z^2$s at the respective occurrences are each individually an oxygen atom or a divalent organic group;

$R^{81}$s at the respective occurrences are each individually $R^{d'}$;

$R^{d'}$ is defined in the same manner as $R^d$;

in $R^d$, the number of C atoms linearly linked via the $Z^2$ group is at most five;

$R^{82}$s at the respective occurrences are each individually $-Y-SiR^{85}_{n2}R^{86}_{3-n2}$;

Ys at the respective occurrences are each individually a divalent organic group;

$R^{85}$s at the respective occurrences are each individually a hydrolyzable group;

$R^{86}$s at the respective occurrences are each individually a hydrogen atom or a lower alkyl group;

n2 is an integer of 1 to 3 for each $(-Y-SiR^{85}_{n2}R^{86}_{3-n2})$ unit;

in the formulae (C1) and (C2), at least one n2 is an integer of 1 to 3;

$R^{83}$s at the respective occurrences are each individually a hydrogen atom or a lower alkyl group;

p2s at the respective occurrences are each individually an integer of 0 to 3;

q2s at the respective occurrences are each individually an integer of 0 to 3;

r2s at the respective occurrences are each individually an integer of 0 to 3;

$R^e$s at the respective occurrences are each individually $-Y-SiR^{85}_{n2}R^{86}_{3-n2}$;

$R^f$s at the respective occurrences are each individually a hydrogen atom or a lower alkyl group;

k2s at the respective occurrences are each individually an integer of 0 to 3;

l2s at the respective occurrences are each individually an integer of 0 to 3;

m2s at the respective occurrences are each individually an integer of 0 to 3;

in the formulae (D1) and (D2), at least one q2 is 2 or 3 or at least one l2 is 2 or 3, with the sum of k2, l2, and m2 being 3.

Hereinafter, the perfluoropolyether group-containing silane compound represented by any of the formulae (A1), (A2), (B1), (B2), (C1), (C2), (D1), and (D2) is described.

The formulae (A1) and (A2) are as follows.

[Chem. 4]

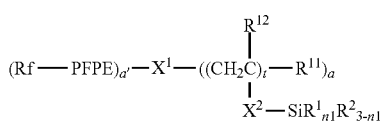

(A1)

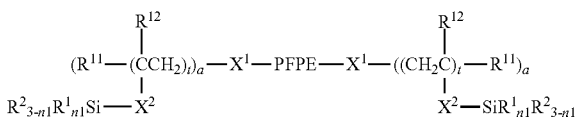

(A2)

In the formulae, PFPE is a polyether chain represented by $-(OC_6F_{12})_{m11}-(OC_5F_{10})_{m12}-(OC_4F_8)_{m13}-(OC_3X^{10}_6)_{m14}-(OC_2F_4)_{m15}-(OCF_2)_{m16}-$. $X^{10}$ is preferably F. Each of m11 to m16 is preferably an integer of 0 to 200, more preferably an integer of 0 to 100. The sum of m11 to m16 is preferably an integer of 1 or greater, more preferably an integer of 5 or greater, still more preferably an integer of 10 or greater. The sum of m11 to m16 is preferably an integer of 200 or smaller, more preferably an integer of 100 or smaller. The sum of m11 to m16 is preferably an integer of 10 to 200, more preferably an integer of 10 to 100. Each repeating unit may be linear or branched, and is preferably linear. For example, the repeating unit $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like, and is preferably $-(OCF_2CF_2CF_2CF_2CF_2CF_2)-$. The repeating unit $-(OC_5F_8)-$ may be $-(OCF_2CF_2CF_2CF_2CF_2)-$, $-(OCF(CF_3)CF_2CF_2CF_2)-$, $-(OCF_2CF(CF_3)CF_2CF_2)-$, $-(OCF_2CF_2CF(CF_3)CF_2)-$, $-(OCF_2CF_2CF_2CF(CF_3))-$, or the like, and is preferably $-(OCF_2CF_2CF_2CF_2CF_2)-$. The repeating unit $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, and is preferably $-(OCF_2CF_2CF_2CF_2)-$. The repeating unit $-(OC_3F_6)-$ may be any of $-(OCF_2CF_2CF_2)-$, $-(OCF(CF_3)CF_2)-$, and $-(OCF_2CF(CF_3))-$, and is preferably $-(OCF_2CF_2CF_2)-$. The repeating unit $-(OC_2F_4)-$ may be either of $-(OCF_2CF_2)-$ and $-(OCF(CF_3))-$, and is preferably $-(OCF_2CF_2)-$.

In an embodiment, the polyether chain is a chain represented by $-(OC_3F_6)_{m14}-$, wherein m14 is an integer of 1 to 200. The polyether chain is preferably a chain represented by $-(OCF_2CF_2CF_2)_{m4}-$, wherein m14 is an integer of 1 to 200, or a chain represented by $-(OCF(CF_3)CF_2)_{m4}-$, wherein m14 is an integer of 1 to 200, more preferably a chain represented by $-(OCF_2CF_2CF_2)_{m14}-$, wherein m14 is an integer of 1 to 200. In the formula, m14 is preferably an integer of 5 to 200, more preferably an integer of 10 to 200.

In another embodiment, the polyether chain is a chain represented by $-(OC_4F_8)_{m13}-(OC_3F_6)_{m14}-(OC_2F_4)_{m5}-(OCF_2)_{m16}-$, wherein m13 and m14 are each an integer of 0 to 30; m15 and m16 are each an integer of 1 to 200; the sum of m13 to m16 is an integer of 5 or greater; and the repeating units are present in any order. In the formula, m15 and m16 are each preferably an integer of 5 to 200, more preferably an integer of 10 to 200. The sum of m13 to m16 is preferably an integer of 10 or greater. The polyether chain is preferably $-(OCF_2CF_2CF_2CF_2)_{m13}-(OCF_2CF_2CF_2)_{m14}-(OCF_2CF_2)_{m15}-(OCF_2)_{m16}-$. In an embodiment, the polyether chain may be a chain represented by $-(OC_2F_4)_{m5}-(OCF_2)_{m16}-$, wherein m15 and m16 are each an integer of 1 to 200; and the repeating units are present in any order. In the formula, m15 and m16 are each preferably an integer of 5 to 200, more preferably an integer of 10 to 200.

In still another embodiment, the polyether chain is a group represented by —$(R^{m1}$—$R^{m2})_{m17}$—. In the formula, $R^{m1}$ is $OCF_2$ or $OC_2F_4$, preferably $OC_2F_4$. In the formula, $R^{m2}$ is a group selected from $OC_2F_4$, $OC_3F_6$, $OC_4F_8$, $OC_5F_{10}$, and $OC_6F_{12}$, or any combination of two or three groups individually selected from these groups. Preferably, $R^{m1}$ is a group selected from $OC_2F_4$, $OC_3F_6$, and $OC_4Fe$, a group selected from $OC_3F_6$, $OC_4F_8$, $OC_5F_{10}$, and $OC_6F_{12}$, or any combination of two or three groups individually selected from these groups. Examples of the combination of two or three groups individually selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4F_8OC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4F_8OC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula, m17 is an integer of 2 or greater, preferably an integer of 3 or greater, more preferably an integer of 5 or greater, while an integer of 100 or smaller, preferably an integer of 50 or smaller. In the formula, $OC_2F_4$, $OC_3F_6$, $OC_4F_8$, $OC_5F_{10}$, and $OC_6F_{12}$ each may be linear or branched, and is preferably linear. In this embodiment, the polyether chain is preferably —$(OC_2F_4$—$OC_3F_6)_{m17}$— or —$(OC_2F_4$—$OC_4F)_{m17}$—.

In the formulae, Rf is a C1-C16 alkyl group optionally substituted with one or more fluorine atoms.

The "C1-C16 alkyl group" in the C1-C16 alkyl group optionally substituted with one or more fluorine atoms may be either linear or branched, and is preferably a C1-C6, especially C1-C3, linear or branched alkyl group, more preferably a C1-C3 linear alkyl group.

Rf is preferably a C1-C16 alkyl group substituted with one or more fluorine atoms, more preferably $CF_2H$—$C_{1-15}$ fluoroalkylene group, still more preferably a C1-C1'6 perfluoroalkyl group.

The C1-C16 perfluoroalkyl group may be linear or branched, and is preferably a linear or branched C1-C6, particularly C1-C3, perfluoroalkyl group, more preferably a linear C1-C3 perfluoroalkyl group, specifically —$CF_3$, —$CF_2CF_3$, or —$CF_2CF_2CF_3$.

In the formulae, $R^1$s at the respective occurrences are each individually a hydrolyzable group.

In the formulae, $R^2$s at the respective occurrences are each individually a hydrogen atom or a C1-C22 alkyl group, preferably a C1-C4 alkyl group.

The "hydrolyzable group" as used herein means a group that can be eliminated from the main skeleton of the compound in response to a hydrolysis reaction. Examples of the hydrolyzable group include —OR, —OCOR, —O—N=$CR_2$, —$NR_2$, —NHR, and halogens, wherein R is a C1-C4 substituted or unsubstituted alkyl group. Preferred is —OR (i.e., an alkoxy group). Examples of R include unsubstituted alkyl groups such as a methyl group, an ethyl group, a propyl group, an isopropyl group, a n-butyl group, and an isobutyl group; and substituted alkyl groups such as a chloromethyl group. Preferred among these are alkyl groups, especially unsubstituted alkyl groups, more preferred is a methyl group or an ethyl group.

In the formulae, $R^{11}$s at the respective occurrences are each individually a hydrogen atom or a halogen atom. The halogen atom is preferably an iodine atom, a chlorine atom, or a fluorine atom, more preferably a fluorine atom.

In the formulae, $R^{12}$s at the respective occurrences are each individually a hydrogen atom or a lower alkyl group. The lower alkyl group is preferably a C1-C20 alkyl group, more preferably a C1-C6 alkyl group, and examples thereof include a methyl group, an ethyl group, and a propyl group.

In the formulae, n1s are each individually an integer of 0 to 3, preferably 1 to 3, more preferably 3, for each (—$SiR^1_{n1}R^2_{3-n1}$) unit. In the formulae, not all n1s are 0 simultaneously. In other words, each formula includes at least one $R^1$.

In the formulae, $X^1$s are each individually a single bond or a divalent to decavalent organic group. These $X^1$s are each recognized as a linker that links a perfluoropolyether moiety mainly providing properties such as water-repellency and surface lubricity (i.e., Rf-PFPE moiety or -PFPE- moiety) and a silane moiety providing a capability to bind to a substrate (i.e., a group parenthesized with a) in the compounds represented by the formulae (A1) and (A2). Thus, these $X^1$s each may be any organic group as long as it allows the compounds represented by the formulae (A1) and (A2) to be stably present.

In the formulae, a is an integer of 1 to 9, and α' is an integer of 1 to 9. These α and α' may vary in accordance with the valence of X. In the formula (A1), the sum of α and α' is the same as the valence of $X^1$. For example, when $X^1$ is a decavalent organic group: the sum of α and α' is 10, with a being 9 and α' being 1, a being 5 and α' being 5, or a being 1 and α' being 9, for example. When $X^1$ is a divalent organic group, α and α' are both 1. In the formula (A2), α is a value obtained by subtracting 1 from the valence of $X^1$.

$X^1$ is preferably a divalent to heptavalent, more preferably divalent to tetravalent, still more preferably divalent organic group.

In an embodiment, $X^1$ is a divalent to tetravalent organic group, α is 1 to 3, and α' is 1.

In another embodiment, $X^1$ is a divalent organic group, α is 1, and α' is 1. In this case, the formulae (A1) and (A2) are respectively represented by the following formulae (A1') and (A2').

[Chem. 5]

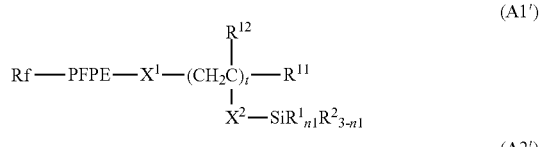

(A1')

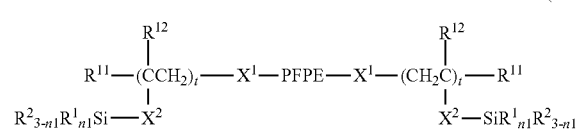

(A2')

$X^1$ may be, but is not limited to, a divalent group represented by the following formula:

$(R^{31})_p$—$(X^a)_q$—, wherein
$R^{31}$ is a single bond, —$(CH_2)_{s'}$—, or an o-, m-, or p-phenylene group, preferably —$(CH_2)_{s'}$—;
s' is an integer of 1 to 20, preferably an integer of 1 to 6, more preferably an integer of 1 to 3, still more preferably 1 or 2;

$X^a$ is $-(X^b)_{l'}-$;

$X^b$s at the respective occurrences are each individually a group selected from $-O-$, $-S-$, an o-, m-, or p-phenylene group, $-C(O)O-$, $-Si(R^{33})_2-$, $-(Si(R^{33})_2O)_{n'}-Si(R^{33})_2-$, $-CONR^{34}-$, $-O-CONR^{34}-$, $-NR^{34}-$, and $-(CH_2)_{n'}-$;

$R^{33}$s at the respective occurrences are each individually a phenyl group, a C1-C6 alkyl group, or a C1-C6 alkoxy group, preferably a phenyl group or a C1-C6 alkyl group, more preferably a methyl group;

$R^{34}$s at the respective occurrences are each individually a hydrogen atom, a phenyl group, or a C1-C6 alkyl group (preferably a methyl group);

m's at the respective occurrences are each individually an integer of 1 to 100, preferably an integer of 1 to 20;

n's at the respective occurrences are each individually an integer of 1 to 20, preferably an integer of 1 to 6, more preferably an integer of 1 to 3;

l' is an integer of 1 to 10, preferably an integer of 1 to 5, more preferably an integer of 1 to 3;

p' is 0, 1, or 2;

q' is 0 or 1; and at least one of p' or q' is 1, and the repeating units parenthesized with p' or q' are present in any order. Herein, $R^{31}$ and $X^a$ may be substituted with (typically, hydrogen atoms of $R^{31}$ and $X^a$ may be replaced by) one or more substituents selected from a fluorine atom, a C1-C3 alkyl group, and a C1-C3 fluoroalkyl group.

$X^1$ is preferably $-(R^{31})_{p'}-(X^a)_{q'}-R^{32}-$. $R^{32}$ is a single bond, $-(CH_2)_{t'}-$, or an o-, m-, or p-phenylene group, preferably $-(CH_2)_{t'}-$, where t' is an integer of 1 to 20, preferably an integer of 2 to 6, more preferably an integer of 2 or 3. Herein, $R^{32}$ may be substituted with (typically, hydrogen atoms in $R^{32}$ may be replaced by) one or more substituents selected from a fluorine atom, a C1-C3 alkyl group, and a C1-C3 fluoroalkyl group.

$X^1$ may preferably be
a C1-C20 alkylene group,
$-R^{31}-X^c-R^{32}-$, or
$-X^d-R^{32}-$
wherein $R^{31}$ and $R^{32}$ are defined as described above.

$X^1$ is more preferably
a C1-C20 alkylene group,
$-(CH_2)_{s'}-X^c-$,
$-(CH_2)_{s'}-X^c-(CH_2)_{t'}-$,
$-X^d-$, or
$-X^d-(CH_2)_{t'}-$
wherein s' and t' are defined as described above.

In the formula, $X^c$ is
$-O-$,
$-S-$,
$-C(O)O-$,
$-CONR^{34}-$,
$-O-CONR^{34}-$,
$-Si(R^{33})_2-$,
$-(Si(R^{33})_2O)_{m'}-Si(R^{33})_2-$,
$-O-(CH_2)_{u'}-(Si(R^{33})_2O)_{m'}-Si(R^{33})_2-$,
$-O-(CH_2)_{u'}-Si(R^{33})_2-O-Si(R^{33})_2-CH_2CH_2-Si(R^{33})_2-O-Si(R^{33})_2-$,
$-O-(CH_2)_{u'}-Si(OCH_3)_2OSi(OCH_3)_2-$,
$-CONR^{34}-(CH_2)_{u'}-(Si(R^{33})_2O)_{m'}-Si(R^{33})_2-$,
$-CONR^{34}-(CH_2)_{u'}-N(R^{34})-$, or
$-CONR^{34}-$(o-, m-, or p-phenylene)-$Si(R^{33})_2-$
wherein
$R^{33}$, $R^{34}$, and m' are defined as described above; and
u' is an integer of 1 to 20, preferably an integer of 2 to 6, more preferably an integer of 2 or 3. $X^c$ is preferably $-O-$.

In the formula, $X^d$ is
$-S-$,
$-C(O)O-$,
$-CONR^{34}-$,
$-CONR^{34}-(CH_2)_{u'}-(Si(R^{33})_2O)_{m'}-Si(R^{33})_2-$,
$-CONR^{34}-(CH_2)_{u'}-N(R^{34})-$, or
$-CONR^{34}-$ (o-, m-, or p-phenylene)-$Si(R^{33})_2-$
wherein the respective symbols are defined as described above.

$X^1$ may more preferably be
a C1-C20 alkylene group,
$-(CH_2)_{s'}-X^c-(CH_2)_{t'}-$, or
$-X^d-(CH_2)_{t'}-$
wherein the respective symbols are defined as described above.

$X^1$ is still more preferably
a C1-C20 alkylene group,
$-(CH_2)_{s'}-O-(CH_2)_{t'}-$,
$-(CH_2)_{s'}-(Si(R^{33})_2O)_{m'}-Si(R^{33})_2-(CH_2)_{t'}-$,
$-(CH_2)_{s'}-O-(CH_2)_{u'}-(Si(R^{33})_2O)_{m'}-Si(R^{33})_2-(CH_2)_{t'}-$, or
$-(CH_2)_{s'}-O-(CH_2)_{t'}-Si(R^{33})_2-(CH_2)_{u'}-Si(R^{33})_2-(C_vH_{2v})-$
wherein $R^{33}$, m', s', t', and u' are defined as described above; and v is an integer of 1 to 20, preferably an integer of 2 to 6, more preferably an integer of 2 or 3.

In the formula, $-(C_vH_{2v})-$ may be either linear or branched, and may be $-CH_2CH_2-$, $-CH_2CH_2CH_2-$, $-CH(CH_3)-$, or $-CH(CH_3)CH_2-$, for example.

The $X^1$ group may optionally be substituted with one or more substituent selected from a fluorine atom, a C1-C3 alkyl group, and a C1-C3 fluoroalkyl group (preferably, a C1-C3 perfluoroalkyl group).

In another embodiment, examples of the $X^1$ group include the following groups:

[Chem. 6]

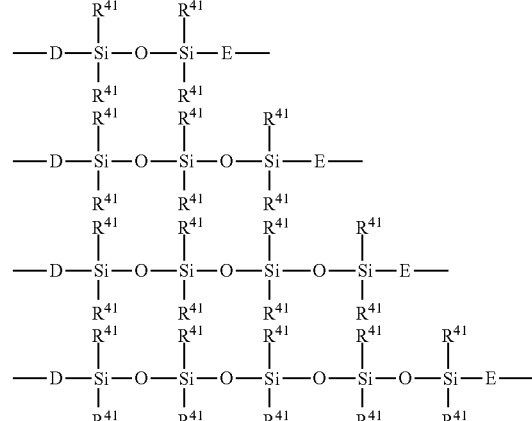

[Chem. 7]

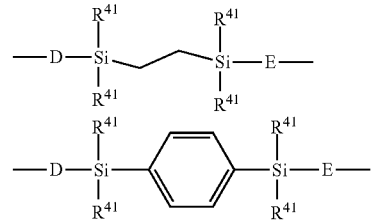

-continued

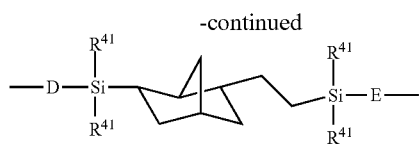

wherein
R⁴¹s are each individually a hydrogen atom, a phenyl group, a C1-C6 alkyl group, or a C1-C6 alkoxy group, preferably a methyl group;
D is a group selected from
—CH₂O(CH₂)₂—,
—CH₂O(CH₂)₃—,
—CF₂O(CH₂)₃—,
—(CH₂)₂—,
—(CH₂)₃—,
—(CH₂)₄—,
—CONH—(CH₂)₃—,
—CON(CH₃)—(CH₂)₃—,
—CON(Ph)-(CH₂)₃—, where Ph means phenyl, and

[Chem. 8]

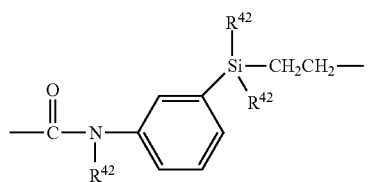

wherein R⁹²s are each individually a hydrogen atom, a C1-C6 alkyl group, or a C1-C6 alkoxy group, preferably a methyl group or a methoxy group, more preferably a methyl group;
E is —(CH₂)ₙ—, where n is an integer of 2 to 6, and
D binds to PFPE of the molecular backbone and E binds to the group opposite to PFPE.
Specific examples of X¹ include
—CH₂O(CH₂)₂—,
—CH₂O(CH₂)₃—,
—CH₂O(CH₂)₆—,
—CH₂O(CH₂)₃Si(CH₃)₂OSi(CH₃)₂(CH₂)₂—,
—CH₂O(CH₂)₃Si(CH₃)₂OSi(CH₃)₂OSi(CH₃)₂(CH₂)₂—,
—CH₂O(CH₂)₃Si(CH₃)₂O(Si(CH₃)₂O)₂Si(CH₃)₂(CH₂)₂—,
—CH₂O(CH₂)₃Si(CH₃)₂O(Si(CH₃)₂O)₃Si(CH₃)₂(CH₂)₂—
—CH₂O(CH₂)₃Si(CH₃)₂O—(Si(CH₃)₂O)₁₀Si(CH₃)₂(CH₂)₂—,
—CH₂O(CH₂)₃Si(CH₃)₂O(Si(CH₃)₂O)₂OSi(CH₃)₂(CH₂)₂—,
—CH₂OCF₂CHFOCF₂—,
—CH₂OCF₂CHFOCF₂CF₂—,
—CH₂OCF₂CHFOCF₂CF₂CF₂—,
—CH₂OCH₂CF₂CF₂₀CF₂—,
—CH₂OCH₂CF₂CF₂OCF₂CF₂—,
—CH₂OCH₂CF₂C F₂OCF₂CF₂C F₂—,
—CH₂OCH₂CF₂CF₂OCF(CF₃) CF₂OCF₂—,
—CH₂OCH₂CF₂CF₂OCF(CF₃) CF₂OCF₂CF₂—,
—CH₂OCH₂CF₂CF₂OCF(CF₃) CF₂OCF₂CF₂CF₂—,
—CH₂OCH₂CHFCF₂OCF₂—,
—CH₂OCH₂CHFCF₂OCF₂CF₂—,
—CH₂OCH₂CHFCF₂OC F₂CF₂CF₂—,
—CH₂OCH₂CHFCF₂OCF(CF₃) CF₂OCF₂—,
—CH₂OCH₂CHFCF₂OCF(CF₃) CF₂OCF₂CF₂—,
—CH₂OCH₂CHFCF₂OCF(CF₃) CF₂OCF₂CF₂CF₂—, —CH₂OCH₂ (CH₂)₇CH₂Si(OCH₃)₂OSi(OCH₃)₂(CH₂)₂Si(OCH₃)₂OSi(OCH₃)₂(CH₂)₂—,
—CH₂OCH₂CH₂CH₂Si(OCH₃)₂OSi(OCH₃)₂(CH₂)₃—,
—CH₂OCH₂CH₂CH₂Si(OCH₂CH₃)₂OSi(OCH₂CH₃)₂(CH₂)₃—,
—CH₂OCH₂CH₂CH₂Si(OCH₃)₂OSi(OCH₃)₂(CH₂)₂—,
—CH₂OCH₂CH₂CH₂Si(OCH₂CH₃)₂OSi(OCH₂CH₃)₂(CH₂)₂—,
—(CH₂)₂—,
—(CH₂)₃—,
—(CH₂)₄—,
—(CH₂)₅—,
—(CH₂)₆—,
—(CH₂)₂—Si(CH₃)₂—(CH₂)₂—,
—CONH—(CH₂)₃—,
—CON(CH₃)—(CH₂)₃—,
—CON(Ph)-(CH₂)₃—, where Ph means phenyl,
—CONH—(CH₂)₆—,
—CON(CH₃)—(CH₂)₆—,
—CON(Ph)-(CH₂)₆—, where Ph- means phenyl,
—CONH—(CH₂)₂NH(CH₂)₃—,
—CONH—(CH₂)₆NH(CH₂)₃—,
—CH₂O—CONH—(CH₂)₃—,
—CH₂O—CONH—(CH₂)₆—,
—S—(CH₂)₃—,
—(CH₂)₂S(CH₂)₃—,
—CONH—(CH₂)₃Si(CH₃)₂OSi(CH₃)₂(CH₂)₂—,
—CONH—(CH₂)₃Si(CH₃)₂OSi(CH₃)₂OSi(CH₃)₂(CH₂)₂—,
—CONH—(CH₂)₃Si(CH₃)₂O(Si(C(CH₃)₂O)₂Si(CH₃)₂(CH₂)₂—,
—CONH—(CH₂)₃Si(CH₃)₂O(Si(CH₃)₂O)₃Si(CH₃)₂(CH₂)₂—,
—CONH—(CH₂)₃Si(CH₃)₂O(Si(CH₃)₂O)₁₀Si(CH₃)₂(CH₂)₂—,
—CONH—(CH₂)₃Si(CH₃)₂O(Si(CH₃)₂O)₂Si(CH₃)₂(CH₂)₂—,
—C(O)O—(CH₂)₃—,
—C(O)O—(CH₂)₆—,
—CH₂—O—(CH₂)₃—Si(CH₃)₂—(CH₂)₂—Si(CH₃)₂—(CH₂)₂—,
—CH₂—O—(CH₂)₃—Si(CH₃)₂—(CH₂)₂—Si(CH₃)₂—CH(CH₃)—,
—CH₂—O—(CH₂)₃—Si(CH₃)₂(CH₂)₂—(CH₃)₂—(CH₂)₃—,
—CH₂—O—(CH₂)₃—Si(CH₃)₂—(CH₂)₂—Si(CH₃)₂—CH(CH₃)—CH₂—,
—OCH₂—,
—O(CH₂)₃—,
—OCFHCF₂—, and

[Chem. 9]

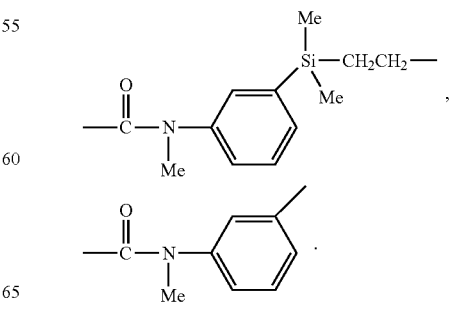

In still another embodiment, $X^1$ is a group represented by —$(R^{16})_x$—$(CFR^{17})_y$—$(CH_2)_z$—, wherein x, y, and z are each individually an integer of 0 to 10; the sum of x, y, and z is 1 or greater; and the parenthesized repeating units are present in any order.

In the formula, $R^{16}$s at the respective occurrences are each individually an oxygen atom, phenylene, carbazolylene, —$NR^{26}$— (wherein $R^{26}$ is a hydrogen atom or an organic group), or a divalent organic group. $R^{16}$ is preferably an oxygen atom or a divalent polar group.

Examples of the "divalent polar group" include, but are not limited to, —C(O)—, —C(=$NR^{27}$)—, and —C(O)$NR^{27}$—, wherein $R^{27}$ is a hydrogen atom or a lower alkyl group. The "lower alkyl group" is a C1-C6 alkyl group, such as methyl, ethyl, or n-propyl, and may optionally be substituted with one or more fluorine atoms.

In the formula, $R^{17}$s at the respective occurrences are each individually a hydrogen atom, a fluorine atom, or a lower fluoroalkyl group, preferably a fluorine atom. The "lower fluoroalkyl group" may be a C1-C6, preferably C1-C3, fluoroalkyl group, preferably a C1-C3 perfluoroalkyl group, more preferably a trifluoromethyl group or a pentafluoroethyl group, still more preferably a trifluoromethyl group.

In this embodiment, $X^1$ is preferably a group represented by —$(O)_x$—$(CF_2)_y$—$(CH_2)_z$—, wherein x, y, and z are defined as described above, and the parenthesized repeating units are present in any order.

Examples of the group represented by —$(O)_x$—$(CF_2)_y$—$(CH_2)_z$— include —$(O)_{x'}$—$(CH_2)_{z'}$—O—[$(CH_2)_{z''}$—O-$]_{z'''}$ and —$(O)_{x'}$—$(CF_2)_{y'}$—$(CH_2)_{z'}$—O—[$(CH_2)_{z''}$—O-$]_{z'''}$, wherein x' is 0 or 1; y", z", and z''' are each individually an integer of 1 to 10; and z'''' is 0 or 1. Each of these groups, at the left end thereof, binds to the PFPE side.

In another preferred embodiment, $X^1$ is —O—$CFR^{13}$—$(CF_2)_e$—

$R^{13}$s are each individually a fluorine atom or a lower fluoroalkyl group. The lower fluoroalkyl group may be a C1-C3 fluoroalkyl group, preferably a C1-C3 perfluoroalkyl group, more preferably a trifluoromethyl group or a pentafluoroethyl group, still more preferably a trifluoromethyl group.

In the formula, es are each individually 0 or 1.

In a specific example, $R^{13}$ is a fluorine atom and e is 1.

In still another embodiment, examples of the $X^1$ group include the following groups:

[Chem. 10]

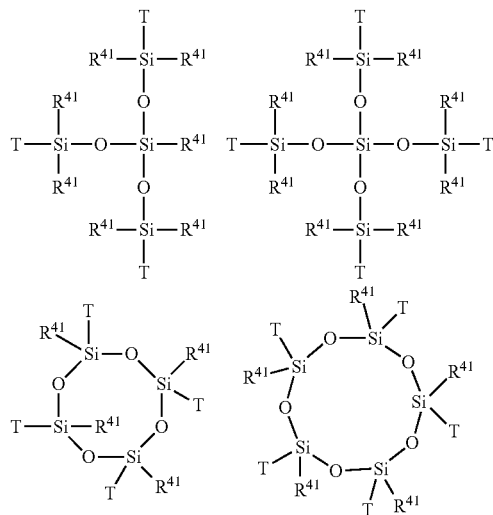

-continued

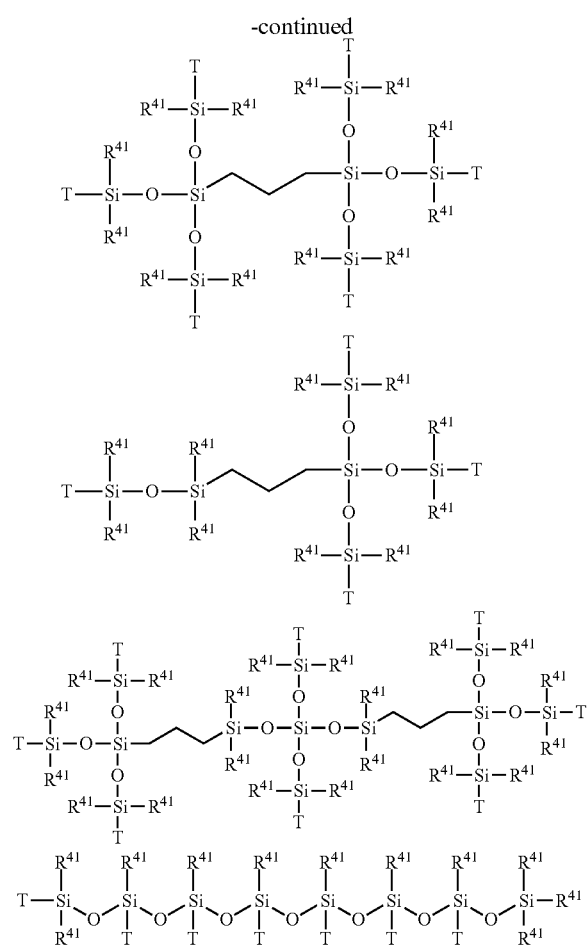

wherein
$R^{41}$s are each individually a hydrogen atom, a phenyl group, a C1-C6 alkyl group, or a C1-C6 alkoxy group, preferably a methyl group;

In each $X^1$ group, some of Ts are any of the following groups binding to PFPE of the molecular backbone:
—$CH_2O(CH_2)_2$—,
—$CH_2O(CH_2)_3$—,
—$CF_2O(CH_2)_3$—,
—$(CH_2)_2$—,
—$(CH_2)_3$—,
—$(CH_2)_4$—,
—CONH—$(CH_2)_3$—,
—CON($CH_3$)—$(CH_2)_3$—,
—CON(Ph)-$(CH_2)_3$—, where Ph means phenyl, or

[Chem. 11]

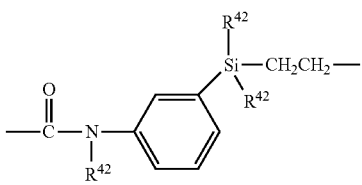

wherein $R^{42}$s are each individually a hydrogen atom, a C1-C6 alkyl group, or a C1-C6 alkoxy group, preferably a methyl group or a methoxy group, more preferably a methyl group;

some other Ts are —$(CH_2)_{n''}$— (where n" is an integer of 2 to 6) binding to a group opposite to PFPE of the molecular backbone (i.e., a carbon atom in the formulae (A1), (A2), (D1), and (D2) or a Si atom in the following formulae (B1), (B2), (C1), and (C2)); and the residues, if present, each may individually be a methyl group, a phenyl group, a C1-C6 alkoxy group, a radical scavenging group, or an ultraviolet absorbing group.

The radical scavenging group may be any group capable of scavenging a radical generated by light application, and examples thereof include residues of benzophenones, benzotriazoles, benzoic acid esters, phenyl salicylates, crotonic acids, malonic acid esters, organoacrylates, hindered amines, hindered phenols, and triazines.

The ultraviolet absorbing group may be any group capable of absorbing ultraviolet rays, and examples thereof include residues of benzotriazoles, hydroxy benzophenones, esters of substituted or unsubstituted benzoic or salicylic acid compounds, acrylates and alkoxy cinnamates, oxamides, oxanilides, benzoxazinones, and benzoxazoles.

In a preferred embodiment, examples of preferred radical scavenging groups and ultraviolet absorbing groups include the following.

[Chem. 12]

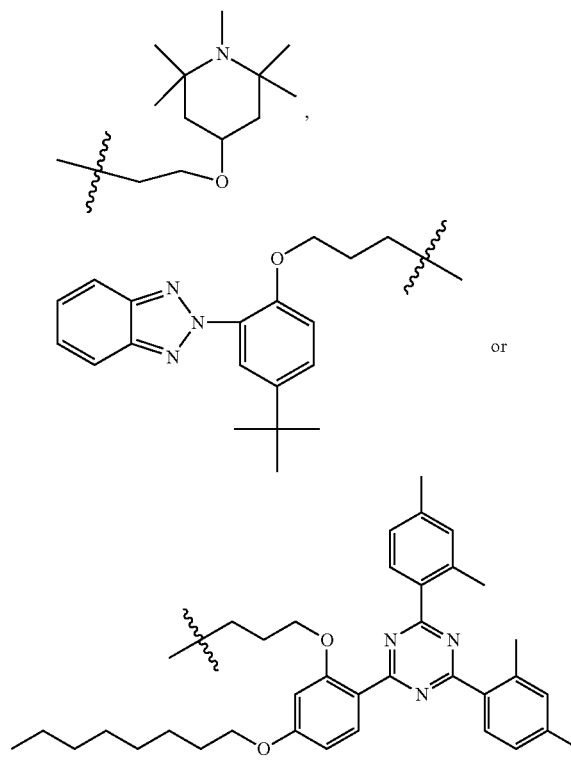

In this embodiment, $X^1$s each may individually be a trivalent to decavalent organic group.

In the formulae, ts are each individually an integer of 1 to 10. In a preferred embodiment, t is an integer of 1 to 6. In another preferred embodiment, t is an integer of 2 to 10, preferably an integer of 2 to 6.

In the formulae, $X^2$s at the respective occurrences are each individually a single bond or a divalent organic group. $X^2$ is preferably a C1-C20 alkylene group, more preferably —$(CH_2)_u$—, wherein u is an integer of 0 to 2.

The compounds represented by the formulae (A1) and (A2) are preferably compounds respectively represented by the following formulae (A1') and (A2'):

[Chem. 13]

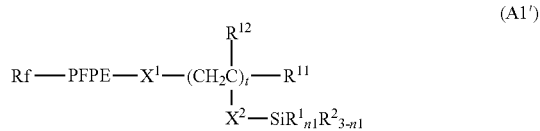 (A1')

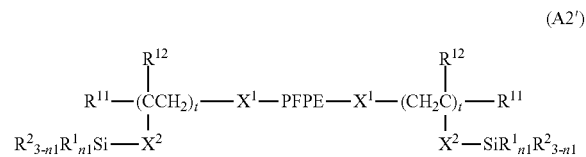 (A2')

wherein
PFPEs are each individually a group represented by the following formula:

$(OC_6F_{12})_{m11}$—$(OC_5F_{10}))_{m12}$—$(OC_4F_8)_{m13}$—$(OC_3F_4X^{10}{}_6)_{m14}$—$(OC_2F_4)_{m15}$—$(OCF_2)_{m16}$— wherein
m11, m12, m13, m14, m15, and m16 are each individually an integer of 0 or 1 or greater; $X^{10}$s are each individually H, F, or Cl; and the repeating units are present in any order;

Rfs at the respective occurrences are each individually a C1-C16 alkyl group optionally substituted with one or more fluorine atoms;

$R^1$s at the respective occurrences are each individually a hydrolyzable group;

$R^2$s at the respective occurrences are each individually a hydrogen atom or a C1-C22 alkyl group;

$R^{11}$s at the respective occurrences are each individually a hydrogen atom or a halogen atom;

$R^{12}$s at the respective occurrences are each individually a hydrogen atom or a lower alkyl group;

n1 is an integer of 1 to 3, preferably 3;

$X^1$ is —O—$CFR^{13}$—$(CF_2)_a$—;

$R^{13}$ is a fluorine atom or a lower fluoroalkyl group;

e is 0 or 1;

$X^2$ is —$(CH_2)_u$—;

u is an integer of 0 to 2 (when u is 0, $X^2$ is a single bond); and t is an integer of 1 to 10.

The compounds represented by the formulae (A1) and (A2) may be obtainable by introducing, into an end thereof, iodine generated from a material that is a perfluoropolyether derivative that corresponds to an Rf-PFPE-moiety, and allowing it to react with a vinyl monomer that corresponds to —$CH_2CR^{12}(X^2$—$SiR^1{}_{n1}R^2{}_{3-n1})$—

The formulae (B1) and (B2) are as follows.

[Chem. 14]

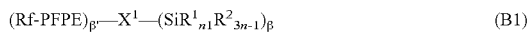 (B1)

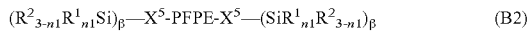 (B2)

In the formulae (B1) and (B2), Rf, PFPE, $R^1$, $R^2$, and n1 are defined as described for the formulae (A1) and (A2).

In the formulae, $X^5$s are each individually a single bond or a divalent to decavalent organic group. These $X^5$s are each recognized as a linker that links a perfluoropolyether moiety mainly providing properties such as water-repellency and surface lubricity (Rf-PFPE moiety or -PFPE- moiety)

and a silane moiety providing a capability to bind to a substrate (specifically, —SiR$^1_{n1}$R$^2_{3-n1}$) in the compounds represented by the formulae (B1) and (B2). Thus, these X$^5$s each may be any organic group as long as it allows the compounds represented by the formulae (B1) and (B2) to be stably present.

In the formulae, 1 is an integer of 1 to 9, and p' is an integer of 1 to 9. These β and β' are determined in accordance with the valence of X$^3$. In the formula (B1), the sum of β and β' is the same as the valence of X$^5$. For example, when X$^5$ is a decavalent organic group, the sum of β and β' is 10, with p being 9 and β' being 1, β being 5 and β' being 5, or β being 1 and β' being 9, for example. When X$^5$ is a divalent organic group, β and β' are both 1. In the formula (B2), β is a value obtained by subtracting 1 from the valence of X$^5$.

X$^5$ is preferably a divalent to heptavalent, more preferably divalent to tetravalent, still more preferably divalent organic group.

In an embodiment, X$^5$ is a divalent to tetravalent organic group, β is 1 to 3, and β' is 1.

In another embodiment, X$^5$ is a divalent organic group, β is 1, and β' is 1. In this case, the formulae (B1) and (B2) are respectively represented by the following formulae (B1') and (B2').

[Chem. 15]

(Rf-PFPE)-X$^5$—(SiR$^1_{n1}$R$^2_{3n-1}$)  (B1')

R$^2_{3-n1}$R$^1_{n1}$Si—X$^5$-PFPE-X$^5$—(SiR$^1_{n1}$R$^2_{3-n1}$)  (B2')

Examples of X$^5$ include, but are not limited to, those described for X$^1$.

Preferred specific examples of X$^5$ include the following.
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$Si(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$)$_2$O)$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$) CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$) CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(CF$_3$) CF$_2$OCF$_2$CF$_2$—,
—CH$_2$OCH$_2$CHFCF$_2$OCF(CF$_3$.) CF$_2$OCF$_2$CF$_2$CF$_2$—,
—CH$_2$OCH$_2$(CH$_2$)$_7$CH$_2$Si(OCR$_3$)$_2$OCOCH$_3$)$_2$(CH$_2$)$_2$Si (OCH$_3$)$_2$OSi(OCH$_3$)$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—(CH$_2$)$_2$—Si(CH$_3$)$_2$—(CH$_2$)$_2$—,
—CONH—(CH$_2$)$_3$—,
—CON(CH$_3$)—(CH$_2$)$_3$—,
—CON(Ph)-(CH$_2$)$_3$—, where Ph means phenyl,
—CONH—(CH$_2$)$_6$—,
—CON(CH$_3$)—(CH$_2$)$_6$—,
—CON(Ph)-(CH$_2$)—, where Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$O(Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(CH$_2$)$_2$—,
—CH$_2$—O—(CH$_2$)$_3$—Si(CH$_3$)$_2$—(CH$_3$)$_2$—Si(CH$_3$)$_2$—CH(CH$_3$)—,
—CH$_2$—O—(CH$_2$)$_3$—Si(CH$_3$)$_2$(CH$_3$)$_2$—(CH$_2$)$_2$—Si(CH$_3$)$_2$(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

[Chem. 16]

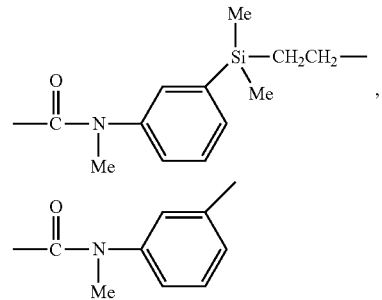

The compounds represented by the formulae (B1) and (B2) are preferably compounds respectively represented by the following formulae (B1') and (B2'):

[Chem. 17]

$$(Rf\text{-}PFPE)\text{-}X^5-(SiR^1{}_{n1}R^2{}_{3n\text{-}1}) \quad (B1')$$

$$R^2{}_{3\text{-}n1}R^1{}_{n1}Si-X^5\text{-}PFPE\text{-}X^5-(SiR^1{}_{n1}R^2{}_{3\text{-}n1}) \quad (B2')$$

wherein

PFPEs are each individually a group represented by the following formula:

$$-(OC_6F_{12})_{m11}-(OC_5F_{10})_{m12}-(OC_4F_8)_{m13}-$$
$$(OC_3X^{10}{}_6)_{m14}-(OC_2F_4)_{m15}-(OCF_2)_{m16}-$$

wherein m11, m12, m13, m14, m15, and m16 are each individually an integer of 0 or 1 or greater; $X^{10}$s are each individually H, F, or Cl; and the repeating units are present in any order;

Rfs at the respective occurrences are each individually a C1-C16 alkyl group optionally substituted with one or more fluorine atoms;

$R^1$s at the respective occurrences are each individually a hydrolyzable group;

$R^2$s at the respective occurrences are each individually a hydrogen atom or a C1-C22 alkyl group;

n1 is an integer of 1 to 3, preferably 3; and $X^5$ is $-CH_2O(CH_2)_2-$, $-CH_2O(CH_2)_3-$, or $-CH_2O(CH_2)_6-$.

The compounds represented by the formulae (B1) and (B2) may be produced by a known method such as the method disclosed in Patent Literature 1 or a modified method thereof. For example, the compounds represented by the formulae (B1) and (B2) are each obtainable by reacting a compound represented by the following formula (B1-4) or (B2-4):

[Chem. 18]

$$(Rf\text{-}PFPE)_{\beta'}-X^5-(R^{92}-CH=CH_2)_\beta \quad (B1\text{-}4)$$

$$(CH_2=CH-R^{92})_\beta-X^5\text{-}PFPE\text{-}X^5-(R^{92}-CH=CH_2)_\beta \quad (B2\text{-}4)$$

(wherein

PFPEs are each individually a group represented by the following formula:

$$(OC_6F_{12})_{m11}-(OC_5F_{10}))_{m12}-(OC_4F_8)_{m13}-$$
$$(OC_3X^{10}{}_6)_{m14}-(OC_2F_4)_{m15}-(OCF_2)_{m16}-$$

wherein m11, m12, m13, m14, m15, and m16 are each individually an integer of 0 or 1 or greater; $X^{10}$s are each individually H, F, or Cl; and the repeating units are present in any order;

Rfs at the respective occurrences are each individually a C1-C16 alkyl group optionally substituted with one or more fluorine atoms;

$X^5$s are each individually a single bond or a divalent to decavalent organic group;

βs are each individually an integer of 1 to 9;

β's are each individually an integer of 1 to 9; and $R^{92}$ is a single bond or a divalent organic group) and $HSiM_3$ (wherein Ms are each individually a halogen atom, $R^1$, or $R^2$, where $R^1$s at the respective occurrences are each individually a hydrolyzable group; and $R^2$s at the respective occurrences are each individually a hydrogen atom or a C1-C22 alkyl group), and if necessary, converting the halogen atom into $R^1$ or $R^2$, whereby the compound is obtained as a compound represented by the following formula (B1") or (B2"):

[Chem. 19]

$$(Rf\text{-}PFPE)_{\beta'}-X^5-(R^{92}-CH_2CH_2-SiR^1{}_{n1}R^2{}_{3\text{-}n1})_\beta \quad (B1'')$$

$$(R^1{}_{n1}R^2{}_{3n\text{-}1}Si-CH_2CH_2-R^{92})_\beta-X^{5'}\text{-}PFPE\text{-}X^{5'}-**$$
$$(R^{92}-CH_2CH_2-SiR^1{}_{n1}R^2{}_{3\text{-}n1})_\beta \quad (B2'')$$

wherein PFPE, Rf, $X^{5'}$, β, β', and $R^{92}$ are defined as described above; and n1 is an integer of 0 to 3.

In the formula (B1") or (B2"), the moiety from $X^{5'}$ to $R^{92}-CH_2CH_2-$ corresponds to $X^5$ in the formula (B1) or (B2).

The formulae (C1) and (C2) are as follows.

[Chem. 20]

$$(Rf\text{-}PFPE)_\gamma-X^7-(SiR^a{}_{k1}R^b{}_{l1}R^c{}_{m1})_{\gamma'} \quad (C1)$$

$$(R^c{}_{m1}R^b{}_{l1}R^a{}_{k1}Si)_\gamma-X^7\text{-}PFPE\text{-}X^7-(SiR^a{}_{k1}R^b{}_{l1}R^c{}_{m1})_{\gamma'} \quad (C2)$$

In the formulae (C1) and (C2), Rf and PFPE are defined as described for the formulae (A1) and (A2).

In the formulae, $X^7$s are each individually a single bond or a divalent to decavalent organic group. These $X^7$s are each recognized as a linker that links a perfluoropolyether moiety mainly providing properties such as water-repellency and surface lubricity (Rf-PFPE moiety or -PFPE- moiety) and a silane moiety providing a capability to bind to a substrate (specifically, a $-SiR^a{}_{k1}R^b{}_{l1}R^c{}_{m1}$ group) in the compounds represented by the formulae (C1) and (C2). Thus, these $X^7$s each may be any organic group as long as it allows the compounds represented by the formulae (C1) and (C2) to be stably present.

In the formulae, γ is an integer of 1 to 9, and γ' is an integer of 1 to 9. These γ and γ' are determined in accordance with the valence of $X^7$. In the formula (C1), the sum of γ and γ' is the same as the valence of $X^7$. For example, when $X^7$ is a decavalent organic group, the sum of γ and γ' is 10, with γ being 9 and γ' being 1, γ being-5 and γ' being 5, or γ being 1 and γ' being 9, for example. When $X^7$ is a divalent organic group, γ and γ' are both 1. In the formula (C1), γ is a value obtained by subtracting 1 from the valence of $X^7$.

$X^7$ is preferably a divalent to heptavalent, more preferably divalent to tetravalent, still more preferably divalent organic group.

In an embodiment, $X^7$ is a divalent to tetravalent organic group, γ is 1 to 3, and γ' is 1.

In another embodiment, $X^7$ is a divalent organic group, γ is 1, and γ' is 1. In this case, the formulae (C1) and (C2) are respectively represented by the following formulae (C1') and (C2').

[Chem. 21]

$$Rf\text{-}PFPE\text{-}X^7-SiR^a{}_{k1}R^b{}_{l1}R^c{}_{m1} \quad (C1')$$

$$R^c{}_{m1}R^b{}_{l1}R^a{}_{k1}Si-X^7\text{-}PFPE\text{-}X^7-SiR^a{}_{k1}R^b{}_{l1}R^c{}_{m1} \quad (C2')$$

Examples of $X^7$ include, but are not limited to, those described for $X^1$.

Preferred specific examples of $X^7$ include the following.

$-CH_2O(CH_2)_2-$, $-CH_2O(CH_2)_3-$ $-CH_2O(CH_2)_6-$, $-CH_2O(CH_2)_3Si(CH_3)_2OSi(CH_3)_2(CH_2)_2-$, $-CH_2O(CH_2)_3Si(CH_3)_2OSi(CH_3)_2O)Si(CH_3)_2(CH_2)_2-$, $-CH_2O(CH_2)_3Si(CH_3)_2O(Si(CH_3)_2O)_2Si(CH_3)_2(CH_2)_2-$, $-CH_2O(CH_2)_3Si(CH_3)_2O(Si(CH_3)_2O)_3Si(CH_3)_2(CH_2)_2-$, $-CH_2O(CH_2)_3Si(CH_3)_2O(Si(CH_3)_2O)_{10}Si(CH_3)_2(CH_2)_2-$,

—CH$_2$O(CH$_2$)$_3$Si(CH$_3$)$_2$O(Si(CH$_3$)$_2$O)$_{20}$Si(CH$_3$)$_2$(CH$_2$)$_2$—,
—CH$_2$OCF$_2$CHFOCF$_2$CF$_2$—,
—CH$_2$OCF$_2$CHFOCF$_2$CF$_2$CF$_2$—,
—CH$_2$OCF$_2$CHFOCF$_2$OCF$_2$CF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$) CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$) CF$_2$OCF$_2$CF$_2$CF$_2$—,
—CH$_2$OCH$_2$CHFCF$_2$OC F$_2$—,
—CH$_2$OCH$_2$CHFCF$_2$OC F$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(CF$_3$) CF$_2$OCF$_2$CF$_2$—,
—CH$_2$OCH$_2$CHFCF$_2$OCF(CF$_3$—) CF$_2$OCF$_2$CF$_2$CF$_2$—,
—CH$_2$OCH$_2$ (CH$_2$)$_7$CH$_2$Si(OCH$_3$)$_2$OSi(OCH$_3$)$_2$(CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_2$—Si(CH$_3$)$_2$—(CH$_2$)$_2$—,
—CONH—(CH$_2$)$_3$—,
—CON(CH$_3$)—(CH$_2$)$_3$—,
—CON(Ph)-(CH$_2$)$_3$—, where Ph means phenyl,
—CONH—(CH$_2$)$_6$—,
—CON(CH$_3$)—(CH$_2$)$_6$—,
—CON(Ph)-(CH$_2$)$_6$—, where Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_2$OSi(Si(CH$_3$)$_2$O)$_2$Si(CH$_3$)$_2$—(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH) 2 (CH$_2$)$_2$—,
—C(O)O—(CH$_2$)$_3$—,
—C(O)O—(CH$_2$)$_6$—,
—CH$_2$—O—(CH$_2$)$_3$—Si(CH$_3$)$_2$—(CH$_2$)$_2$—Si(CH$_3$)$_2$—(C$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

[Chem. 22]

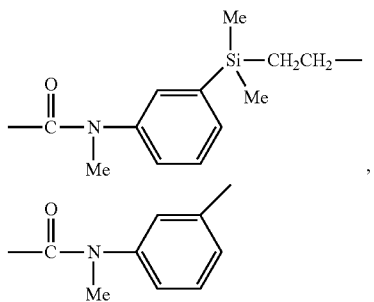

In the formulae, $R^a$s at the respective occurrences are each individually —Z$^1$—SiR$^{71}_{p1}$R$^{72}_{q1}$R$^{73}_{r1}$.

In the formulae, $Z^1$s at the respective occurrences are each individually an oxygen atom or a divalent organic group.

$Z^1$ is preferably a divalent organic group, and excludes those forming a siloxane bond with a Si atom at an end of the molecular backbone (Si atom to which $R^a$ binds) in the formula (C1) or the formula (C2).

$Z^1$ is preferably a C1-C6 alkylene group, —(CH$_2$)$_g$—O—(CH$_2$)$_h$— (wherein g is an integer of 1 to 6; and h is an integer of 1 to 6), or -phenylene-(CH$_2$)$_i$— (wherein i is an integer of 0 to 6), more preferably a C1-C3 alkylene group. These groups may be substituted with one or more substituents selected from a fluorine atom, a C1-C6 alkyl group, a C2-C6 alkenyl group, and a C2-C6 alkynyl group.

In the formula, $R^{71}$s at the respective occurrences are each individually $R^{a'}$. $R^{a'}$ is defined in the same manner as $R^a$.

In $R^a$, the number of Si atoms linearly linked via the $Z^1$ group is at most five. In other words, when $R^a$ contains at least one $R^{71}$, there are two or more Si atoms linearly linked via the $Z^1$ group in $R^a$, and the number of Si atoms linearly linked via such a $Z^1$ group is at most five. The "number of Si atoms linearly linked via the $Z^1$ group in $R^a$" is equal to the repeating number of —Z$^1$—Si— linearly linked in $R^a$.

For example, the following shows an example of Si atom linkage via the $Z^1$ group (in the following, simply expressed as "Z") in $R^a$.

[Chem. 23]

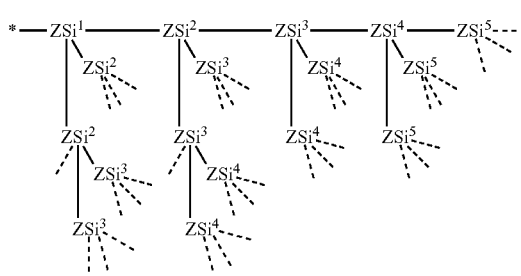

In the formula, the symbol * represents the site binding to Si in the main chain; and the symbol . . . represents binding of a predetermined group other than ZSi. In other words, when all of the three bindings of a Si atom are represented by the symbol . . . , it means the site where repeat of ZSi is finished. The superscript immediately after Si is the occurrence number of Si atoms linearly linked from the symbol * via the Z group. In other words, when the ZSi repeating is finished at Si$^2$, the chain is considered as including two "Si atoms linearly linked via the $Z^1$ group in $R^a$". Similarly, when ZSi repeating is finished at $Si^3$, $Si^4$, and $Si^5$, the chain includes three, four, and five "Si atoms linearly linked via the $Z^1$ group in $R^a$", respectively. As is clear from the above formula, a plurality of ZSi chains is present in $R^a$. Still, they need not to be the same length, and may have the respective lengths.

In a preferred embodiment, the "number of Si atoms linearly linked via the $Z^1$ group in $R^a$" in each chain is one (left formula) or two (right formula), as shown below.

[Chem. 24]

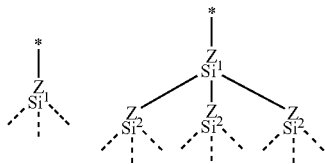

In an embodiment, the number of Si atoms linearly linked via the $Z^1$ group in $R^a$ is one or two, preferably one.

In the formula, $R^{72}$s at the respective occurrences are each individually a hydrolyzable group.

The "hydrolyzable group" as used herein means a group that may be influenced by a hydrolysis reaction. Examples of the hydrolyzable group include —OR, —OCOR, —O—N=C(R)$_2$, —N(R)$_2$, —NHR, and halogens, where R is a C1-C4 substituted or unsubstituted alkyl group. Preferred is —OR (an alkoxy group). Examples of R include unsubstituted alkyl groups such as a methyl group, an ethyl group, a propyl group, an isopropyl group, a n-butyl group, and an isobutyl group; and substituted alkyl groups such as a chloromethyl group. Preferred among these are alkyl groups, especially unsubstituted alkyl groups, and more preferred is a methyl group or an ethyl group.

$R^{72}$ is preferably —OR, wherein R is a C1-C3 substituted or unsubstituted alkyl group, more preferably a methyl group.

In the formula, $R^{73}$s at the respective occurrences are each individually a hydrogen atom or a lower alkyl group. The lower alkyl group is preferably a C1-C20 alkyl group, more preferably a C1-C6 alkyl group, still more preferably a methyl group.

In the formula, p1s at the respective occurrences are each individually an integer of 0 to 3; q1s at the respective occurrences are each individually an integer of 0 to 3; r1s at the respective occurrences are each individually an integer of 0 to 3; and the sum of p1, q1, and r1 is 3.

In a preferred embodiment, in $R^{a'}$ (or $R^a$ if no $R^a$ is present) at an end of $R^a$, q1 is preferably 2 or greater, for example 2 or 3, more preferably 3.

In a preferred embodiment, at least one end of $R^a$ may be —Si(—$Z^1$—Si$R^{72}{}_qR^{73}{}_r$)$_2$ or —Si(—$Z^1$—Si$R^{72}{}_qR^{73}{}_r$)$_3$, preferably —Si(—$Z^1$—Si$R^{72}R^{73}{}_r$)$_3$. In the formula, the (—$Z^1$—Si$R^{72}{}_qR^{73}{}_r$) unit is preferably (—$Z^1$—Si$R^{72}{}_3$). In a more preferred embodiment, all the ends of $R^a$ may be —Si(—Z—Si$R^{72}{}_qR^{73}{}_r$)$_3$, preferably —Si(—$Z^1$—Si$R^{72}{}_3$)$_3$.

The formulae (C1) and (C2) each include at least one $R^{72}$.

In the formulae, $R^b$s at the respective occurrences are each individually a hydrolyzable group.

$R^b$ is preferably —OR, —OCOR, —O—N=C(R)$_2$, —N(R)$_2$, —NHR, or a halogen, where R is a C1-C4 substituted or unsubstituted alkyl group, preferably —OR. R includes unsubstituted alkyl groups such as a methyl group, an ethyl group, a propyl group, an isopropyl group, a n-butyl group, and an isobutyl group; and substituted alkyl groups such as a chloromethyl group. Preferred among these are alkyl groups, especially unsubstituted alkyl groups, and more preferred is a methyl group or an ethyl group. $R^b$ is more preferably —OR, wherein R is a C1-C3 substituted or unsubstituted alkyl group, more preferably a methyl group.

In the formulae, $R^c$s at the respective occurrences are each individually a hydrogen atom or a lower alkyl group. The lower alkyl group is preferably a C1-C20 alkyl group, more preferably a C1-C6 alkyl group, still more preferably a methyl group.

In the formulae, k1s at the respective occurrences are each individually an integer of 1 to 3; 11s at the respective occurrences are each individually an integer of 0 to 2; m1s at the respective occurrences are each individually an integer of 0 to 2; and the sum of k1, l1, and m1 is 3.

The compounds represented by the formulae (C1) and (C2) may be obtainable by introducing, into an end thereof, a hydroxy group generated from a material that is a perfluoropolyether derivative that corresponds to a Rf-PFPE-moiety, introducing a group containing an unsaturated bond at an end, allowing this group containing an unsaturated bond and a silyl derivative containing a halogen atom to react with each other, introducing a hydroxy group into an end of this silyl group, and allowing the introduced group containing an unsaturated bond and the silyl derivative to react with each other. For example, the compounds may be obtainable as follows.

The compounds represented by the formulae (C1) and (C2) are preferably compounds respectively represented by the following formulae (C1") and (C2"):

[Chem. 25]

Rf-PFPE-X$^7$—Si$R^a{}_3$      (C1")

$R^a{}_3$Si—X$^7$-PFPE- X$^7$—Si$R^a{}_3$      (C2")

wherein

PFPEs are each individually a group represented by the following formula:

—(OC$_6$F$_{12}$)$_{m11}$—(OC$_5$F$_{10}$))$_{m12}$—(OC$_4$F$_8$)$_{m13}$—(OC$_3$X$^{10}{}_6$)$_{m14}$—(OC$_2$F$_4$)$_{m15}$—(OCF$_2$)$_{m16}$— wherein m11, m12, m13, m14, m15, and m16 are each individually an integer of 0 or 1 or greater; $X^{16}$s are each individually H, F, or Cl; and the repeating units are present in any order;

Rfs at the respective occurrences are each individually a C1-C16 alkyl group optionally substituted with one or more fluorine atoms;

$X^7$ is —CH$_2$O(CH$_2$)$_2$—, —CH$_2$O(CH$_2$)$_3$—, or —CH$_2$O(CH$_2$)$_6$—;

$R^a$s at the respective occurrences are each individually —$Z^1$—Si$R^{71}{}_{p1}R^{72}{}_{q1}R^{73}{}_{r1}$;

$Z^1$ is a C1-C6 alkylene group;

$R^{71}$s at the respective occurrences are each individually $R^{a'}$;

$R^{a'}$ is defined in the same manner as $R^a$;

in $R^a$, the number of Si atoms linearly linked via the $Z^1$ group is at most five;

$R^{72}$s at the respective occurrences are each individually a hydrolyzable group;

$R^{73}$s at the respective occurrences are each individually a hydrogen atom or a lower alkyl group;

p1s at the respective occurrences are each individually an integer of 0 to 2;

q1s at the respective occurrences are each individually an integer of 1 to 3, preferably 3;

r1s at the respective occurrences are each individually an integer of 0 to 2; and in one $R^a$, the sum of p1, q1, and r1 is 3.

The compounds represented by the formulae (C1) and (C2) may be produced as follows. A compound represented by the following formula (C1-4) or (C2-4):

[Chem. 26]

(C1-4)

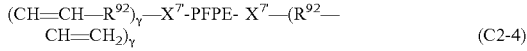

(C2-4)

(wherein

PFPEs are each individually a group represented by the following formula:

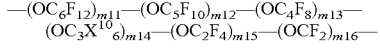

wherein m11, m12, m13, m14, m15, and m16 are each individually an integer of 0 or 1 or greater; $X^{10}$s are each individually H, F, or Cl; and the repeating units are present in any order;

Rfs at the respective occurrences are each individually a C1-C16 alkyl group optionally substituted with one or more fluorine atoms;

$X^7$'s are each individually a single bond or a divalent to decavalent organic group;

γs are each individually an integer of 1 to 9;

γ's are each individually an integer of 1 to 9; and $R^{92}$ is a single bond or a divalent organic group), is reacted with a compound represented by $HSiR^{93}_{k1}R^b_{l1}R^c_{m1}$ (wherein $R^{93}$ is a halogen atom, such as a fluorine atom, a chlorine atom, a bromine atom, or an iodine atom, preferably a chlorine atom; $R^b$s at the respective occurrences are each individually a hydrolyzable group; $R^c$s at the respective occurrences are each individually a hydrogen atom or a lower alkyl group; k1 is an integer of 1 to 3; l1 and m1 are each individually an integer of 0 to 2; and the sum of k1, l1, and m1 is 3) to provide a compound represented by the following formula (C1-5) or (C2-5):

[Chem. 27]

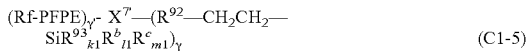

(C1-5)

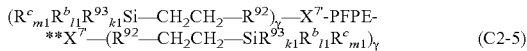

(C2-5)

wherein Rf, PFPE, $R^{92}$, $R^{93}$, $R^b$, $R^c$, γ, γ', $X^7$, k1, l1, and m1 are defined as described above.

The resulting compound represented by the formula (C1-5) or (C2-5) is reacted with a compound represented by Hal-J-$R^{94}$—CH=CH$_2$ (wherein Hal is a halogen atom such as I, Br, Cl, or F; J is Mg, Cu, Pd, or Zn; and $R^{94}$ is a single bond or a divalent organic group) to provide a compound represented by the following formula (C1-6) or (C2-6):

[Chem. 28]

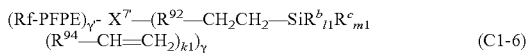

(C1-6)

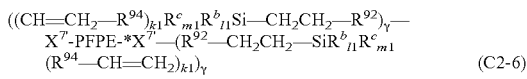

(C2-6)

wherein Rf, PFPE, $R^{92}$, $R^{94}$, $R^b$, R, γ, γ', $X^7$, k1, l1, and m1 are defined as described above.

The resulting compound represented by the formula (C1-6) or (C2-6) is reacted with $HSiM_3$ (wherein Ms are each individually a halogen atom, $R^{72}$, or $R^7$, where $R^{72}$s at the respective occurrences are each individually a hydrolyzable group and $R^{73}$s at the respective occurrences are each individually a hydrogen atom or a lower alkyl group), and if necessary, the halogen atom is converted into $R^{72}$ or $R^{73}$, thereby providing a compound represented by the following formula (C1''') or (C2'''):

[Chem. 29]

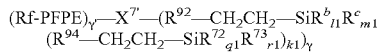

(C1''')

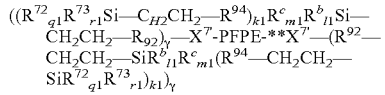

(C2''')

wherein

Rf, PFPE, $R^{72}$, $R^{73}$, $R^{92}$, $R^{94}$, $R^b$, $R^c$, γ, γ', $X^7$, k1, l1, and m1 are defined as described above;

q1s at the respective occurrences are each individually an integer of 1 to 3; and r1s at the respective occurrences are each individually an integer of 0 to 2.

In the formula (C1''') or (C2'''), the moiety from $X^7$, to $R^{92}$—CH$_2$CH$_2$— corresponds to $X^7$ in the formula. (C1) or (C2), and —$R^{94}$—CH$_2$CH$_2$— corresponds to Z in the formula (C1) or (C2).

The formulae (D1) and (D2) are as follows.

[Chem. 30]

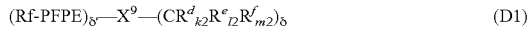

(D1)

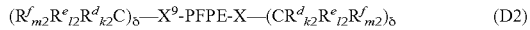

(D2)

In the formulae (D1) and (D2), Rf and PFPE are defined as described for the formulae (A1) and (A2).

In the formulae, $X^9$s are each individually a single bond or a divalent to decavalent organic group. These $X^5$s are each recognized as a linker that links a perfluoropolyether moiety mainly providing properties such as water-repellency and surface lubricity (i.e., Rf-PFPE moiety or -PFPE- moiety) and a moiety providing a capability to bind to a substrate (i.e., a group parenthesized with δ) in the compounds represented by the formulae (D1) and (D2). Thus, these $X^9$s each may be any organic group as long as it allows the compounds represented by the formulae (D1) and (D2) to be stably present.

In the formulae, δ is an integer of 1 to 9 and δ' is an integer of 1 to 9. These δ and δ' may vary in accordance with the valence of $X^9$. In the formula (D1), the sum of δ and δ' is the same as the valence of $X^9$. For example, when $X^9$ is a decavalent organic group, the sum of δ and δ' is 10, with δ being 9 and δ' being 1, δ being 5 and δ' being 5, or δ being 1 and δ' being 9, for example. When $X^9$ is a divalent organic group, δ and δ' are both 1. In the formula (D2), δ is a value obtained by subtracting 1 from the valence of $X^9$.

$X^9$ is preferably a divalent to heptavalent, more preferably divalent to tetravalent, still more preferably divalent organic group.

In an embodiment, $X^9$ is a divalent to tetravalent organic group, δ is 1 to 3, and δ' is 1.

In another embodiment, $X^9$ is a divalent organic group, δ is 1, and δ' is 1. In this case, the formulae (D1) and (D2) are respectively represented by the following formulae (D1') and (D2').

[Chem. 31]

Rf-PFPE-X$^9$—CR$^d_{k2}$R$^e_{l2}$R$^f_{m2}$ (D1')

R$^f_{m2}$R$^e_{l2}$R$^d_{k2}$C—X$^9$-PFPE-X—CR$^d_{k2}$R$^e_{l2}$R$^f_{m2}$ (D2')

Examples of X$^9$ include, but are not limited to, those described for X$^1$.

Preferred specific examples of X$^9$ include the following.
—CH$_2$O(CH$_2$)$_2$—,
—CH$_2$O(CH$_2$)$_3$—,
—CH$_2$O(CH$_2$)$_6$—,
—CH$_2$O(CH$_2$)$_3$Si(CH$_3$)$_2$OSi(CH$_3$)$_2$(CH$_2$)$_2$—,
—CH$_2$O(CH$_2$)$_3$Si(CH$_3$)$_2$OSi(CH$_3$)$_2$OSi(CH$_3$)$_2$(CH$_2$)$_2$—,
—CH$_2$O(CH$_2$)$_3$Si(CH$_3$)$_2$O(Si(CH$_3$)$_2$O)$_2$Si(CH$_3$)$_2$(CH$_2$)$_2$—,
—CH$_2$O(CH$_2$)$_3$Si(CH$_3$)$_2$O(Si(CH$_3$Si(CH$_3$)$_2$(CH$_2$)$_2$—,
—CH$_2$O(CH$_2$)$_3$Si(CH$_3$)$_2$O(Si(CH$_3$)$_2$O)$_{10}$Si(CH$_3$)$_2$(CH$_2$)$_2$—,
—CH$_2$O(CH$_2$)$_3$Si(CH$_3$)$_2$O(Si(CH$_3$)$_2$(CH$_2$)$_2$—,
—CH$_2$OCF$_2$CHFOCF$_2$—,
—CH$_2$OCF$_2$CHFOCF$_2$CF$_2$—,
—CH$_2$OCF$_2$CHFOCF$_2$CF$_2$CF$_2$—,
—CH$_2$OCH$_2$CF$_2$CF$_2$OCF$_2$—,
—CH$_2$OCH$_2$CF$_2$CF$_2$OCF$_2$CF$_2$—,
—CH$_2$OCH$_2$CF$_2$CF$_2$OCF$_2$CF$_2$CF$_2$—,
—CH$_2$OCH$_2$CF$_2$CF$_2$OCF(CF$_3$) CF$_2$OCF$_2$—,
—CH$_2$OCH$_2$CF$_2$CF$_2$OCF(CF$_3$) CF$_2$OCF$_2$CF$_2$—,
—CH$_2$OCH$_2$CF$_2$CF$_2$OCF(CF$_3$) CF$_2$OCF$_2$CF$_2$CF$_2$—,
—CH$_2$OCH$_2$CHFCF$_2$OCF$_2$—,
—CH$_2$OCH$_2$CHFCF$_2$OCF$_2$CF$_2$—,
—CH$_2$OCH$_2$CHFCF$_2$OCF$_2$CF$_2$CF$_2$—,
—CH$_2$OCH$_2$CHFCF$_2$OCF(CF$_3$) CF$_2$OCF$_2$—,
—CH$_2$OCH$_2$CHFCF$_2$OCF(C F$_3$) CF$_2$OCF$_2$CF$_2$—,
—CH$_2$OCH$_2$CHFCF$_2$OCF(CF$_3$) CF$_2$OCF$_2$CF$_2$CF$_2$—,
—CH$_2$OCH$_2$ (CH$_2$)$_7$CH$_2$Si(OCH$_3$)$_2$OSi(OCH$_3$)$_2$ (CH$_2$)$_2$Si(OCH$_3$)$_2$OSi(OCH$_3$)$_2$(CH$_2$)$_2$—,
—CH$_2$OCH$_2$CH$_2$CH$_2$Si(OCH$_3$)$_2$OSi(OCH$_3$)$_2$(CH$_2$)$_3$—,
—CH$_2$OCH$_2$CH$_2$CH$_2$Si(OCH$_2$CH$_3$)$_2$OSi(OCH$_2$CH$_3$)$_2$(CH$_2$)$_3$—,
—CH$_2$OCH$_2$CH$_2$CH$_2$Si(OCH$_3$)$_2$OSi(OCH$_3$)$_2$(CH$_2$)$_2$—,
—CH$_2$OCH$_2$CH$_2$CH$_2$Si(OCH$_2$CH$_3$)$_2$OSi(OCH$_2$CH$_3$)$_2$(CH$_2$)$_2$—,
—(CH$_2$)$_2$—,
—(CH$_2$)$_3$—,
—(CH$_2$)$_4$—,
—(CH$_2$)$_5$—,
—(CH$_2$)$_6$—,
—(CH$_2$)$_2$—Si(CH$_3$)$_2$—(CH$_2$)$_2$—,
—CONH—(CH$_2$)$_3$—,
—CON(CH$_3$)—(CH$_2$)$_3$—,
—CON(Ph)-(CH$_2$)$_3$—, where Ph means phenyl,
—CONH—(CH$_2$)$_6$—,
—CON(CH$_3$)—(CH$_2$)$_6$—,
—CON(Ph)-(CH$_2$)$_6$—, where Ph means phenyl,
—CONH—(CH$_2$)$_2$NH(CH$_2$)$_3$—,
—CONH—(CH$_2$)$_6$NH(CH$_2$)$_3$—,
—CH$_2$O—CONH—(CH$_2$)$_3$—,
—CH$_2$O—CONH—(CH$_2$)$_6$—,
—S—(CH$_2$)$_3$—,
—(CH$_2$)$_2$S(CH$_2$)$_3$—,
—CONH—(CH$_2$)$_3$Si(CH$_3$)$_2$OSi(CH$_3$)$_2$(CH$_2$)$_2$—,
—CONH—(CH$_2$)$_3$Si(CH$_3$)$_2$OSi(CH$_3$)$_2$OSi(CH$_3$)$_2$(CH$_2$)$_2$—,
—CONH—(CH$_2$)$_3$Si(CH$_3$)$_3$Si(CH$_3$)$_2$O)$_2$Si(CH$_3$)$_2$(CH$_2$)$_2$—,
—CONH—(CH$_2$)$_3$Si(CH$_3$)$_2$O(Si(CH$_3$)$_2$O)$_3$Si(CH$_3$)$_2$(CH$_2$)$_2$—,
—CONH—(CH$_2$)$_3$Si(CH$_3$)$_2$O(Si(CH$_3$)$_2$O)$_{10}$Si(CH$_3$)$_2$(CH$_2$)$_2$—,
—CONH—(CH$_2$)$_3$Si(CH$_3$)$_2$O(Si(CH$_3$)$_2$O)$_{20}$Si(CH$_3$)$_2$(CH$_2$)$_2$—,
—C(O)O—(CH$_2$)$_3$-r
—C—(O)O—(CH$_2$)$_6$—,
—CH$_2$—O—(CH$_2$)$_3$—Si(CH$_3$)$_2$—(CH$_2$)$_2$—Si(CH$_3$)$_2$(CH$_2$)$_2$—,
—CH$_2$—O—(CH$_2$)$_3$—Si(CH$_3$)$_2$—(CH$_2$)$_2$—Si(CH$_3$)$_2$—CH(CH$_3$)—,
—CH$_2$—O—(CH$_2$)$_3$—Si(CH$_3$)$_2$—(CH$_2$)$_2$—Si(CH$_3$)$_2$—(CH$_2$)$_3$—,
—CH$_2$—O—(CH$_2$)$_3$—Si(CH$_3$)$_2$—(CH$_2$)$_2$—Si(CH$_3$)$_2$—CH(CH$_3$)—CH$_2$—,
—OCH$_2$—,
—O(CH$_2$)$_3$—,
—OCFHCF$_2$—,

[Chem. 32]

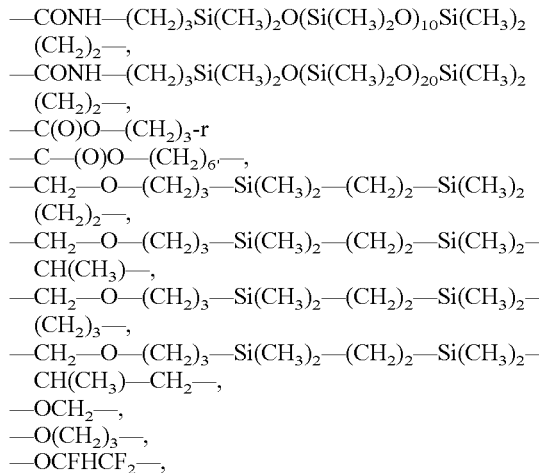

In the formulae, R$^d$s at the respective occurrences are each individually —Z$^2$—CR$^{81}_{p2}$R$^{82}_{q2}$R$^{83}_{r2}$.

In the formulae, Z$^2$s at the respective occurrences are each individually an oxygen atom or a divalent organic group.

Z$^2$ is preferably a C1-C6 alkylene group, —(CH$_2$)$_g$—O—(CH$_2$)$_h$— (wherein g is, an integer of 0 to 6, for example: an integer of 1 to 6; and h is an integer of 0 to 6, for example an integer of 1 to 6), or -phenylene-(CH$_2$)$_i$— (wherein i is an integer of 0 to 6), more preferably a C1-C3 alkylene group. These groups may be substituted with one or more substituents selected from a fluorine atom, a C1-C6 alkyl group, a C2-C6 alkenyl group, and a C2-C6 alkynyl group.

In the formula, R$^{81}$s at the respective occurrences are each individually R$^{d'}$. R$^{d'}$ is defined in the same manner as R$^d$.

In R$^d$, the number of C atoms linearly linked via the Z$^2$ group is at most five. In other words, when R$^d$ contains at least one R$^{81}$, there are two or more Si atoms linearly linked via the Z$^2$ group in R$^d$, and the number of C atoms linearly linked via such a Z$^2$ group is at most five. The "number of C atoms linearly linked via the Z$^2$; group in R$^{d"}$ is equal to the repeating number of —Z$^2$—C— linearly linked in R$^d$. This is the same as described for R$^a$ in the formulae (C1) and (C2).

In a preferred embodiment, the "number of C atoms linearly linked via the Z$^2$ group in R$^{d"}$ in each chain is one (left formula) or two (right formula).

In an embodiment, the number of C atoms linearly linked via the Z$^2$ group in R$^d$ is one or two, preferably one.

In the formula, R$^{82}$ is —Y—SiR$^{85}_{n2}$R$^{86}_{3-n2}$.

Ys at the respective occurrences are each individually a divalent organic group.

In a preferred embodiment, Y is a C1-C6 alkylene group, —(CH$_2$)$_{g'}$—O—(CH$_2$)$_{h'}$— (wherein g' is an integer of 0 to 6, for example an integer of 1 to 6; and h' is an integer of 0 to 6, for example an integer of 1 to 6), or -phenylene-$(CH_2)_{i'}$— (wherein i' is an integer of 0 to 6). These groups may be substituted with one or more substituents selected from a fluorine atom, a C1-C6 alkyl group, a C2-C6 alkenyl group, and a C2-C6 alkynyl group.

In an embodiment, Y may be a C1-C6 alkylene group, —O—$(CH_2)_{h'}$—, or -phenylene-$(CH_2)_{i'}$—. When Y is any of these groups, it may lead to better light resistance, especially ultraviolet resistance.

$R^{85}$s at the respective occurrences are each individually a hydrolyzable group.

The "hydrolyzable group" as used herein means a group that may be influenced by a hydrolysis reaction. Examples of the hydrolyzable group include —OR, —OCOR, —O—N=C(R)$_2$, —N(R)$_2$, —NHR, and halogens, where R is a C1-C4 substituted or unsubstituted alkyl group. Preferred is —OR (an alkoxy group). Examples of R include unsubstituted alkyl groups such as a methyl group, an ethyl group, a propyl group, an isopropyl group, a n-butyl group, and an isobutyl group; and substituted alkyl groups such as a chloromethyl group. Preferred among these are alkyl groups, especially unsubstituted alkyl groups, more preferred is a methyl group or an ethyl group.

$R^{85}$ is preferably —OR, wherein R is a C1-C3 substituted or unsubstituted alkyl group, more preferably an ethyl group or a methyl group, particularly a methyl group.

$R^{86}$s at the respective occurrences are each individually a hydrogen atom or a lower alkyl group. The lower alkyl group is preferably a C1-C20 alkyl group, more preferably a C1-C6 alkyl group, still more preferably a methyl group.

In the formula, n2 is an integer of 1 to 3, preferably 2 or 3, more preferably 3, for each (—Y—$SiR^{85}_{n2}R^{86}_{3-n2}$) unit.

$R^{83}$s at the respective occurrences are each individually a hydrogen atom or a lower alkyl group. The lower alkyl group is preferably a C1-C20 alkyl group, more preferably a C1-C6 alkyl group, still more preferably a methyl group.

In the formula, p2s at the respective occurrences are each individually an integer of 0 to 3; q2s at the respective occurrences are each individually an integer of 0 to 3; r2s at the respective occurrences are each individually an integer of 0 to 3; and the sum of p2, q2, and r2 is 3.

In a preferred embodiment, $q^2$ in the terminal $R^{d'}$ in $R^d$ (or $R^d$, if $R^{d'}$ is absent) is preferably 2 or greater, such as 2 or 3, more preferably 3.

In a preferred embodiment, at least one end of $R^d$ may be —C(—Y—$SiR^{85}_{q2}R^{86}_{r2})_2$ or —C(—Y—$SiR^{85}_{q2}R^{86}_{r2})_3$, preferably —C(—Y—$SiR^{85}_{q2}R^{86}_{r2})_3$. In the formula, the (—Y—$SiR^{85}_{q2}R^{86}_{r2}$) unit is preferably (—Y—$SiR^{85}_{3}$). In a more preferred embodiment, all the ends of $R^d$ may be —C(—Y—$SiR^{85}_{q2}R^{86}_{r2})_3$, preferably —C(—Y—$SiR^{85}_{3})_3$.

In the formula, $R^e$s at the respective occurrences are each individually —Y—$SiR^{85}_{n2}R^{86}_{3-n2}$, $R^{85}$, $R^{86}$, and n2 are defined in the same manner as for $R^{82}$.

In the formula, $R^f$s at the respective occurrences are each individually a hydrogen atom or a lower alkyl group. The lower alkyl group is preferably a C1-C20 alkyl group, more preferably a C1-C6 alkyl group, still more preferably a methyl group.

In the formula, k2s at the respective occurrences are each individually an integer of 0 to 3; l2s at the respective occurrences are each individually an integer of 0 to 3; m2s at the respective occurrences are each individually an integer of 0 to 3; and the sum of k2, l2, and m2 is 3.

In an embodiment, at least one k2 is 2 or 3, preferably 3.
In an embodiment, k2 is 2 or 3, preferably 3.
In an embodiment, l2 is 2 or 3, preferably 3.

In the formulae (D1) and (D2), at least one q2 is 2 or 3 or at least one l2 is 2 or 3. In other words, the formula includes at least two —Y—$SiR^{85}_{n2}R^{86}_{3-n2}$ groups.

The perfluoropolyether group-containing silane compound represented by the formula (D1) or the formula (D2) may be produced by combination of known methods. For example, a compound represented by the formula (D1') wherein X is divalent may be produced by, although not limited thereto, the following method.

A group containing a double bond (preferably allyl) and a halogen (preferably bromine) are introduced into a polyhydric alcohol represented by HO—X—C(YOH)$_3$ (wherein X and Y are each individually a divalent organic group) to provide a double bond-containing halide represented by Hal-X—C(Y—O—R—CH=CH$_2$)$_3$ (wherein Hal is a halogen such as Br; and R is a divalent organic group such as an alkylene group). Then, the halogen at an end is reacted with a perfluoropolyether group-containing alcohol represented by $R^{PFPE}$—OH (wherein $R^{PFPE}$ is a perfluoropolyether group-containing group) to provide $R^{PFPE}$—O—X—C(Y—O—R—CH=CH$_2$)$_3$. Then, —CH=CH$_2$ at an end is reacted with HSiCl$_3$ and an alcohol or HSiR$^{85}_3$ to provide $R^{PFPE}$—O—X—C(Y—O—R—CH$_2$—CH$_2$—SiR$^{85}_3$)$_3$.

The perfluoropolyether group-containing silane compounds represented by the formulae (A1), (A2), (B1), (B2), (C1), (C2), (D1), and (D2) may have a number average molecular weight of $5 \times 10^2$ to $1 \times 10^5$, although not limited thereto. The number average molecular weight may preferably be 2000 to 30000, more preferably 3000 to 10000, still more preferably 3000 to 8000.

The number average molecular weight is determined by gel permeation chromatography (GPC) analysis.

The PFPE moiety of the perfluoropolyether group-containing silane compound may have a number average molecular weight of preferably 1500 to 30000, more preferably 2500 to 10000, still more preferably 3000 to 8000, although not limited thereto.

The compound (H) is represented by the following formula:

$$R^{111}\text{-PFPE-}R^{113}$$

wherein PFPE is a perfluoropolyether group; $R^{111}$ and $R^{113}$ are each individually F, a C1-C16 alkyl group, a C1-C16 alkoxy group, a C1-C16 fluorinated alkyl group, a C1-C16 fluorinated alkoxy group, or —$R^{114}$—$X^{111}$, where $R^{114}$ is a single bond or a divalent organic group, and $X^{111}$ is —NH$_2$, —OH, —COOH, —CH=CH$_2$, —OCH$_2$CH=CH$_2$, a halogen, phosphoric acid, a phosphoric acid ester, a carboxylic acid ester, a thiol, a thio ether, an alkyl ether (optionally substituted with fluorine), an aryl, an aryl ether, or an amide.

$X^{111}$ is preferably at least one selected from the group consisting of —OH, —COOH, thiol (—SH), —CH=CH$_2$, and —OCH$_2$CH=CH$_2$. Examples of the divalent organic group include alkylene groups, fluorinated alkylene groups, and groups in which an oxygen atom binds to an end of any of these groups. The divalent organic group may contain any number of carbon atoms, and may contain 1 to 16 carbon atoms.

$R^{111}$ and $R^{113}$ are each individually preferably F, a C1-C3 alkyl group, a C1-C3 fluorinated alkyl group, or —$R^{114}$—$X^{111}$ (wherein $R^{114}$ and $X^{111}$ are defined as described above), more preferably F, a C1-C3 perfluorinated alkyl group, or —$R^{114}$—$X^{111}$ (wherein $R^{114}$ and $X^{111}$ are defined as described above).

In the formula, m is preferably an integer of 300 or smaller, more preferably an integer of 100 or smaller.

Examples of PFPE include those represented by the following formula:

$$—(CX^{112}_2CF_2CF_2O)_{n111}(CF(CF_3)CF_2O)_{n112}(CF_2CF_2O)_{n113}(CF_2O)_{n114}(C_4F_8O)_{n115}—$$

wherein n11, n112, n113, n114, and n115 are each individually an integer of 0 or 1 or greater; $X^{112}$ is H, F, or Cl; and the repeating units are present in any order; and those represented by the following formula:

$$—(OC_2F_4—R^{118})_f—$$

wherein $R^{118}$ is a group selected from $OC_2F_4$, $OC_3F_6$, and $OC_4F$; and f is an integer of 2 to 100.

In the formula, n111 to n115 are each preferably an integer of 0 to 200. The sum of n111 to n115 is preferably 1 or greater, more preferably 5 to 300, still more preferably 10 to 200, particularly preferably 10 to 100.

$R^{18}$ is a group selected from $OC_2F_4$, $OC_3F_6$, and $OC_4F_8$, or any combination of two or three groups individually selected from these groups. Examples of the combination of two or three groups individually selected from $OC_2F_4$, $OC_3F_6$, and $OC_4F_8$ include, but are not limited to, —$OC_2F_4OC_3F_6$—, —$OC_2F_4OC_4F_8$—, —$OC_3F_6OC_2F_4$—, —$OC_3F_6OC_3F_6$—, —$OC_3F_6OC_4F_8$—, —$OC_4F_8OC_4F_8$—, —$OC_4F_8OC_3F_6$—, —$OC_4FOC_2F_4$—, —$OC_2F_4OC_2F_4OC_3F_6$—, —$OC_2F_4OC_2F_4OC_4F_8$—, —$OC_2F_4OC_3F_6OC_2F_4$—, —$OC_2F_4OC_3F_6OC_3F_6$—, —$OC_2F_4OC_4FOC_2F_4$—, —$OC_3F_6OC_2F_4OC_2F_4$—, —$OC_3F_6OC_2F_4OC_3F_6$—, —$OC_3F_6OC_3F_6OC_2F_4$—, and —$OC_4F_8OC_2F_4OC_2F_4$—. In the formula, f is an integer of 2 to 100, preferably an integer of 2 to 50. In the formula, $OC_2F_4$, $OC_3F_6$, and $OC_4Fe$ each may be linear or branched, and is preferably linear. In this embodiment, —$(OC_2F_4—R^{118})_f$— is preferably —$(OC_2F_4—OC_3F_6)_f$— or —$(OC_2F_4—OC_4F_8)_f$—.

The compound (H) preferably has a weight average molecular weight of 500 to 100000, more preferably 50000 or lower, still more preferably 10000 or lower, particularly preferably 6000 or lower. The Weight average molecular weight may be determined by gel permeation chromatography (GPC).

Examples of commercially available products of the compound (H) include those under the trade names Demnum (Daikin Industries, Ltd.), Fomblin (Solvay Specialty Polymers Japan K.K.), Barrierta (NOK Kluber Co., Ltd.), and Krytox (DuPont).

The layer (A) contains a resin. The resin is a resin serving as a main material for imparting functions to the functional film, and the functions of the functional film depend on the type of the resin.

The resin is preferably at least one selected from the group consisting of resins obtainable by curing a curable resin, resins obtainable by curing a curable monomer, and resins containing a polysiloxane structure formed from a silicon-containing compound.

The curable resin is preferably free from a fluorine atom. The curable monomer is preferably free from a fluorine atom.

The curable resin may be either a photo-curable resin or a thermosetting resin, and may be any resin having heat resistance and strength. It is preferably a photo-curable resin, more preferably an ultraviolet-curable resin.

Examples of the curable resin include acrylic polymers, polycarbonate polymers, polyester polymers, polyamide polymers, polyimide polymers, polyethersulfone polymers, cyclic polyolefin polymers, fluorine-containing polyolefin polymers (e.g., PTFE), and fluorine-containing cyclic amorphous polymers (e.g., Cytop®, Teflon® AF). In the case of performing a treatment such as ultraviolet curing after a step (2), the curable resin is preferably a resin having transparency.

Specific examples of the curable resin or monomers constituting the curable resin include alkyl vinyl ethers such as cyclohexyl methyl vinyl ether, isobutyl vinyl ether, cyclohexyl vinyl ether, and ethyl vinyl ether, glycidyl vinyl ether, vinyl acetate, vinyl pivalate, (meth)acrylates such as phenoxyethyl acrylate, benzyl acrylate, stearyl acrylate, lauryl acrylate, 2-ethylhexyl acrylate, allyl acrylate, 1,3-butanediol diacrylate, 1,4-butanediol diacrylate, 1,6-hexanediol diacrylate, trimethylolpropane triacrylate, pentaerythritol triacrylate, dipentaerythritol hexaacrylate, ethoxyethyl acrylate, methoxyethyl acrylate, glycidyl acrylate, tetrahydrofurfuryl acrylate, diethylene glycol diacrylate, neopentyl glycol diacrylate, polyoxyethylene glycol diacrylate, tripropylene glycol diacrylate, 2-hydroxyethyl acrylate, 2-hydroxypropyl acrylate, 4-hydroxybutyl vinyl ether, N,N-diethylaminoethyl acrylate, N,N-dimethylaminoethyl acrylate, N-vinylpyrrolidone, and dimethylaminoethyl methacrylate, silicone-based acrylates, maleic anhydride, vinylene carbonate, linear side chain polyacrylates, cyclic side chain polyacrylates, polynorbornene, polynorbornadiene, polycarbonate, polysulfonic acid amide, and fluorine-containing cyclic amorphous polymers (e.g., Cytop®, Teflon® AF).

The curable monomer may be either a photo-curable monomer or a thermosetting monomer, and is preferably an ultraviolet-curable monomer.

Examples of the curable monomer include (a) urethane (meth)acrylates, (b) epoxy (meth)acrylates, (c) polyester (meth)acrylates, (d) polyether (meth)acrylates, (e) silicone (meth)acrylates, and (f) (meth)acrylate monomers.

Specific examples of the curable monomer include the following.

Examples of the urethane (meth)acrylates (a) include poly((meth)acryloyloxyalkyl)isocyanurates typified by tris(2-hydroxyethyl)isocyanurate diacrylate and tris(2-hydroxyethyl)isocyanurate triacrylate.

The epoxy (meth)acrylates (b) are obtained by adding a (meth)acryloyl group to an epoxy group, typified by those obtained from a starting material such as bisphenol A, bisphenol F, phenol novolac, Or an alicyclic compound. Examples of polyhydric alcohols constituting the polyester moiety of the polyester (meth)acrylates (c) include ethylene glycol, 1,4-butanediol, 1,6-hexanediol, diethylene glycol, trimethylolpropane, dipropylene glycol, polyethylene glycol, polypropylene glycol, pentaerythritol, and dipentaerythritol. Examples of polybasic acids include phthalic acid, adipic acid, maleic acid, trimellitic acid, itaconic acid, succinic acid, terephthalic acid, and alkenylsuccinic acid.

Examples of the polyether (meth)acrylates (d) include polyethylene glycol di(meth)acrylate, polypropylene glycol di(meth)acrylate, and polyethylene glycol-polypropylene glycol di(meth)acrylate.

The silicone (meth)acrylates (e) are those obtained by modifying one or both ends of dimethyl polysiloxane having a molecular weight of 1000 to 10000 with a (meth)acryloyl group, and examples thereof include the following compounds.

[Chem. 33]

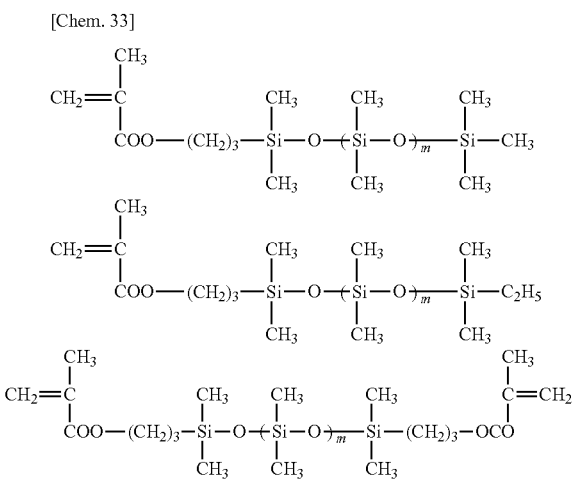

Examples of the (meth)acrylate monomers (f) include methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, t-butyl (meth)acrylate, n-pentyl (meth)acrylate, 3-methylbutyl (meth)acrylate, n-hexyl (meth)acrylate, 2-ethyl-n-hexyl (meth)acrylate, n-octyl (meth)acrylate, cyclohexyl (meth) acrylate, isobornyl (meth)acrylate, benzyl (meth)acrylate, 2-hydroxyethyl (meth)acrylate, 2-hydroxypropyl (meth) acrylate, 3-hydroxypropyl (meth) acrylate, 4-hydroxybutyl (meth)acrylate, 5-hydroxypentyl (meth)acrylate, 6-hydroxyhexyl (meth)acrylate, 4-hydroxycyclohexyl (meth)acrylate, neopentyl glycol mono(meth)acrylate, 3-chloro-2-hydroxypropyl (meth)acrylate, (1,1-dimethyl-3-oxobutyl) (meth) acrylate, 2-acetoacetoxyethyl (meth)acrylate, 2-methoxyethyl (meth)acrylate, 2-ethoxyethyl (meth)acrylate, neopentyl glycol mono(meth)acrylate, 3-chloro-2-hydroxypropyl (meth)acrylate, glycerol mono(meth)acrylate, ethylene glycol diacrylate, propylene glycol diacrylate, 1,6-hexanediol diacrylate, 1,9-nonanediol diacrylate, 1,10-decanediol diacrylate, trimethylolpropane triacrylate, and pentaerythritol tetraacrylate.

Examples of preferred commercially available curable resins and curable monomers are as follows.

Examples of the curable resins include silicone resins such as PAK-01 and PAK-02 (Toyo Gosei Co., Ltd.); nanoimprint resins such as NIF series (Asahi Glass Co., Ltd.), nanoimprint resins such as OCNL series (Tokyo Ohka Kogyo Co., Ltd.), and NIAC 2310 (Daicel Chemical Industries, Co., Ltd.); epoxy acrylate resins such as EH-1001, ES-4004, EX-C101, EX-C106, EX-C300, EX-C501, EX-0202, EX-0205, and EX-5000 (Kyoeisha Chemical Co., Ltd.); and hexamethylene diisocyanate-based polyisocyanates such as Sumidur N-75, Sumidur N3200, Sumidur HT, Sumidur N3300, and Sumidur N3500 (Sumitomo Bayer Urethane Co., Ltd.).

Examples of the silicone acrylate resins among the curable monomers include: Silaplane® FM-0611, Silaplane FM-0621, and Silaplane FM-0625; bi-terminal-type (meth) acrylate resins such as Silaplane FM-7711, Silaplane FM-7721, and Silaplane FM-7725; Silaplane FM-0411, Silaplane FM-0421, Silaplane FM-0428, Silaplane FM-DA11, Silaplane FM-DA21, and Silaplane DA25; mono-terminal-type: (meth)acrylate resins such as Silaplane FM-0711, Silaplane FM-0721, Silaplane FM-0725, Silaplane TM-0701, and Silaplane TM-0701T (JNC Co., Ltd.).

Examples of the multifunctional acrylates include A-9300, A-9300-1CL, A-GLY-9E, A-GLY-20E, A-TMM-3, A-TMM-3L, A-TMM-3LM-N, A-TMPT, and A-TMMT (Shin-Nakamura Chemical Co., Ltd.).

An example of the multifunctional methacrylates is TMPT (Shin-Nakamura Chemical Co., Ltd.).

Examples of the alkoxysilane group-containing (meth) acrylates include 3-(meth)acryloyloxypropyltrichlorosilane, 3-(meth) acryloyloxypropyltrimethoxysilane, 3-(meth)acryloyloxypropyltriethoxysilane, 3-(meth)acryloyloxypropyltriisopropoxysilane (also referred to as (triisopropoxysilyl) propyl methacrylate (abbreviation: TISMA) and (triisopropoxysilyl)propyl acrylate), 3-(meth)acryloxyisobutyltrichlorosilane, 3-(meth)acryloxyisobutyltriethoxysilane, 3-(meth)acryloxyisobutyltriisopropoxysilane, and 3-(meth) acryloxyisobutyltrimethoxysilane.

As described above, in the functional film of the invention, the resin in the layer (A) is a resin serving as a main material for imparting functions to the functional film. The functional film of the invention has the aforementioned features, and thus can sufficiently exert the characteristics that the resin in the layer (A) originally has. Examples of the characteristics include transparency, reduced scattering, reduced reflection, scratch resistance, and flexibility. The characteristics preferably include transparency and scratch resistance. Examples of the resin having these characteristics include resins obtainable by curing a resin such as an acrylic polymer, a polycarbonate polymer, a polyimide polymer, a polyethersulfone polymer, or a cyclic polyolefin polymer; and resins obtainable by curing a curable monomer such as a multifunctional (meth)acrylate, a silicon (meth) acrylate, an epoxy (meth)acrylate, and a urethane (meth) acrylate.

The resin may be at least one selected from the group consisting of resins obtainable by curing a composition containing a curable resin and a crosslinking catalyst and resins obtainable by curing a composition containing a curable monomer and a crosslinking catalyst.

Examples of the crosslinking catalyst include a radical polymerization initiator and an acid generator.

The radical polymerization initiator is a compound that is to generate a radical by heat or light, and examples thereof include a radical thermal polymerization initiator and a radical photo-polymerization initiator. In the invention, a radical photo-polymerization initiator is preferred.

Examples of the radical thermal polymerization initiator include: peroxide compounds, including diacyl peroxides such as benzoyl peroxide and lauroyl peroxide, dialkyl peroxides such as dicumyl peroxide and di-t-butyl peroxide, peroxy carbonates such as diisopropyl peroxydicarbonate and bis(4-t-butylcyclohexyl)peroxydicarbonate, and alkyl peresters such as t-butyl peroxyoctoate and t-butyl peroxybenzoate; and radical-generating azo compounds such as azobisisobutyronitrile.

Examples of the radical photo-polymerization initiator include: -diketones such as benzyl and diacetyl; acyloins such as benzoin; acyloin ethers such as benzoin methyl ether, benzoin ethyl ether, and benzoin isopropyl ether; thioxanthones such as thioxanthone, 2,4-diethyl thioxanthone, and thioxanthone-4-sulfonic acid; benzophenones such as benzophenone, 4,4'-bis(dimethylamino)benzophenone, and 4,4'-bis(diethylamino)benzophenone; acetophenones such as acetophenone, 2-(4-toluenesulfonyloxy)-2-phenylacetophenone, p-dimethylaminoacetophenone, 2,2'-dimethoxy-2-phenylacetophenone, p-methoxyacetophenone, 2-methyl[4-(methylthio)phenyl]-2-morpholino-1-propanone, and 2-benzyl-2-dimethylamino-1-(4-morpholinophenyl)-butan-1-one; quinones such as anthraquinone and 1,4-naphthoquinone; aminobenzoic acids such as ethyl 2-dimethylaminobenzoate, ethyl 4-dimethylaminobenzoate, (n-butoxy)ethyl 4-dimethylaminobenzoate, isoamyl 4-dimethylaminobenzoate, and 2-ethylhexyl 4-dimethylaminobenzoate; halogen compounds such as phenacyl chloride and trihalomethyl phenyl sulfone; acylphosphine oxides; and peroxides such as di-t-butyl peroxide.

Examples of commercially available radical photo-polymerization initiators include:

Irgacure® 651: 2,2-dimethoxy-1,2-diphenylethan-1-one,

Irgacure 184: 1-hydroxy-cyclohexyl-phenyl-ketone,

Irgacure 2959: 1-[4-(2-hydroxyethoxy)-phenyl]-2-hydroxy-2-methyl-1-propan-1-one, Irgacure 127: 2-hydroxy-1-{4-[4-(2-hydroxy-2-methyl-propionyl)-benzyl]-phenyl}-2-methyl-propan-1-one, Irgacure 907: 2-methyl-1-(4-methylthiophenyl)-2-morpholinopropan-1-one, Irgacure 369: 2-benzyl-2-dimethylamino-1-(4-morpholinophenyl)-butanone-1, Irgacure 379: 2-(dimethylamino)-2-[(4-methylphenyl)methyl]-1-[4-(4-morpholinyl)phenyl]-1-butanone, Irgacure 819: bis(2,4,6-trimethylbenzoyl)-phenylphosphine oxide, Irgacure 784: bis(η5-2,4-cyclopentadien-1-yl)-bis(2,6-difluoro-3-(1H-pyrrol-1-yl)-phenyl)titanium, Irgacure OXE 01: 1,2-octanedione, 1-[4-(phenylthio)-, 2-(O-benzoyloxime), Irgacure OXE 02: ethanone, 1-[9-ethyl-6-(2-methylbenzoyl)-9H-carbazol-3-yl]-, 1-(O-acetyloxime), Irgacure 261, Irgacure 369, Irgacure 500, Darocur® 1173: 2-hydroxy-2-methyl-1-phenyl-propan-1-one, Darocur TPO: 2,4,6-trimethylbenzoyl-diphenyl-phosphine oxide, Darocur 1116, Darocur 2959, Darocur 1664, Darocur 4043, Irgacure 754: Mixture of oxy-phenylacetic acid, 2-[2-oxo-2-phenylacetoxyethoxy]ethyl ester, oxy-phenylacetic acid, and 2-(2-hydroxyethoxy)ethyl ester, Irgacure 500: Mixture of Irgacure 184 and benzophenone (1:1), Irgacure 1300: Mixture of Irgacure 369 and Irgacure 651 (3:7), Irgacure 1800: Mixture of CG1403 and Irgacure 184 (1:3), Irgacure 1870: Mixture of CGI403 and Irgacure 184 (7:3), and Darocur 4265: Mixture of Darocur TPO and Darocur 1173 (1:1).

The Irgacure series are available from Ciba Specialty Chemicals Inc. and the Darocur series are available from Merck Japan.

When a radical photo-polymerization initiator is used as the crosslinking catalyst, it may be used in combination with a substance serving as a sensitizer, such as diethyl thioxanthone or isopropyl thioxanthone, and may be used in combination with a product serving as a polymerization accelerator, such as Darocur EDB (ethyl-4-dimethyl aminobenzoate) or Darocur EHA (2-ethylhexyl-4-dimethyl aminobenzoate).

In the case of using a sensitizer, the amount of the sensitizer is preferably 0.1 to 5 parts by mass, more preferably 0.1 to 2 parts by mass, relative to 100 parts by mass of the curable resin or the curable monomer. In the case of using a polymerization accelerator, the amount of the polymerization accelerator is preferably 0.1 to 5 parts by mass, more preferably 0.1 to 2 parts by mass, relative to 100 parts by mass of the curable resin or the curable monomer.

The acid generator is a material that generates an acid by application of heat or light, and examples thereof include a thermal acid generator and a photo-acid generator. In the invention, a photo-acid generator is preferred. Examples of the thermal acid generator include benzoin tosylate, nitrobenzyl tosylate (especially, 4-nitrobenzyl tosylate), and other alkyl esters of organosulfonic acids.

The photo-acid generator is composed of a chromophore that absorbs light and an acid precursor that is to be an acid after decomposition. Application of light at a specific wavelength to a photo-acid generator having such a structure causes the photo-acid generator to be excited and causes the acid precursor moiety to generate an acid. Examples of the photo-acid generator include salts such as diazonium salts, phosphonium salts, sulfonium salts, iodonium salts, $CF_3SO_3$, p-$CH_3PhSO_3$, and p-$NO_2PhSO_3$ (wherein Ph is a phenyl group), organohalogen compounds, orthoquinone-diazide sulfonyl chloride, and sulfonic acid esters. Examples of the photo-acid generator also include 2-halomethyl-5-vinyl-1,3,4-oxadiazole compounds, 2-trihalomethyl-5-aryl-1,3,4-oxadiazole compounds, and 2-trihalomethyl-5-hydroxyphenyl-1,3,4-oxadiazole compounds.

The organohalogen compounds are compounds that can form a hydrohalogenic acid (e.g., hydrogen chloride).

Examples of commercially available products of the photo-acid generator include the following:

WPAG-145 (bis(cyclohexylsulfonyl)diazomethane), WPAG-170 (bis(t-butylsulfonyl)diazomethane, WPAG-199 (bis(p-toluenesulfonyl)diazomethane), WPAG-281 (triphenylsulfonium trifluoromethanesulfonate), WPAG-336 (diphenyl-4-methylphenylsulfonium trifluoromethanesulfonate), and WPAG-367 (diphenyl-2,4,6-trimethylphenylsulfonium p-toluenesulfonate), available from Wako Pure Chemical Industries, Ltd.; Irgacure PAG103 ((5-propylsulfonyloxyimino-5H-thiophen-2-ylidene)-(2-methylphenyl)acetonitrile), Irgacure PAG108 ((5-octylsu-lfonyloxyimino-5H-thiophen-2-ylidene)-(2-methylphenyl)acetonitrile), Irgacure PAG121 ((5-p-toluenesulfonyloxyimino-5H-thiophen-2-ylidene)-(2-methylphenyl)acetonitrile), Irgacure PAG203, and CGI725, available from Ciba Specialty Chemicals; and TFE-triazine (2-[2-(furan-2-yl)ethenyl]-4,6-bis(trichloromethyl)-s-triazine), TME-triazine (2-[2-(5-methylfuran-2-yl)ethenyl]-4,6-bis(trichloromethyl)-s-triazine), MP-triazine (2-(methoxyphenyl)-4,6-bis(trichloromethyl)-s-triazine), and Dimethoxy (2-[2-(3,4-dimethoxyphenyl)ethenyl]-4,6-bis(trichloromethyl)-s-triazine), available from Sanwa Chemical Co.

The amount of the crosslinking catalyst is preferably 0.1 to 10 parts by mass relative to 100 parts by mass of the curable resin or the curable monomer. The crosslinking catalyst in an amount within this range can lead to a sufficiently cured product. The amount of the crosslinking catalyst is more preferably 0.3 to 5 parts by mass, still more preferably 0.5 to 2 parts by mass.

In the case of using an acid generator as the crosslinking catalyst, an acid scavenger may optionally be added so as to control diffusion of the acid generated from the acid generator.

The acid scavenger is preferably, but is not limited to, a basic compound such as an amine (especially, organic amine), a basic ammonium salt, or a basic sulfonium salt. More preferred among these acid scavengers is an organic amine because it has excellent imaging performance.

Specific examples of the acid scavenger include 1,5-diazabicyclo[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, pyridinium p-toluenesulfonate, 2,4,6-trimethylpyridinium p-toluenesulfonate, tetramethylammonium p-toluenesulfonate, tetrabutylammonium lactate, triethylamine, and tributylamine. Preferred among these are organic amines such as 1,5-diazabicyclo[4.3.0]-5-nonene, 1,8-diazabicyclo[5.4.0]-7-undecene, 1,4-diazabicyclo[2.2.2]octane, 4-dimethylaminopyridine, 1-naphthylamine, piperidine, hexamethylenetetramine, imidazoles, hydroxypyridines, pyridines, 4,4'-diaminodiphenyl ether, triethylamine, and tributylamine.

The amount of the acid scavenger is preferably 20 parts by mass or less, more preferably 0.1 to 10 parts by mass, still more preferably 0.5 to 5 parts by mass, relative to 100 parts by mass of the acid generator.

The silicon-containing compound is preferably a silicon-containing compound capable of forming a polysiloxane structure by a reaction, preferably a sol-gel reaction.

In an embodiment, the silicon-containing compound may be an organosilicon compound containing carbon and silicon.

Examples of the organosilicon compound include Si—H compounds containing a Si—H bond; Si—N compounds containing a Si—N bond, such as aminosilane compounds, silazanes, silyl acetamides, and silyl imidazoles; Si—O compounds containing a Si—O bond, such as monoalkoxysilanes, dialkoxysilanes, trialkoxysilanes, tetraalkoxysilanes, siloxanes, silyl esters, and silanol; halogenosilanes, including Si—Cl compounds containing a Si—Cl bond, such as monochlorosilane, dichlorosilane, trichlorosilane, and tetrachlorosilane; Si—(C)4 compounds; Si—Si compounds containing a Si—Si bond; vinylsilanes; allylsilanes; and ethynylsilanes. In other words, the organosilicon compound is preferably at least one compound selected from the group consisting of Si—H compounds, Si—N compounds, halogenosilanes, Si—(C)4 compounds, Si—Si compounds, vinylsilanes, allylsilanes, and ethynylsilanes. The organosilicon compound is more preferably a compound in which at least one atom selected from the group consisting of hydrogen, oxygen, and a halogen binds to Si.

The following shows specific examples of the organosilicon compound.

(Si—H compounds)
[Chem. 34]

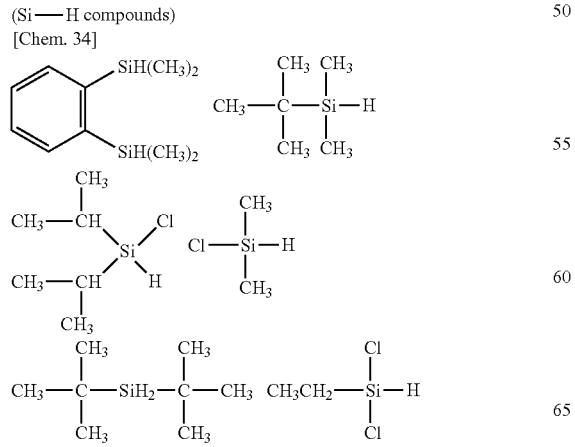
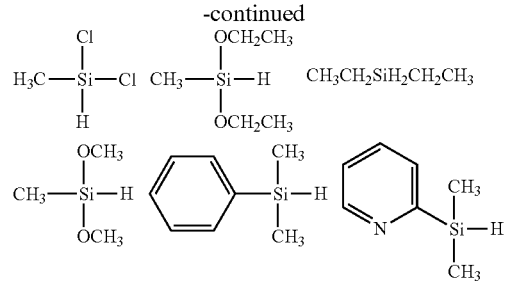
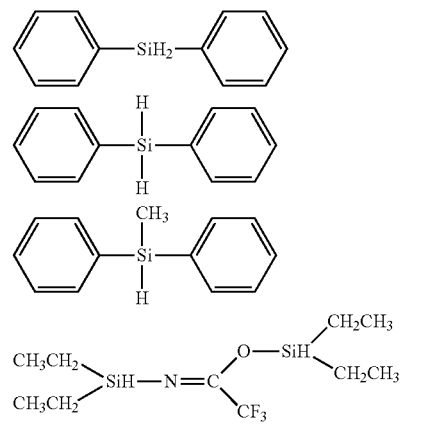
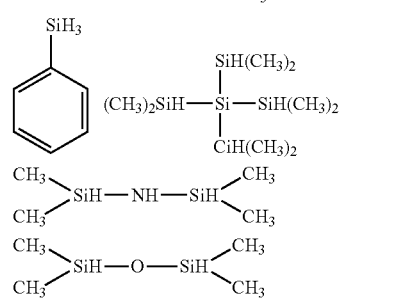
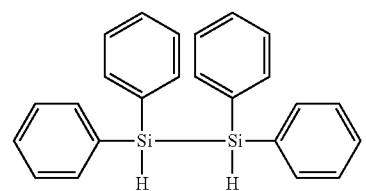
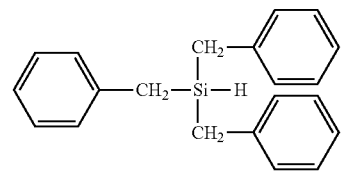

[Chem. 35]

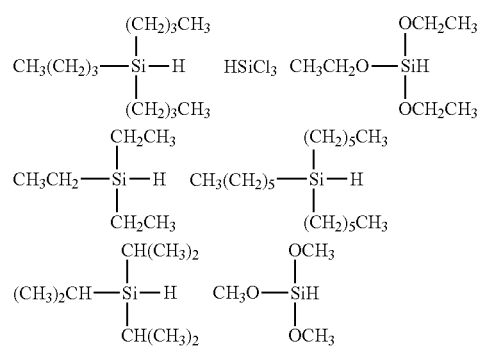

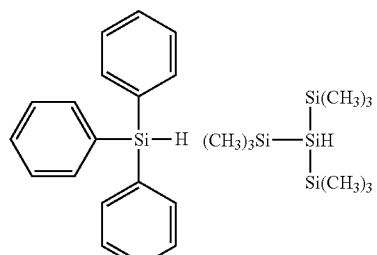
(Si—N compounds)
[Chem. 36]
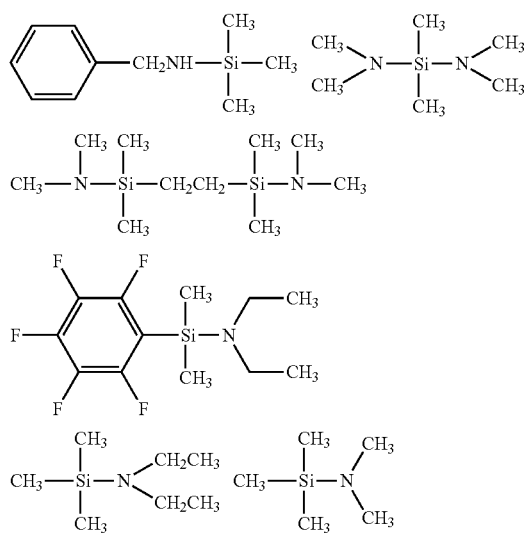
[Chem. 37]
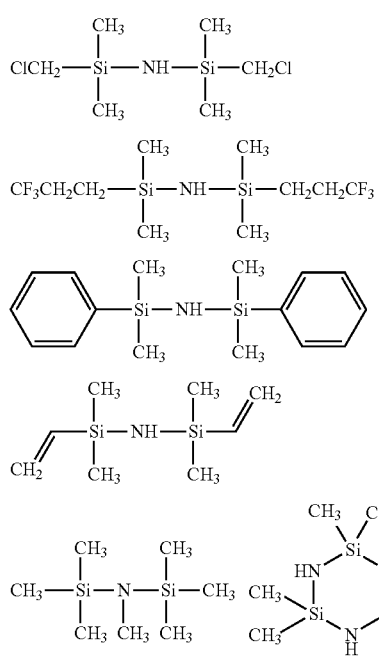
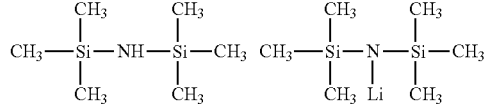
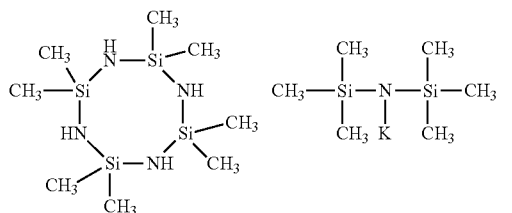
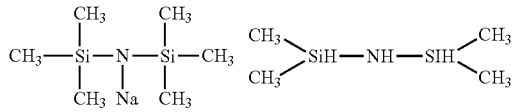
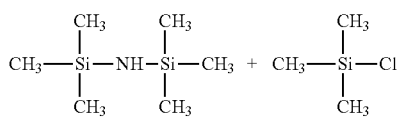
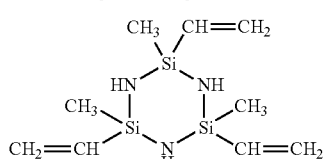
[Chem. 38]
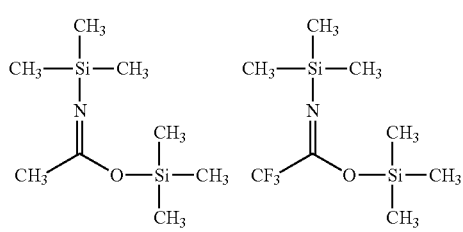
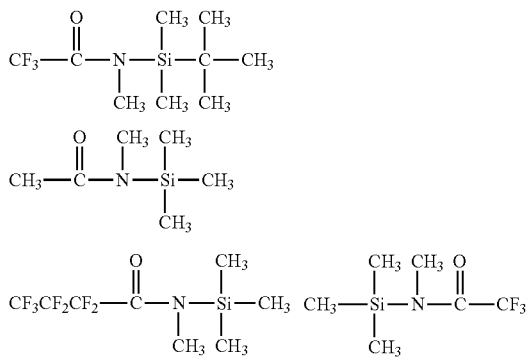
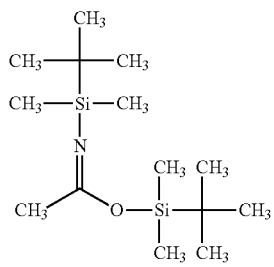
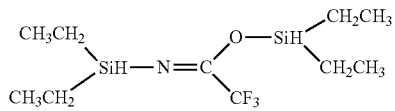

-continued
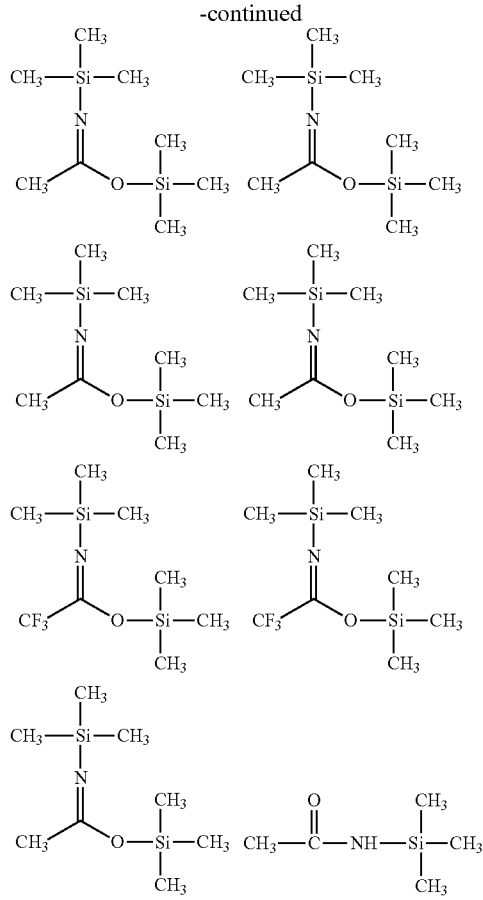
[Chem. 39]
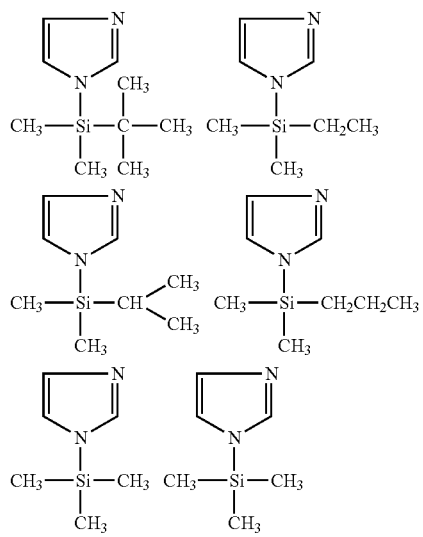
[Chem. 40]
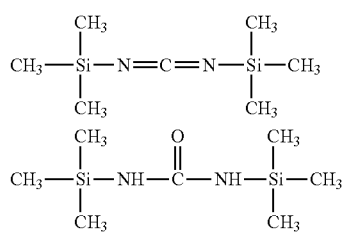
-continued
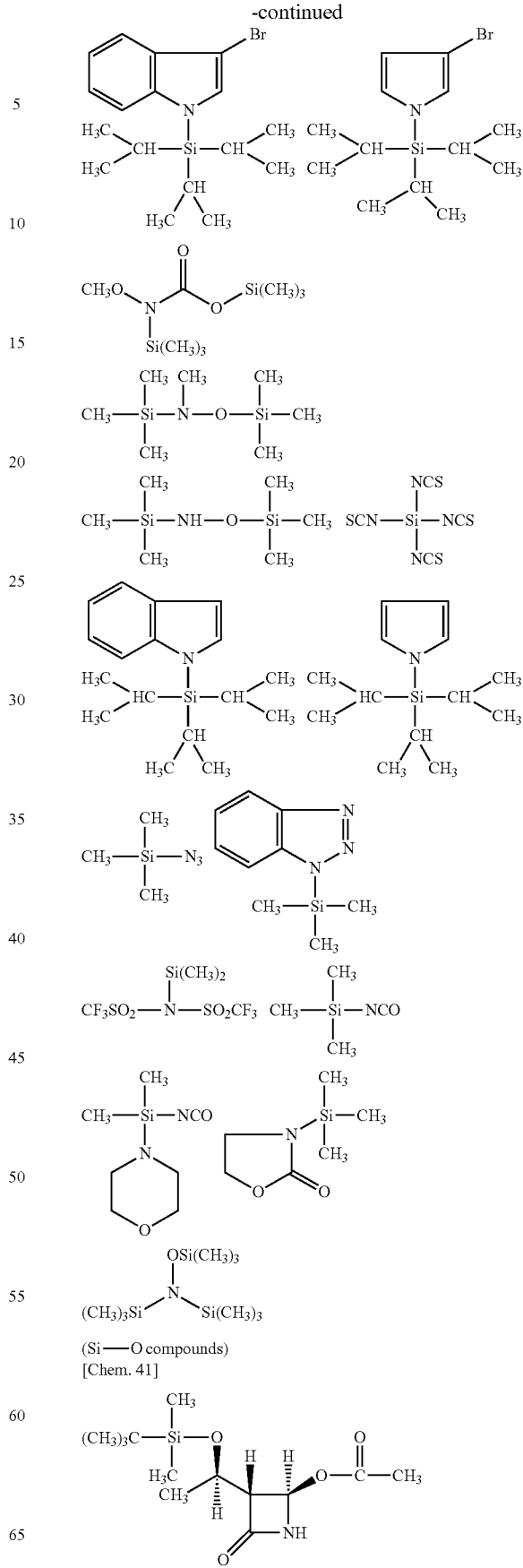
(Si—O compounds)
[Chem. 41]
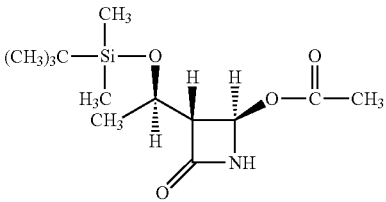

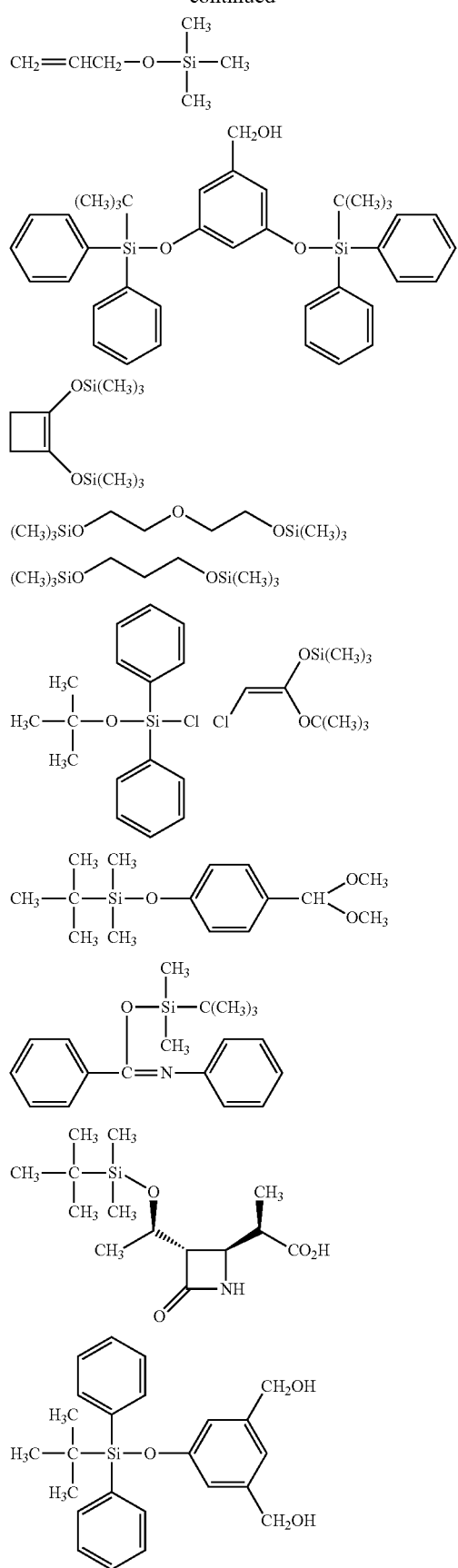
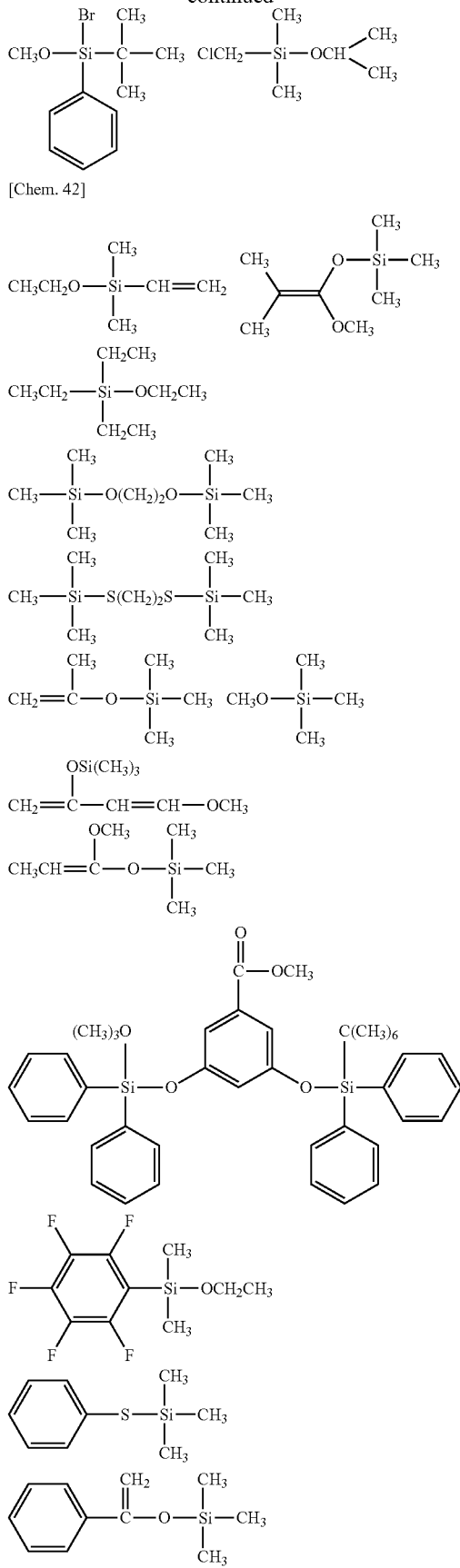
[Chem. 42]

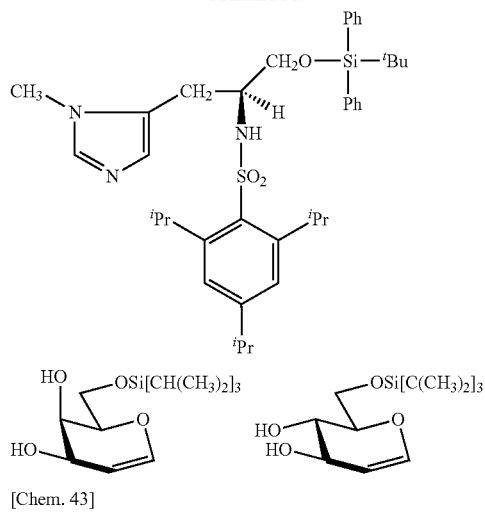
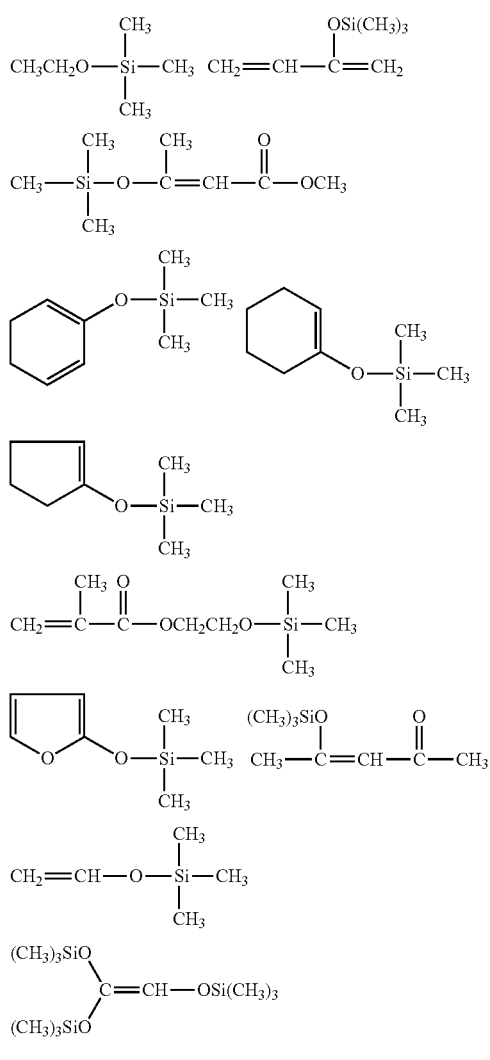
[Chem. 43]
[Chem. 44]
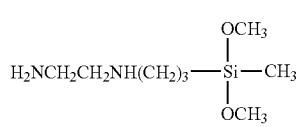
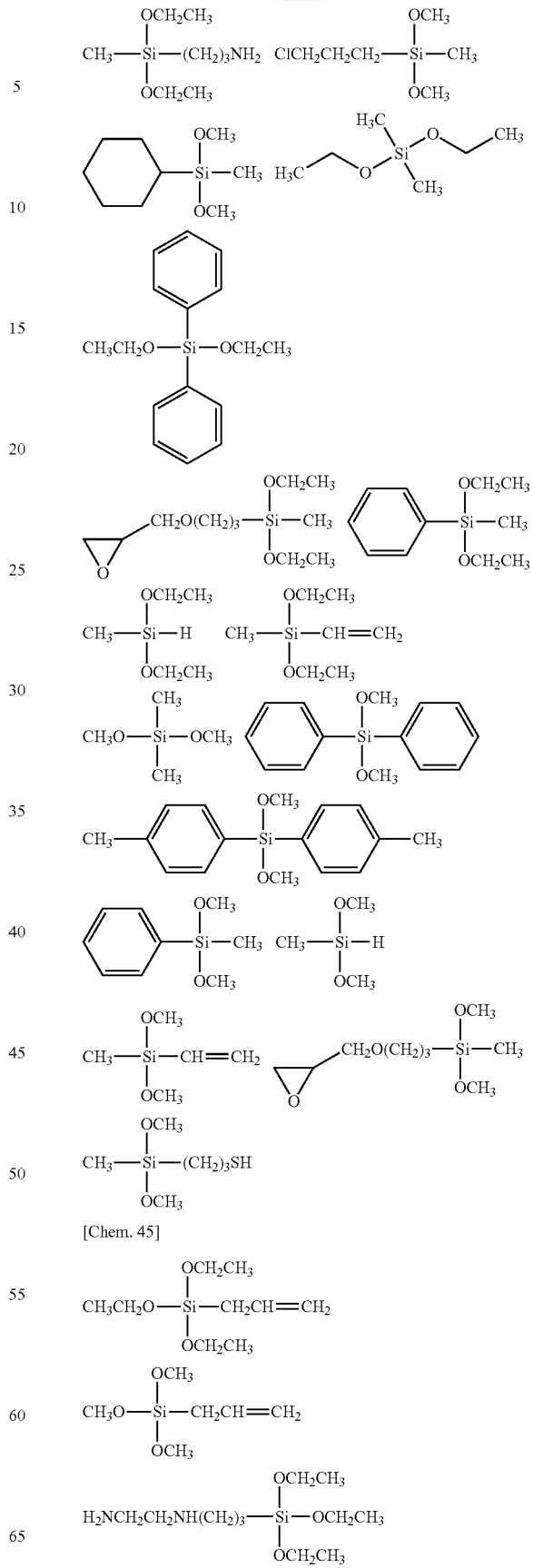
[Chem. 45]
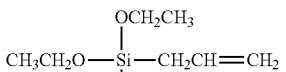
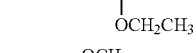
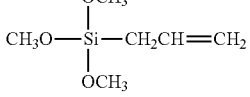
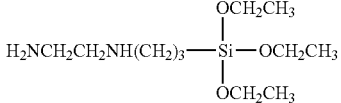

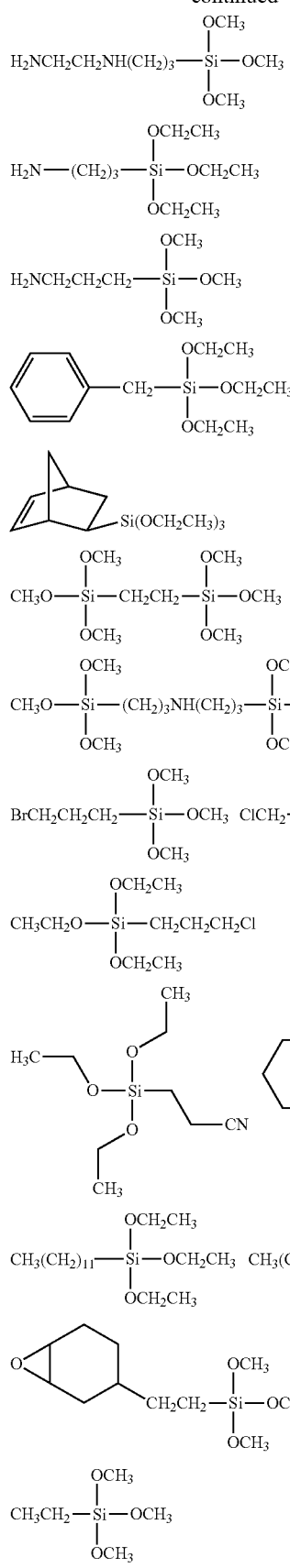
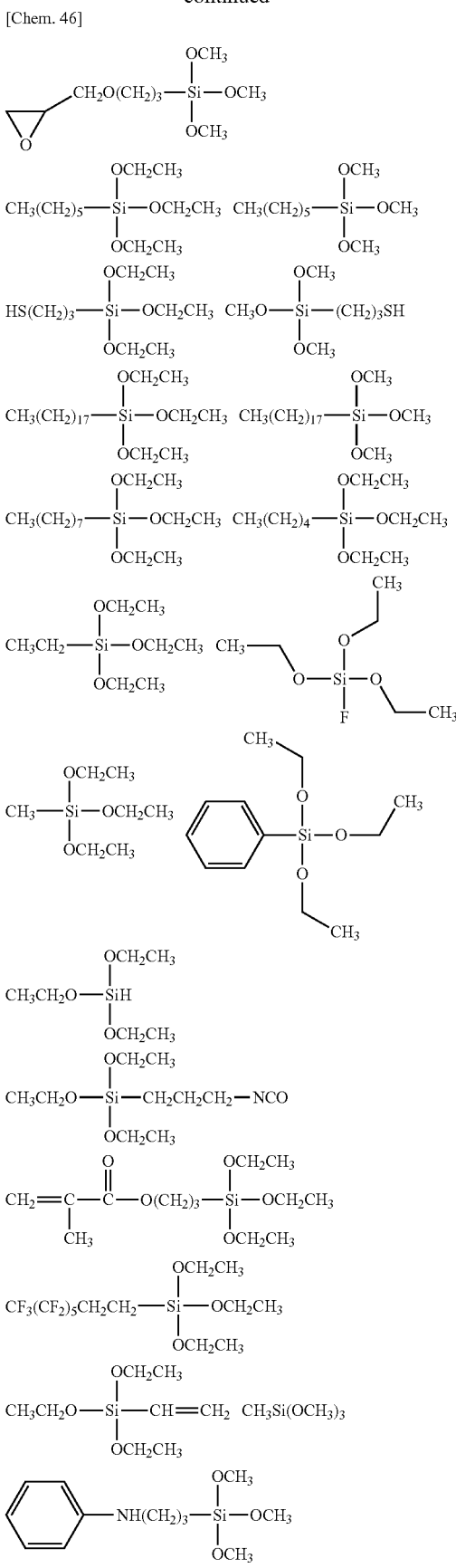

-continued
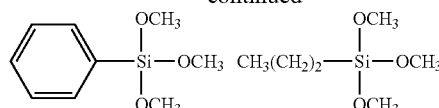
[Chem. 47]
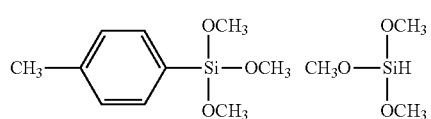
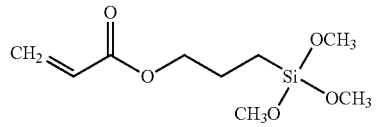
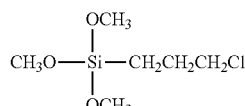
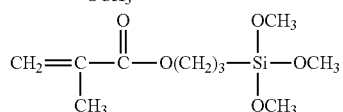
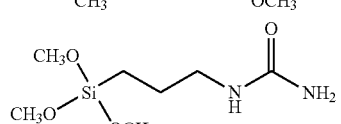
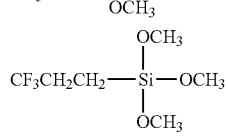
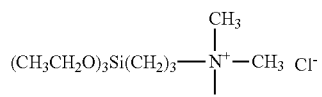
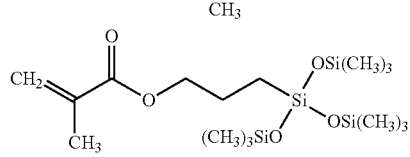
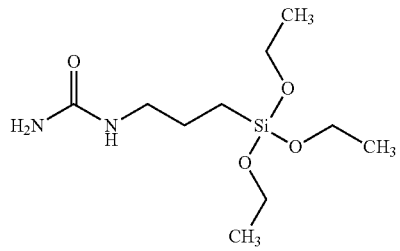
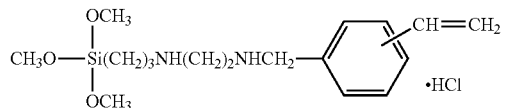
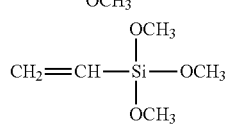
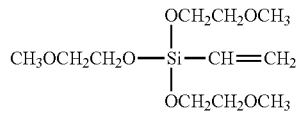
-continued
[Chem. 48]
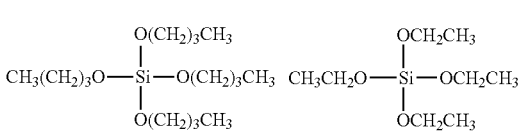
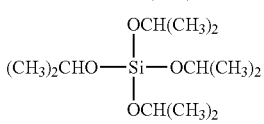
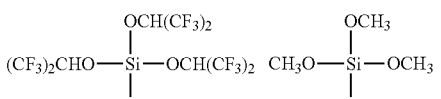
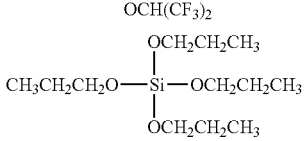
[Chem. 49]
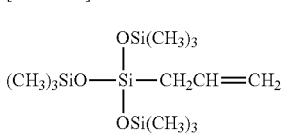
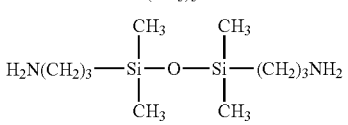
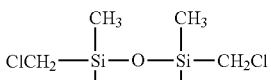
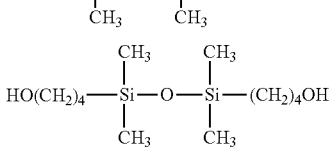
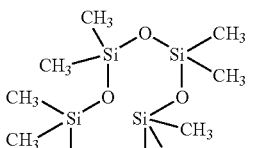
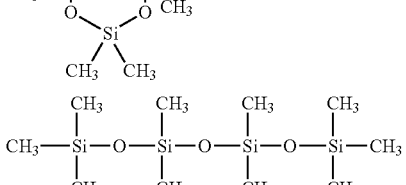
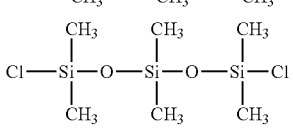
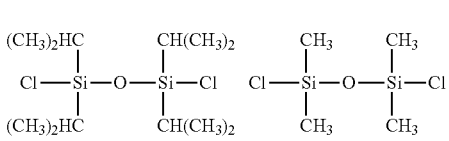

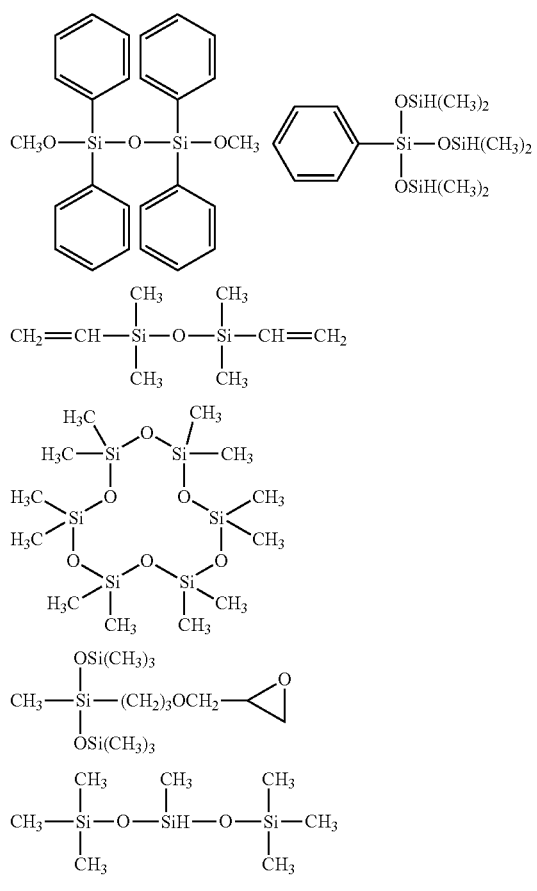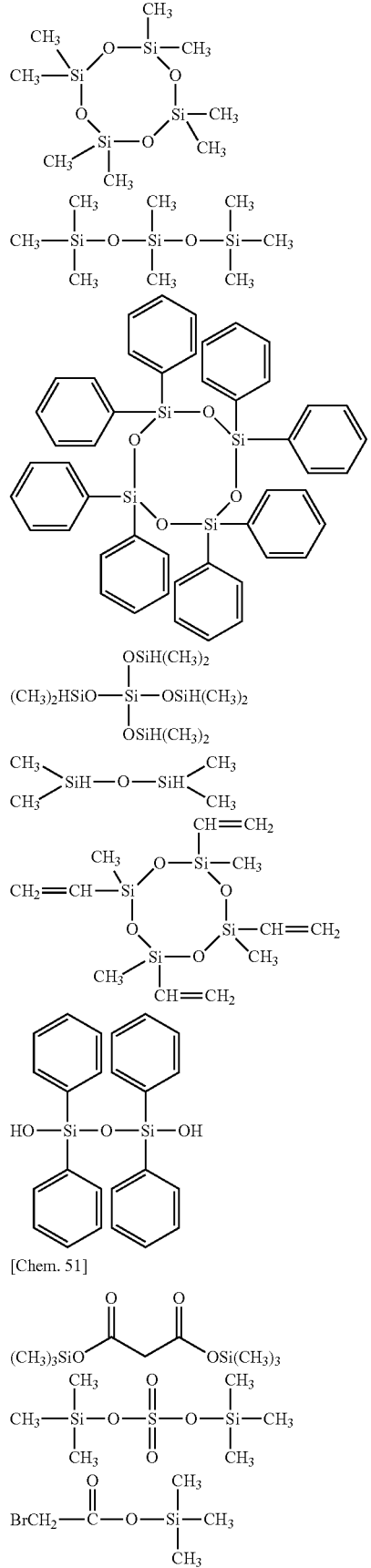

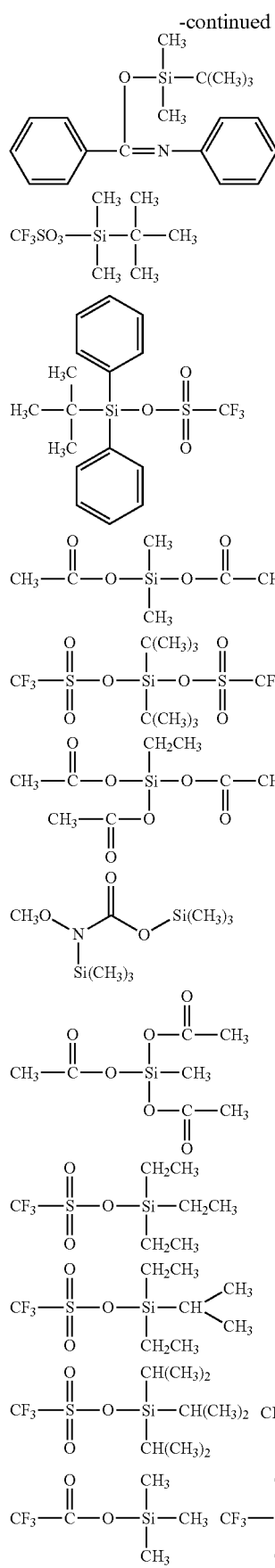
(Halogenosilanes)
Si—Cl compounds:
[Chem. 53]

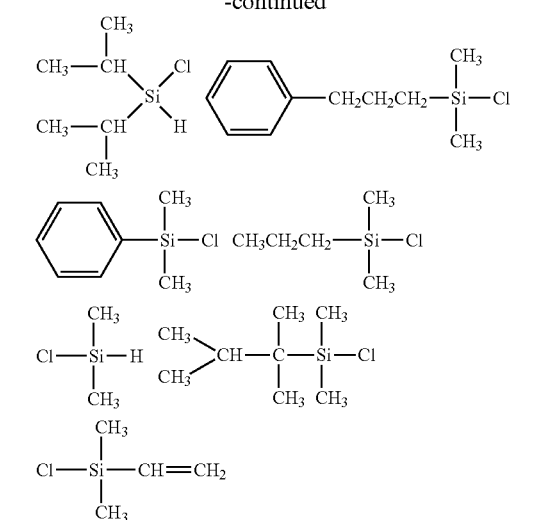
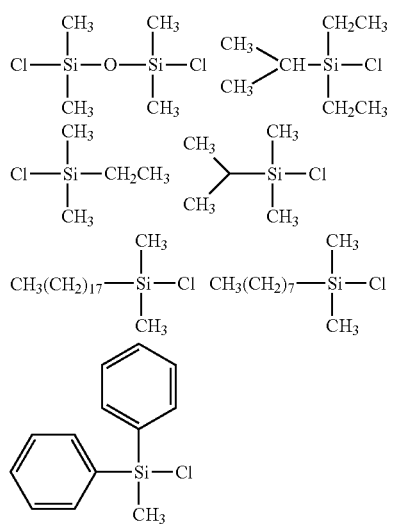
[Chem. 54]
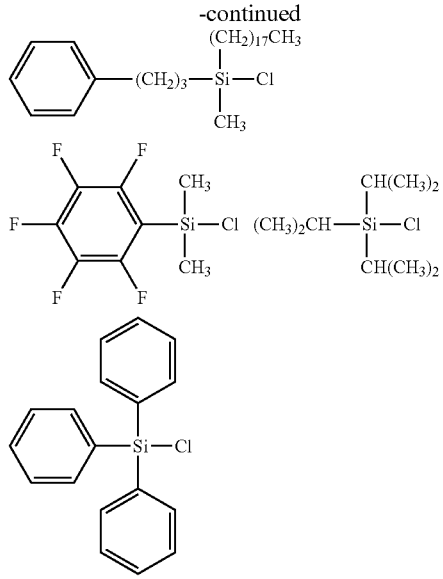
[Chem. 55]
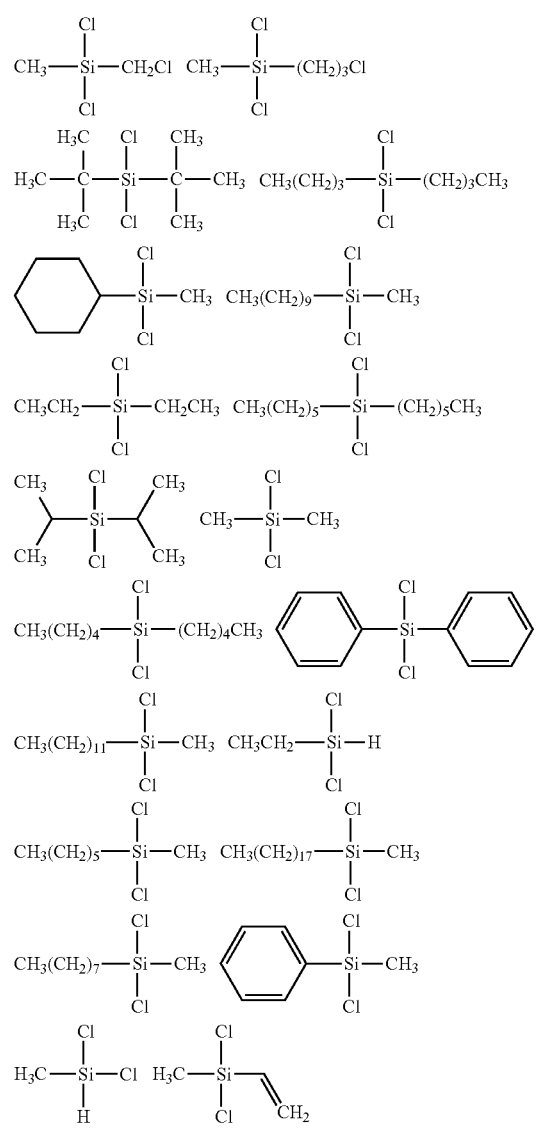

-continued
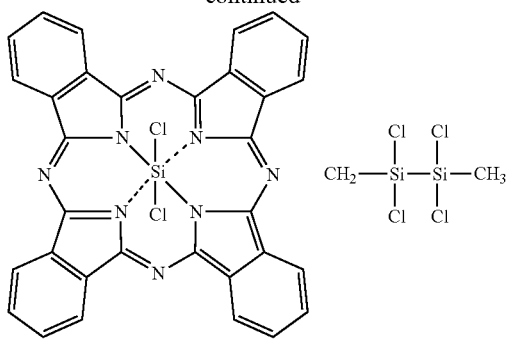
[Chem. 56]
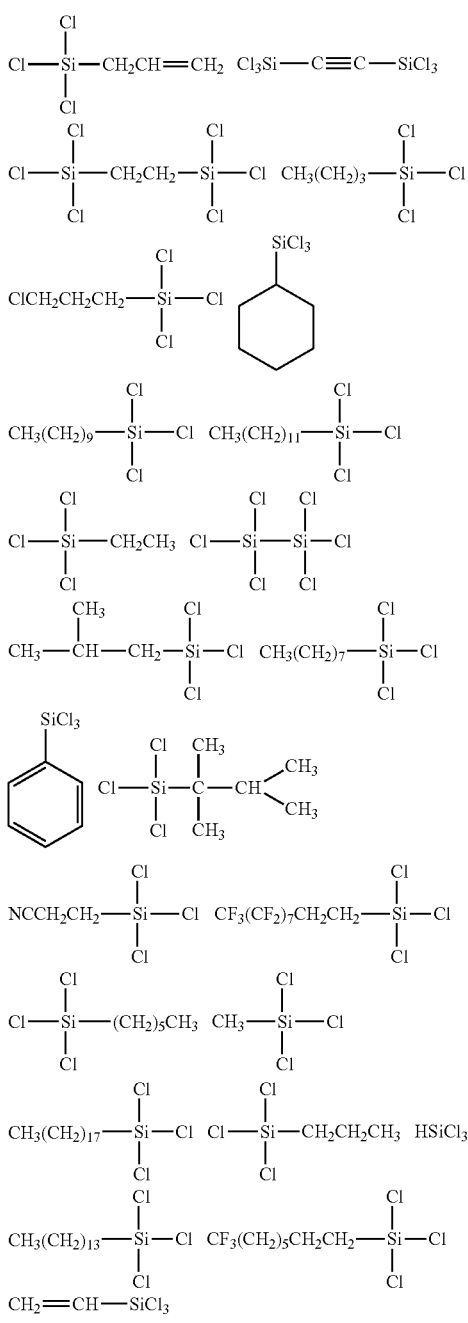
-continued
Halogenosilanes other than Si—Cl compounds:
[Chem. 57]
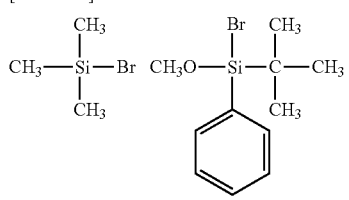
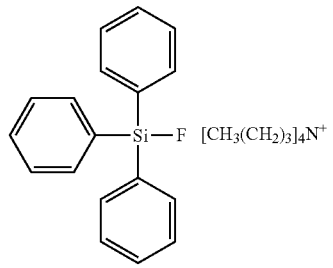
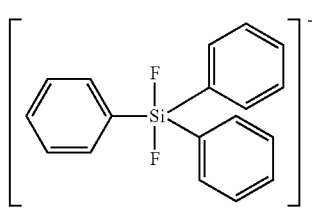
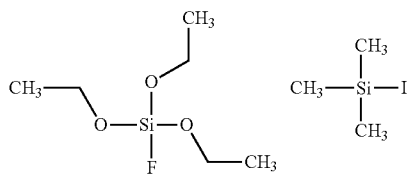
(Si—(C)₄ compounds)
[Chem. 58]
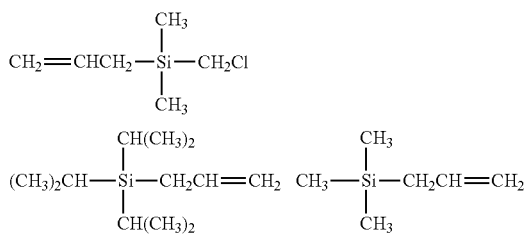
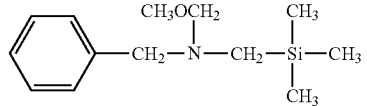
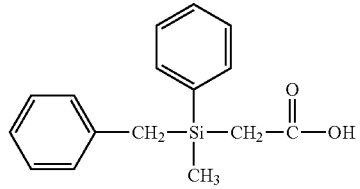
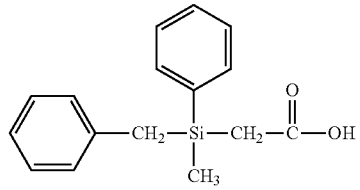

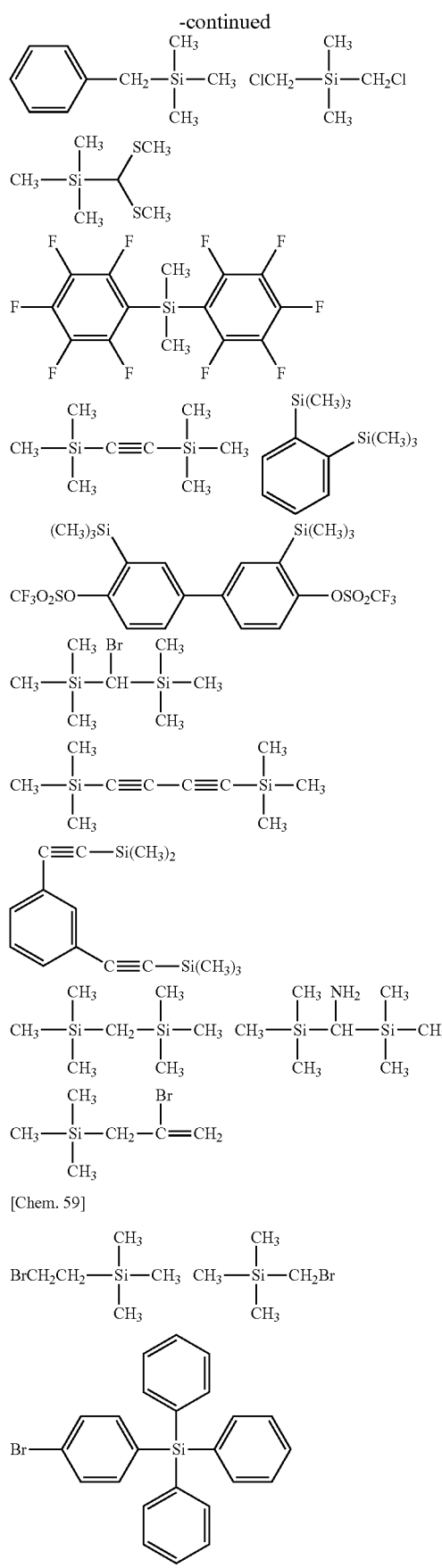
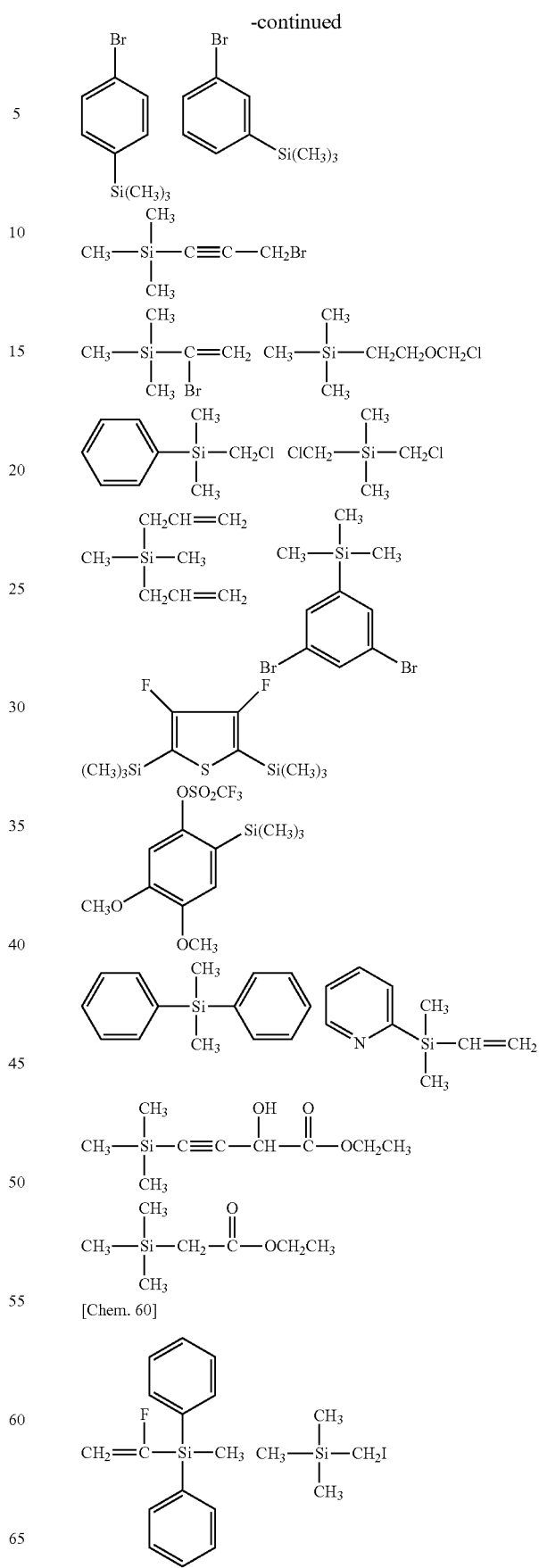
[Chem. 59]
[Chem. 60]

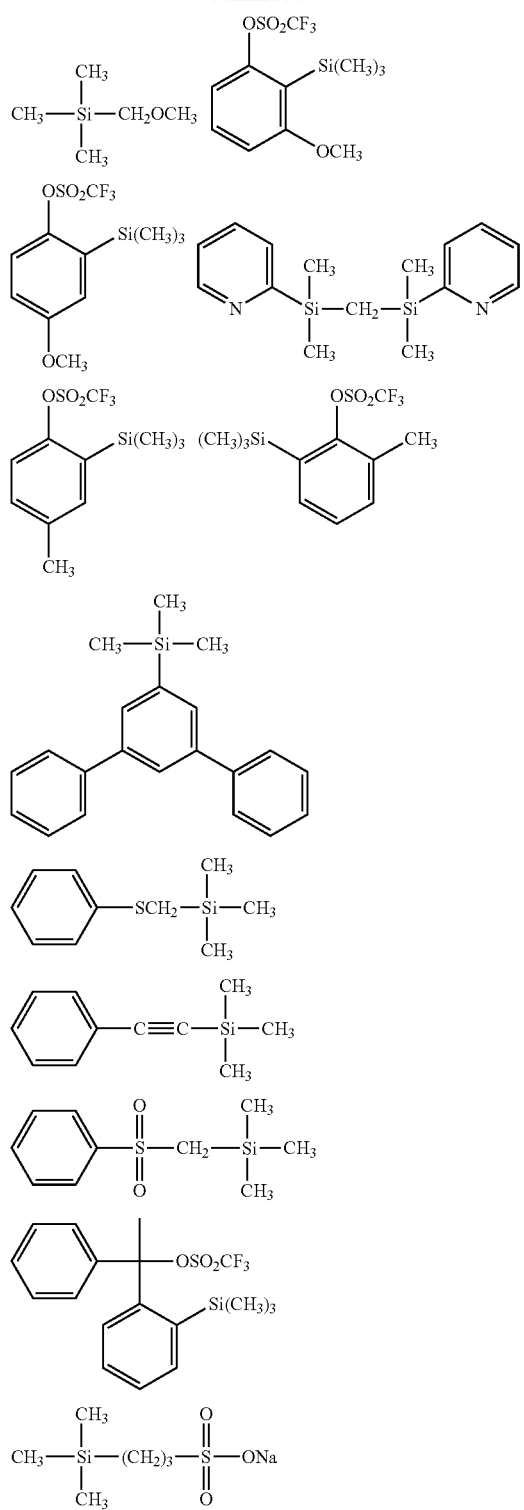

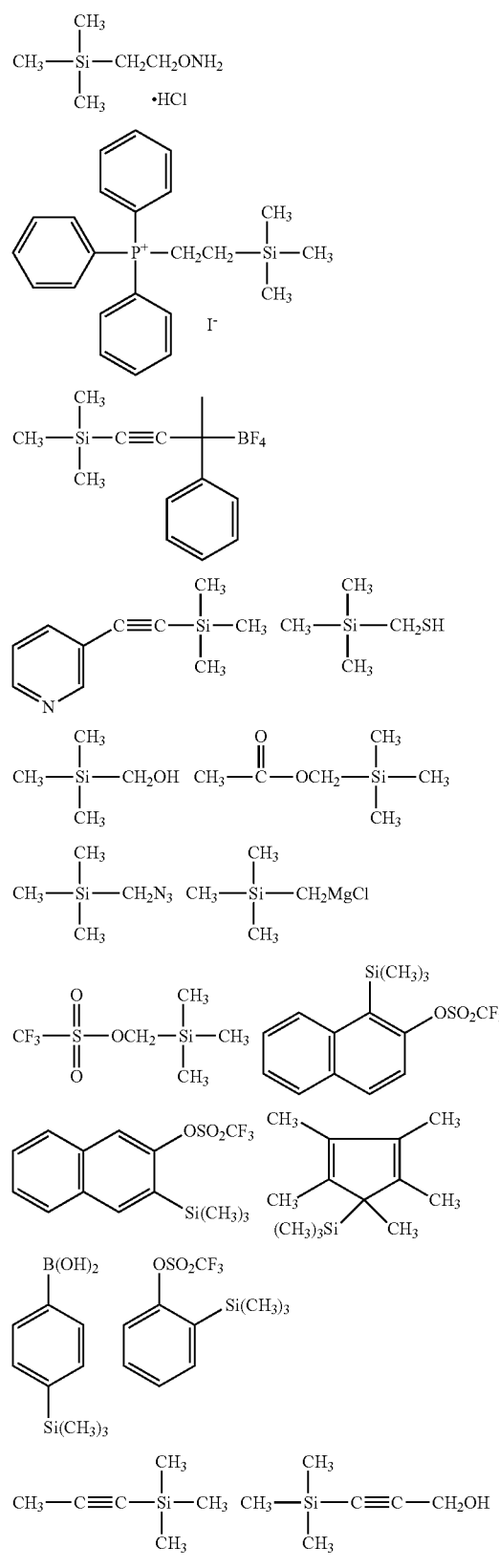
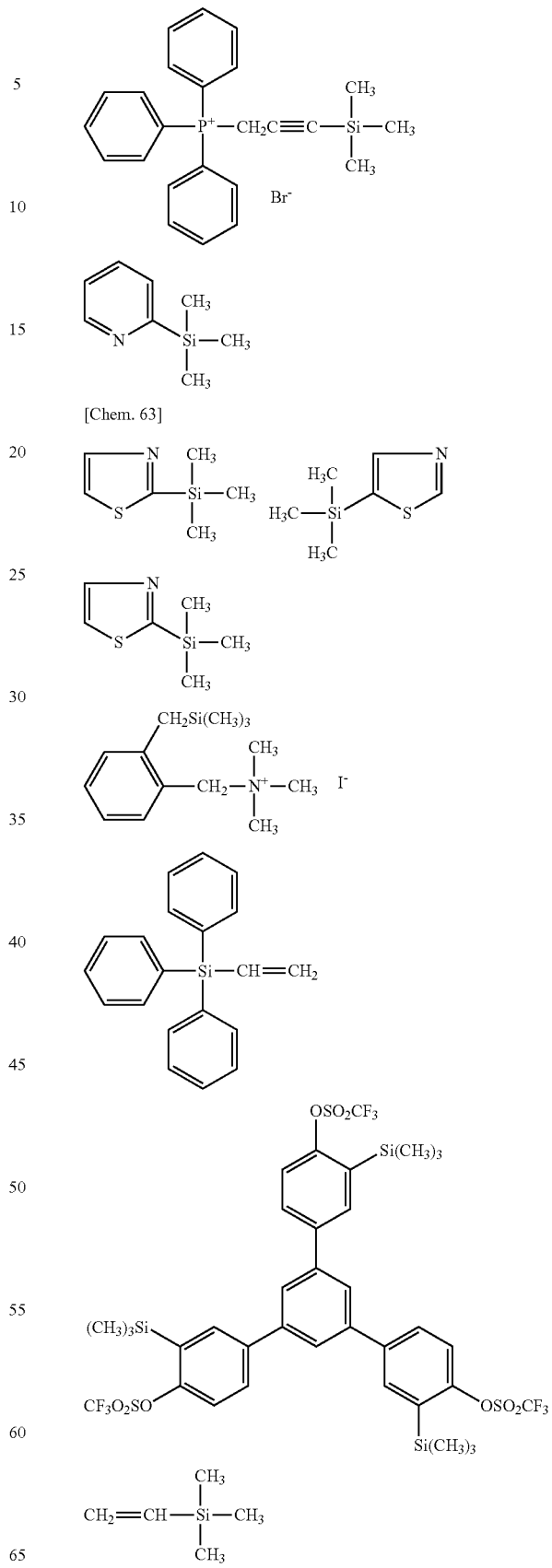

(Si—Si compounds)
[Chem. 64]
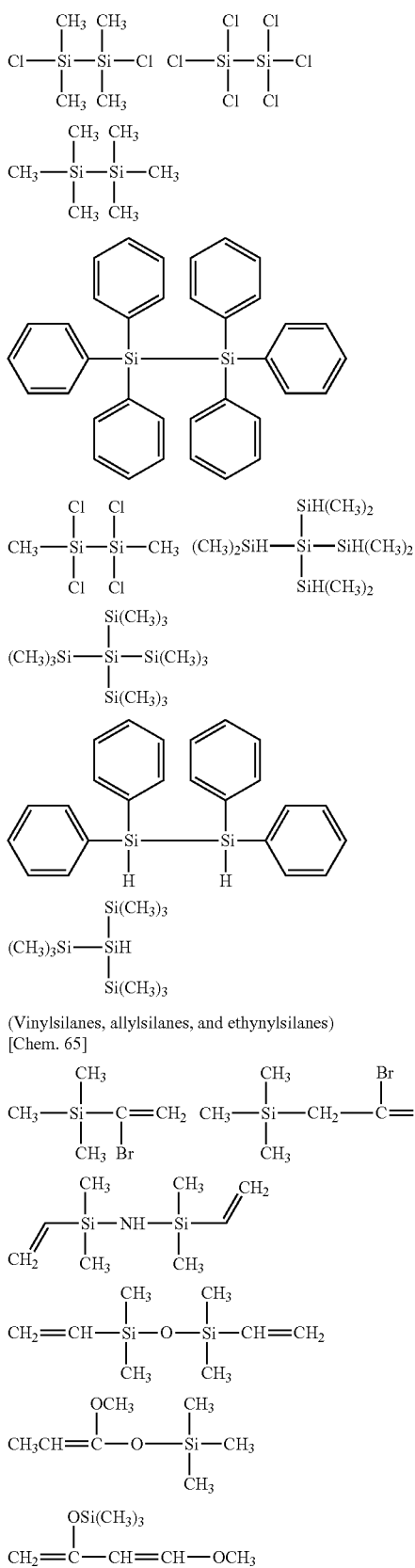
(Vinylsilanes, allylsilanes, and ethynylsilanes)
[Chem. 65]
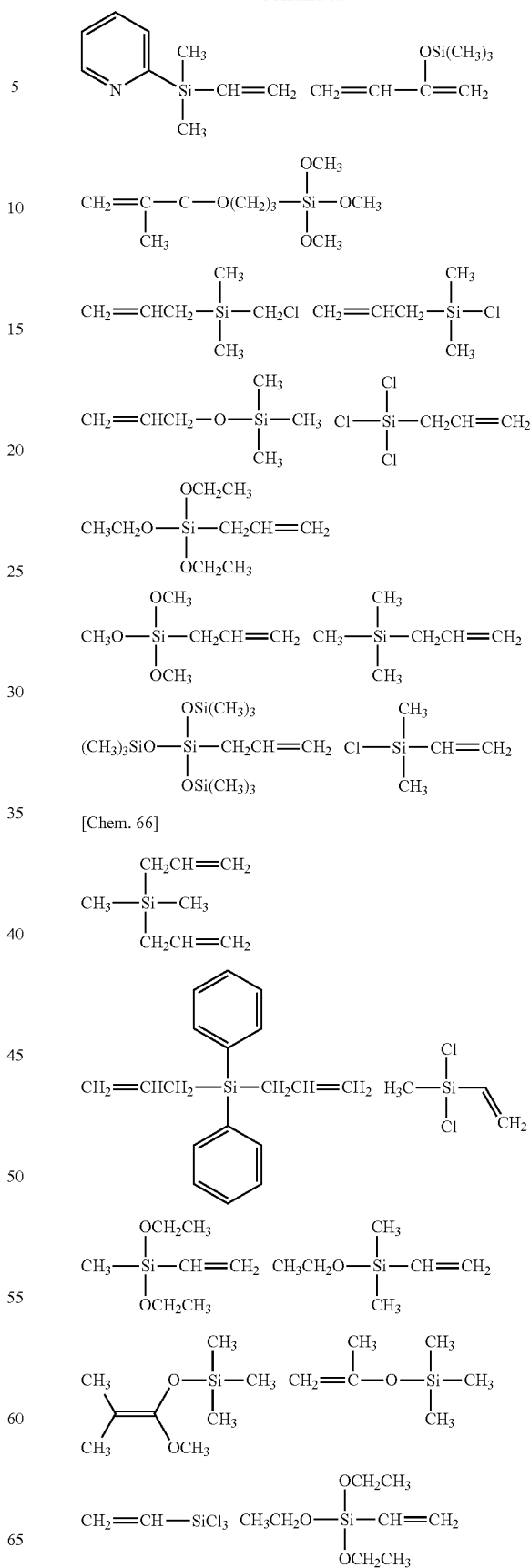
[Chem. 66]

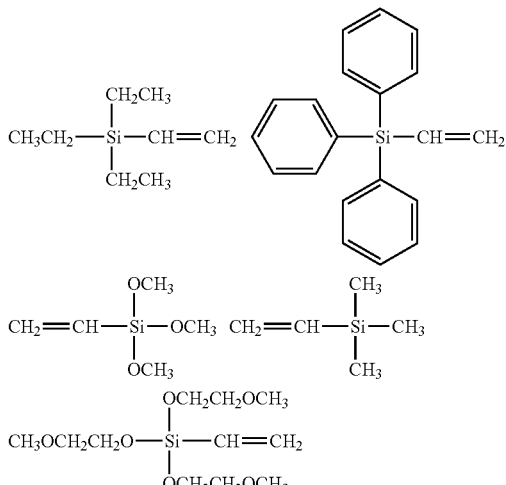

[Chem. 67]

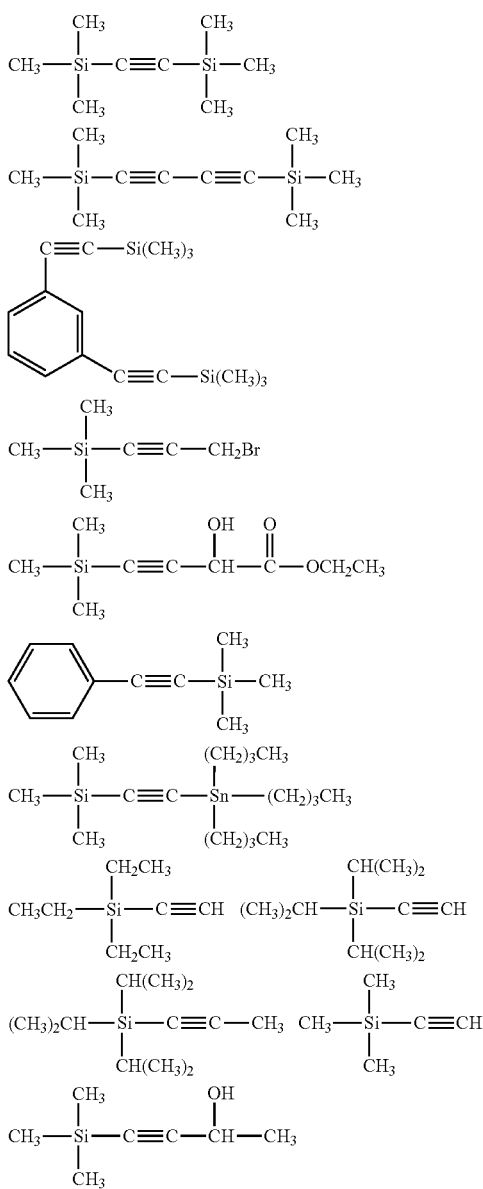

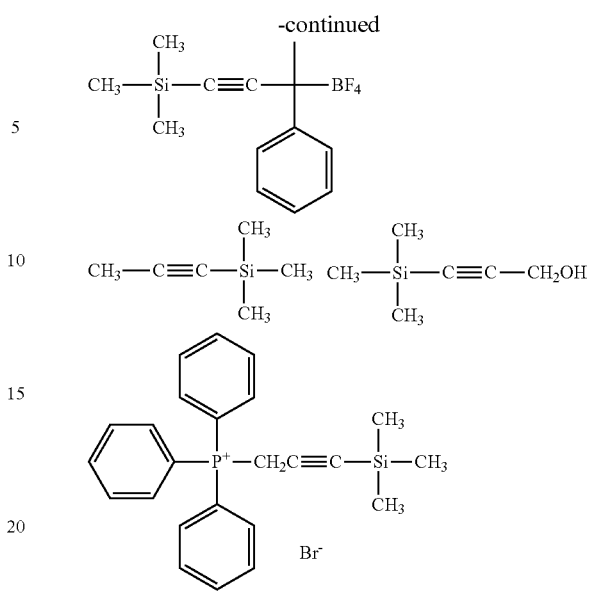

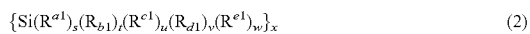

The organosilicon compound is more preferably a compound represented by the following formula (2):

$$\{Si(R^{a1})_s(R_{b1})_t(R^{c1})_u(R_{d1})_v(R^{e1})_w\}_x \qquad (2)$$

wherein $R^{a1}$, $R^{b1}$, $R^{c1}$, and $R^{d1}$ are each individually a hydrogen atom, a halogen atom, a C1-C10 alkoxyl group, a C1-C10 amino group, a C1-C10 alkyl group, a C6-C10 aryl group, a C3-C10 allyl group, or a C3-C10 glycidyl group; $R^{e1}$s are each individually —O—, —NH—, —C≡C—, or a silane bond; s, t, u, and v are each individually 0 or 1; w is an integer of 0 to 4; x is 1 to 20; when x is 1, s+t+u+v is 4 and w is 0; when x is 2 to 20, the sums of s+t+u+v are each individually 0 to 4 and ws are each individually 0 to 4; when w is an integer of 1 or greater, at least two Si atoms bind to each other in a linear, laddery, cyclic, or heterocyclic form via $R^{e1}$. $R^{a1}$, $R^{b1}$, $R^{c1}$, and $R^{d1}$ are each a monovalent group binding to Si. $R^{e1}$ is a divalent group binding to two Si atoms.

In the formula (2), preferably, at least one of $R^{a1}$, $R^{b1}$, $R^{c1}$, or $R^{d1}$ is individually a hydrogen atom, a halogen atom, a C1-C10 alkoxy group, or a C1-C10 amino group and the others are each individually a C1-C10 alkyl group, a C6-C10 aryl group, a C3-C10 allyl group, or a C3-C10 glycidyl group. When x is 2 to 20, preferably, the sums of s+t+u+v are each individually 1 to 3 and ws are 1 to 3.

In the formula (2), $R^{a1}$, $R^{b1}$, $R^{c1}$, and $R^{d1}$ are preferably each individually a C1-C6 alkyl group, a C6-C8 aryl group, a C1-C6 alkoxy group, or a C1-C6 amino group, more preferably a C1-C4 alkoxy group.

In $R^{a1}$, $R^{b1}$, $R^{c1}$, and $R^{d1}$, the alkyl group preferably contains 1 to 5 carbon atoms. The alkyl group may be linear, cyclic, or branched. Any of hydrogen atoms thereof may be replaced by a different atom such as a fluorine atom. Examples of the alkyl group include a methyl group, an ethyl group, a propyl group, a butyl group, and a pentyl group. For example, $R^{a1}$, $R^{b1}$, $R^{c1}$, and $R^{d1}$ are each preferably a methyl group, an ethyl group, a propyl group, or an isopropyl group. Each of them may be more preferably a methyl group or an ethyl group. The aryl group is preferably a phenyl group, a naphthyl group, a methylphenyl group, an ethylphenyl group, or a dimethylphenyl group, for example. The halogen atom is preferably fluorine, chlorine, bromine, or iodine, particularly preferably chlorine.

In $R^{a1}$, $R^{b1}$, $R^{c1}$, and $R^{d1}$, the alkoxy group preferably contains 1 to 5 carbon atoms. The alkoxy group may be linear, cyclic, or branched. Any of the hydrogen atoms may be replaced by a different atom such as a fluorine atom. The alkoxy group is preferably a methoxy group, an ethoxy group, a propyloxy group, or a butoxy group, more preferably a methoxy group or an ethoxy group.

$R^{e1}$s are each individually —O—, —NH—, —C≡C—, or a silane bond. $R^{e1}$s are each preferably —O—, —NH—, or —C≡C—. $R^{e1}$s are each a divalent group binding to two Si atoms, and $R^{e1}$ allows two or more silicon atoms to bind to each other in a linear, laddery, cyclic, or heterocyclic form via $R^{e1}$. When x is an integer of 2 or greater, the silicon atoms themselves may bind to each other. Preferred specific examples of the silicon-containing compound include compounds containing one or two or more Si atoms such as the aforementioned Si—H compounds, Si—N compounds, halogenosilanes, Si—(C)₄ compounds, Si—Si compounds, vinylsilanes, allylsilanes, and ethynylsilanes.

In an embodiment, the silicon-containing compound is a compound represented by the following formula (3) or the following formula (4).

$$SiR^5{}_4 \qquad (3)$$

$$Si_yO_zR^6{}_{4y-z} \qquad (4)$$

In the formula (3), $R^5$s are each individually a halogen atom or a hydrolyzable group.

In the formula (4), $R^6$s are each individually a halogen atom or a hydrolyzable group; y is 2 or greater; z is 1 or greater; and 4y-2z is greater than 0.

The functional film of the invention may be produced by, for example, a production method including a step (1) of preparing a composition containing a resin to be contained in a layer (A) and a solvent, a step (2) of applying the composition to a substrate (S) and drying the composition to form a laminate (a) including the layer (A) on the substrate (S), a step (3) of forming a layer (B) on a mold having a microrelief pattern on a surface thereof to form a laminate (b) including the layer (B) on the mold, a step (4) of stacking the laminates (a) and (b) such that the layer (A) side of the laminate (a) and the layer (B) side of the laminate (b) are in contact with each other, and a step (5) of releasing the layer (B) from the mold.

When the resin in the layer (A) is a resin obtainable by curing a curable resin, a resin obtainable by curing a curable monomer, or a resin including a polysiloxane structure formed from a silicon-containing compound, the composition prepared in the step (1) contains at least one selected from the group consisting of the aforementioned curable resin, the aforementioned curable monomer, and a silicon-containing compound.

The composition contains a solvent. The presence of a solvent in the composition enables easy application of the composition to the substrate (S) in the step (2). Examples of the solvent include C5-C12 perfluoroaliphatic hydrocarbons (e.g., perfluorohexane, perfluoromethylcyclohexane, and perfluoro-1,3-dimethylcyclohexane); polyfluoroaromatic hydrocarbons (e.g., bis(trifluoromethyl)benzene); polyfluoroaliphatic hydrocarbons; hydrofluoroethers (HFE) (e.g., alkyl perfluoroalkyl ethers (in which the perfluoroalkyl group and the alkyl group may be linear or branched) such as perfluoropropyl methyl ether ($C_3F_7OCH_3$), perfluorobutyl methyl ether ($C_4F_9OCH_3$), perfluorobutyl ethyl ether ($C_4F_9OC_2H_5$), and perfluorohexyl methyl ether ($C_2F_5CF(OCH_3)C_3F_7$)); hydrochlorofluorocarbons (e.g., Asahiklin AK-225 (trade name)); cellosolve-based solvents such as methyl cellosolve, ethyl cellosolve, methyl cellosolve acetate, and ethyl cellosolve acetate; ester-based solvents such as diethyl oxalate, ethyl pyruvate, ethyl-2-hydroxy butyrate, ethyl acetoacetate, ethyl acetate, butyl acetate, amyl acetate, ethyl butyrate, butyl butyrate, methyl lactate, ethyl lactate, methyl 3-methoxypropionate, ethyl 3-methoxypropionate, methyl 2-hydroxyisobutyrate, and ethyl 2-hydroxyisobutyrate; propylene glycol-based solvents such as propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, and dipropylene glycol dimethyl ether; ketone-based solvents such as acetone, methyl ethyl ketone, methyl isobutyl ketone, 2-hexanone, cyclohexanone, methyl amino ketone, and 2-heptanone; alcohol-based solvents such as methanol, ethanol, propanol, isopropanol, butanol, and diacetone alcohol; and aromatic hydrocarbons such as toluene and xylene. These solvents may be used alone or as a mixture of two or more thereof. Preferred among these are hydrofluoroethers, glycol-based solvents, ester-based solvents, ketone-based solvents, and alcohol-based solvents, particularly preferred are perfluorobutyl methyl ether ($C_4F_9OCH_3$) and/or perfluorobutyl ethyl ether ($C_4F_9OC_2H_5$), propylene glycol monomethyl ether, ethyl acetate, butyl acetate, propylene glycol monomethyl ether acetate, methyl ethyl ketone, methyl isobutyl ketone, and diacetone alcohol.

The composition may further contain other components such as the aforementioned crosslinking catalyst, the aforementioned sensitizer, and the aforementioned acid scavenger.

Examples of a method of applying the composition in the step (2) include immersion coating, spin coating, flow coating, spray coating, slit coating, roll coating, gravure coating, microgravure coating, bar coating, die coating, screen printing, and methods similar to them.

Drying the composition applied to the substrate (S) in the step (2) is very important to provide a functional film that sufficiently exerts the characteristics of the resin (the resin in the layer (A)) serving as a material for imparting functions to the functional film and that has an excellent antifouling property, water-repellency, and oil-repellency. Drying the composition enables production of a functional film satisfying the formulae (1) and (2) and formation of a clear interface between the layer (A) and the layer (B). The drying is preferably performed under conditions that can remove the solvent to 5% by mass or less, more preferably performed under conditions that can remove the solvent completely. The drying may be performed at 20° C. to 50° C. for 1 to 10 minutes. The drying may be performed under reduced pressure.

In the step (3), a layer (B) is formed on a mold having a microrelief pattern on a surface thereof to form a laminate (b) including a layer (B) on the mold.

The mold may be formed of a material appropriately selected in accordance with the purpose and need thereof, and examples of the material include metals, metal oxides, quartz, polymeric resins such as silicone, semiconductors, insulators, and composites thereof.

The mold may have any shape such as a roll shape or a plate shape.

The layer (B) may be formed by applying a composition containing at least one compound selected from the compound (F), the compound (G), and the compound (H) and a solvent. Examples of a method of applying the composition include immersion coating, spin coating, flow coating, spray coating, slit coating, roll coating, gravure coating, microgravure coating, bar coating, die coating, screen printing, and methods similar to them. The composition applied may be dried.

The composition containing a solvent enables formation of a very thin layer (B). Examples of the solvent include those mentioned as examples of the solvent for the composition prepared in the step (1).

In the step (4), the laminates (a) and (b) are stacked such that the layer (A) side of the laminate (a) and the layer (B) side of the laminate (b) are in contact with each other, whereby the uneven pattern is transferred.

When the layer (B) contains a compound obtainable by curing the compound (F) and the curing method therefor is the same as that for the constitutional materials of the layer (A), the layer (A) and the layer (B) can be cured with the laminates (a) and (b) stacked in the step (3). The curing may be performed by heating the stacked laminates (a) and (b) or applying light thereto. Examples of the light include active energy rays, such as electromagnetic waves within the wavelength range of 350 nm or shorter, i.e., ultraviolet rays, electron beams, X-rays, and γ-rays. The layer (A) and the layer (B) may be cured after the step (5) of removing the mold from the layer (B).

In the step (5), the mold is removed from the layer (B) to provide a functional film having a microrelief pattern. The functional film has a transferred pattern that is an inverted one of the microrelief pattern of the mold. The layer (B) that contains a compound containing a perfluoropolyether group enables very easy removal of the mold from the layer (B).

The functional film may be used in a wide variety of applications such as electronics, optics, medical treatment, chemical analysis, construction materials, and automotive interior and exterior. For example, for electronic devices, the functional film may be used for integrated circuits and energy generation and storage systems such as SOC, CMOS, CCD, NAND flash memories, DRAM, light emitting diodes (LEDs), lasers, solar cells, fuel cells, and lithium ion batteries. The production method can provide films having a regular microrelief structure such as solar light condensing films, liquid crystal polarizers, and wire grid polarizers. These devices may be assembled with other components into solar panels, smartphones, flexible displays, radio frequency identifiers, wearable computers, infrared sensors, automated driver assistance systems, and automotive navigation systems.

For optical devices, the functional film may be used for color filters of liquid crystal displays and display pixels for organic EL displays, optical storages, optical modulators, optical shutters, second harmonic generation (SHG) devices, polarizers, photonic crystals, lens arrays, and electrowetting devices. For magnetic devices, the functional film may be used for next-generation hard disk drives (discrete track media) and next-next-generation hard disk drives (patterned media). For medical devices, the functional film may be used for germicidal films and biochips such as DNA arrays and protein arrays. For chemical analysis devices, the functional film may be used for microchemical chips for microchemical plants and microchemical analysis systems. For construction materials, the functional film may be used for light-shielding windows, self-cleaning films, anti-fogging films, and frost-preventing films. For automotive interior and exterior, the functional film may be used for install panels, console panels, anti-fogging glass, self-cleaning glass, and super water repellent coating.

EXAMPLES

The invention is described hereinbelow with reference to experimental examples. These experimental examples are not intended to limit the invention.

The parameters in the experimental examples were determined by the following methods.
(Determination of Film Thickness)

The film thickness was determined by obtaining reflection spectrum data using a spectroscopic ellipsometer (VASE ellipsometer, J.A. Woollam Co., Inc.).
(Measurement of D1 and D2)

The D1 and D2 values were determined using an X-ray photoelectron spectroscopy (VersaProbe II, Ulvac-Phi, Inc.) under conditions including an X-ray beam diameter of 100 µm, a measurement area of 1000 µm×300 µm, and a photoelectron capturing angle of 45 degrees.

The functional film was subjected to elemental analysis by the X-ray photoelectron spectroscopy with sputtering using an argon gas cluster ion beam (Ar-GCIB). Further the carbon is spectrum was determined. The sputtering was performed using VersaProbe II available from Ulvac-Phi, Inc. and an argon gas cluster ion beam as an ion source under the sputtering conditions including an accelerating voltage of 5 kV, a sample current of 20 nA, a raster area of 2 mm×2 mm, and a sputtering duration of eight minutes.

Experimental Example 1

A polystyrene film was cast on a silicon substrate, and the film thickness was measured with AFM to be 81 nm. This polystyrene film was subjected to sputtering under the aforementioned sputtering conditions, and a reduction in the carbon is spectrum was observed. Seven-minute sputtering allowed the ions to reach the silicon substrate, and the outermost $SiO_2$ layer was detected. The sputtering speed was determined from the thickness of the polystyrene film and the sputtering duration to be 11.6 nm/min.

Experimental Example 2

Optool DAC-HP (Daikin Industries, Ltd.) was diluted in a solvent so as to have a solid concentration of 0.025% by mass, and thereby a sample liquid A was prepared. A photo-polymerization initiator in an amount of 2.0% by mass relative to the solid content of the sample liquid A was added thereto, and the mixture was applied to a release-treated glass plate by spin coating such that the solid layer had a thickness of 25 nm. The layer was dried at room temperature for 10 minutes, and then irradiated with ultraviolet rays at 365 nm. Thereby, a cured film A was obtained. For five sheets of this cured film A, the thicknesses were measured using an ellipsometer. The results are shown in Table 1.

Experimental Example 3

A mixture, used as a sample liquid B, was prepared in the same manner as mentioned above, except that the solid concentration of the aforementioned Optool DAC-HP (Daikin Industries, Ltd.) was changed to 0.05% by mass. A cured film B was obtained by the same operations as in Experimental Example 2, except that the solid layer had a thickness of 50 nm. For five sheets of this cured film B, the thicknesses were measured using an ellipsometer. The results are shown in Table 1.

TABLE 1

|  | 1 | 2 | 3 | 4 | 5 | Average |
|---|---|---|---|---|---|---|
| Cured film A | 23 nm | 26 nm | 23 nm | 24 nm | 25 nm | 24 nm |
| Cured film B | 51 nm | 52 nm | 50 nm | 48 nm | 47 nm | 50 nm |

Experimental Example 4

Figure 3:
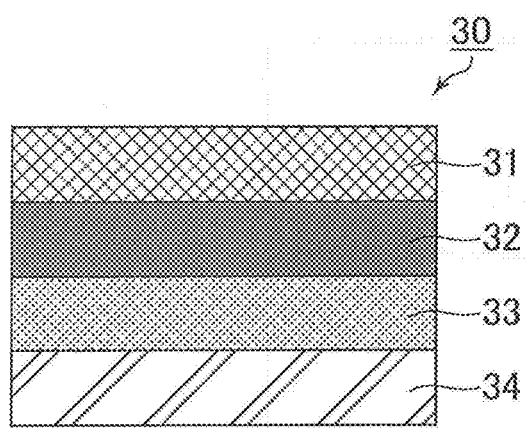
FIG. 3 is a schematic cross-sectional view of a laminate produced in Experimental Example 4.
Figure 4A:
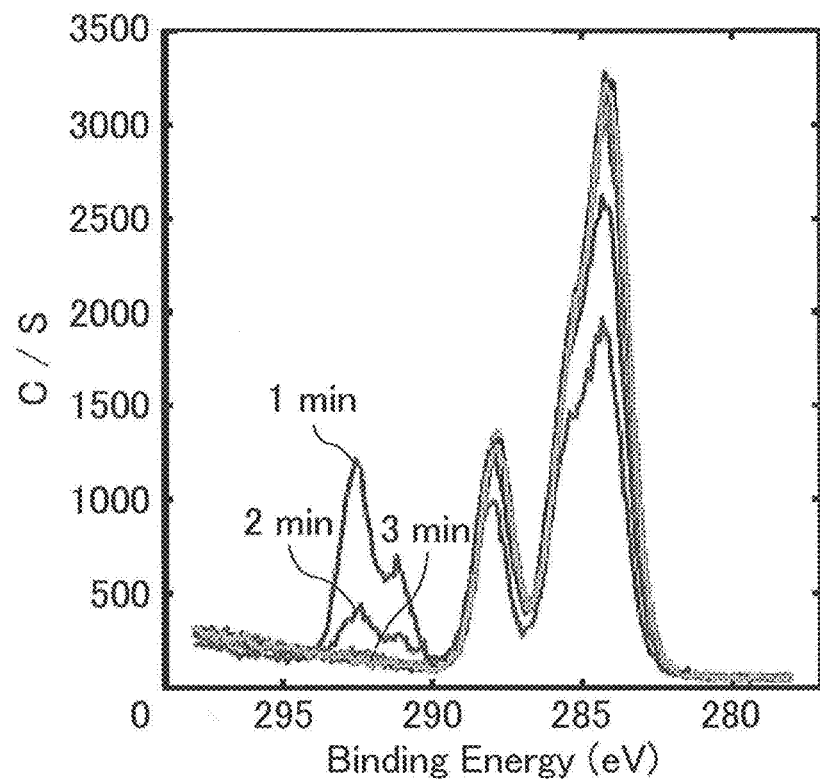
FIGS. 4A and 4B include spectra of the functional film produced in Experimental Example 4.
Figure 4B:
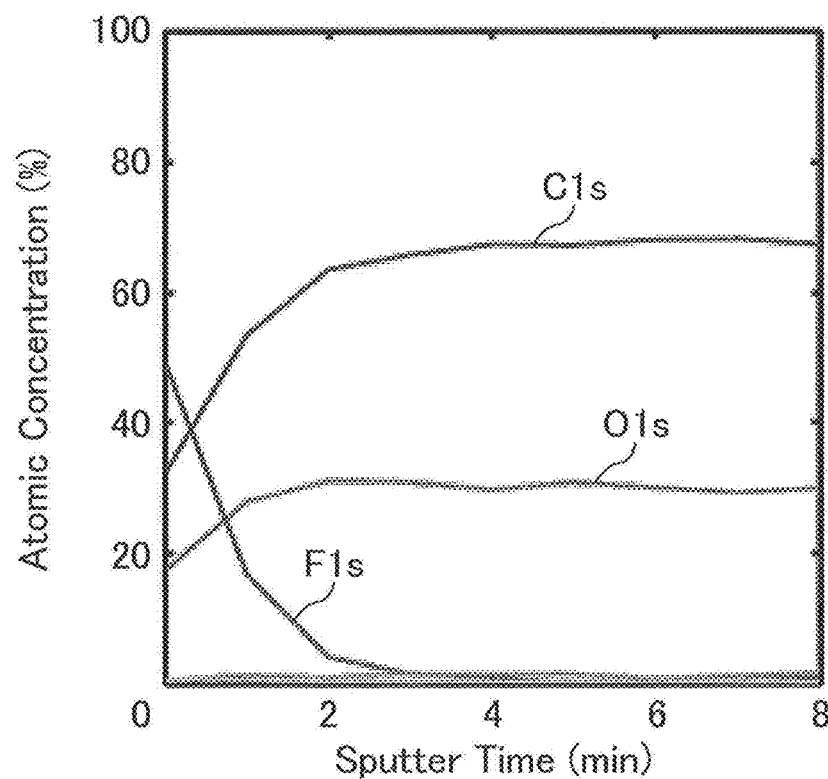

A laminate 30 shown in FIG. 3 was produced. First, the sample liquid A was applied to a release-treated glass plate 31 by spin coating such that the solid layer had a thickness of 25 nm. The layer was dried at room temperature for 10 minutes, whereby a coating film 32 was formed. To PAK-02 (Toyo Gosei Co., Ltd.) was added a photo-polymerization initiator in an amount of 2.0% by mass relative to PAK-02, and the components were stirred using a rotary mixer under light shielding. The mixture was applied to a 2-mm-thick quartz substrate 34 by bar coating so as to have a thickness of 10 μm. Thereby, a coating film 33 was formed. The coating film 32 and the coating film 33 were stacked, and this stack was irradiated with a light beam including UV light at 365 nm at an intensity of 600 mJ/cm² in a nitrogen atmosphere with the quartz substrate 34 facing upward. Thereby, the coating film 32 and the coating film 33 were cured. The glass plate 31 was then peeled off. Thereby, a functional film A including a cured film 32, a cured film 33, and the quartz substrate 34 was produced. The spectra of the functional film A obtained by X-ray photoelectron spectroscopy are shown in FIGS. 4A and 4B. D1 was 23.2 nm in polystyrene equivalent and D2 was 34.8 nm in polystyrene equivalent.

Experimental Example 5

Figure 5A:
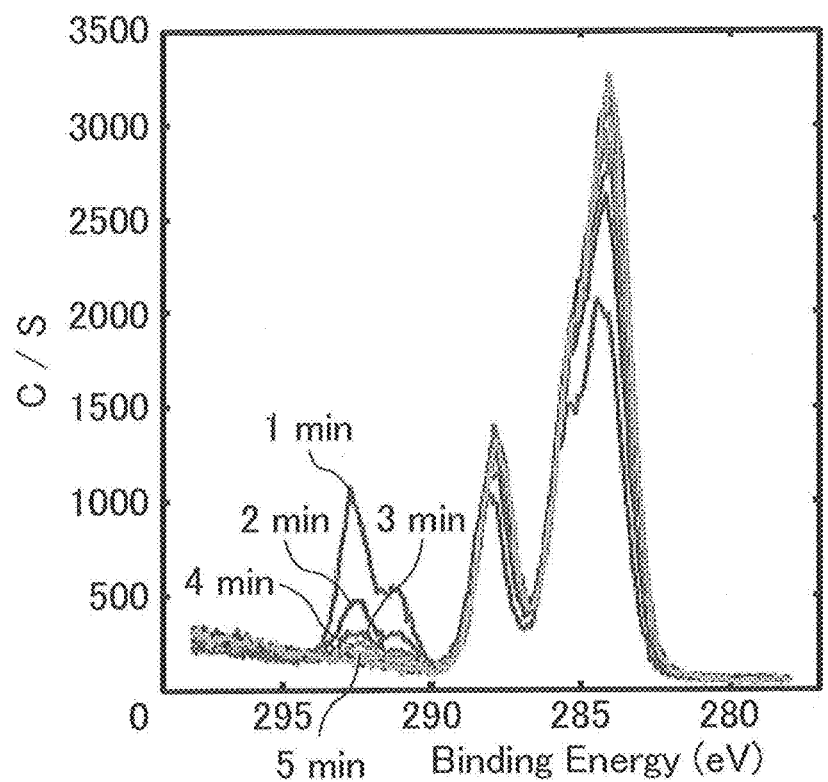
FIGS. 5A and 5B include spectra of a functional film produced in Experimental Example 5.
Figure 5B:
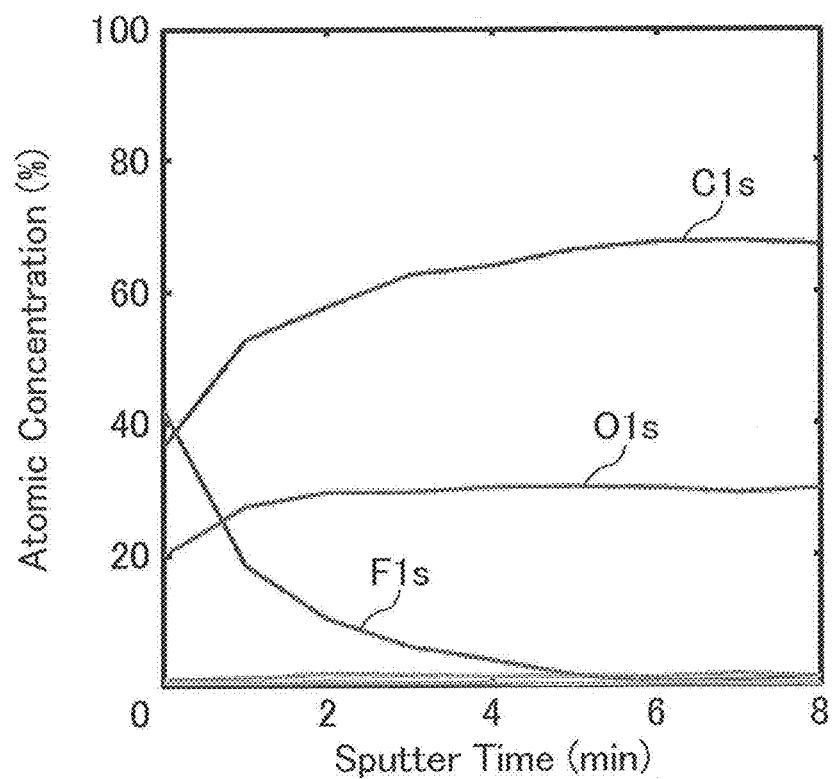

A functional film B was obtained by the same operations as in Experimental Example 4, except that the sample liquid B was applied such that the solid layer had a thickness of 50 nm. The spectra of the functional film B obtained by X-ray photoelectron spectroscopy are shown in FIGS. 5A and 5B. D1 was 46.4 nm in polystyrene equivalent and D2 was 58.0 nm in polystyrene equivalent.

REFERENCE SIGNS LIST

10: functional film
11: substrate
12: layer containing resin
13: layer containing compound that contains perfluoropolyether group
20: functional film (comparative)
21: substrate
22: layer containing resin
23: layer containing compound that contains perfluoropolyether group
30: laminate
31: glass plate
32: coating film, cured film
33: coating film, cured film
34: quartz substrate

The invention claimed is:

1. A functional film comprising:
    a layer (A) that contains a resin; and
    a layer (B) that contains a compound containing a perfluoropolyether group,
    the layer (B) having a microrelief pattern structure on a surface remote from the layer (A),
    in elemental analysis by X-ray photoelectron spectroscopy with etching by an argon gas cluster ion beam from the layer (B) side, the functional film satisfying the following formula (1):

$D1 < 2 \times X1$ wherein X1 is a thickness (nm) of the layer (B); and D1 is a depth (nm) at which fluorine atoms exhibit a concentration of 1 atom % or lower,
        in carbon is spectrum measurement by X-ray photoelectron spectroscopy with etching by an argon gas cluster ion beam from the layer (B) side, the functional film satisfying the following formula (2):

$D2 < 2 \times X1$ wherein X1 is the thickness (nm) of the layer (B); and D2 is a depth (nm) at which no peak is detected within a bond energy range of 290 to 300 eV,
        wherein the compound in the layer (B) is at least one selected from the group consisting of:
        a compound obtained by curing a compound (F) containing a perfluoropolyether group and a curable site; and
        a compound (G) containing a perfluoropolyether group and a hydrolyzable group.
2. The functional film according to claim 1,
    wherein the functional film further satisfies $0.8 \times X1 < D1$ in the formula (1).
3. The functional film according to claim 1,
    wherein the functional film further satisfies $0.8 \times X1 < D2$ in the formula (2).
4. The functional film according to claim 1,
    wherein the layer (B) is on the layer (A).
5. The functional film according to claim 1, further comprising a substrate (S),
    wherein the layer (A) is on the substrate (S), and the layer (B) is on the layer (A).
6. The functional film according to claim 1,
    wherein the perfluoropolyether group is a polyether chain represented by the following formula:

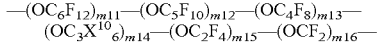

wherein m11, m12, m13, m14, m15, and m16 are each individually an integer of 0 or 1 or greater; $X^{10}$s are each individually H, F, or Cl; and repeating units are present in any order.
7. The functional film according to claim 1,
    wherein the resin in the layer (A) is at least one selected from the group consisting of a resin obtainable by curing a curable resin, a resin obtainable by curing a curable monomer, and a resin containing a polysiloxane structure formed from a silicon-containing compound.

* * * * *